US012606427B1

(12) United States Patent
Wu et al.

(10) Patent No.: US 12,606,427 B1
(45) Date of Patent: Apr. 21, 2026

(54) METHOD FOR DETERMINING CENTER OF MATERIAL HANDLING EQUIPMENT, MATERIAL HANDLING EQUIPMENT AND CONTROLLER

(71) Applicant: VisionNav Robotics USA Inc., Acworth, GA (US)

(72) Inventors: Di Wu, Acworth, GA (US); Chao Li, Acworth, GA (US); Bin Li, Acworth, GA (US); Lei Wei, Acworth, GA (US); Siqi Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/403,425

(22) Filed: Nov. 28, 2025

(51) Int. Cl.
| | |
|---|---|
| *G06T 7/521* | (2017.01) |
| *B66F 9/075* | (2006.01) |
| *G06T 7/60* | (2017.01) |
| *G06T 7/73* | (2017.01) |
| G01S 17/89 | (2020.01) |

(52) U.S. Cl.
CPC ............ *B66F 9/0755* (2013.01); *G06T 7/521* (2017.01); *G06T 7/60* (2013.01); *G06T 7/73* (2017.01); *G01S 17/89* (2013.01); *G06T 2207/10028* (2013.01); *G06T 2207/30252* (2013.01)

(58) Field of Classification Search
CPC ......... B66F 9/0755; G06T 7/521; G06T 7/60; G06T 7/73; G06T 2207/10028; G06T 2207/30252; G01S 17/89
See application file for complete search history.

(56) References Cited

U.S. PATENT DOCUMENTS

| | | | | |
|---|---|---|---|---|
| 11,618,502 B2 * | 4/2023 | Senn | .................... | B60W 60/001 |
| | | | | 701/28 |
| 12,404,158 B2 * | 9/2025 | Zheng | ................... | B66F 9/0755 |
| 12,469,143 B1 * | 11/2025 | Yang | ......................... | G06T 7/13 |
| 12,493,726 B1 * | 12/2025 | Yang | ....................... | G06F 30/15 |
| 12,503,345 B1 * | 12/2025 | Yang | ..................... | B66F 9/0755 |
| 2012/0123614 A1 * | 5/2012 | Laws | ................... | G05D 1/0088 |
| | | | | 701/2 |

(Continued)

FOREIGN PATENT DOCUMENTS

| | | | | |
|---|---|---|---|---|
| CN | 113284197 A | * | 8/2021 | ............. G06F 18/24 |
| CN | 113739712 A | | 12/2021 | |

(Continued)

*Primary Examiner* — Aaron W Carter

(74) *Attorney, Agent, or Firm* — Westbridge IP LLC

(57) ABSTRACT

A method for determining a center of material handling equipment, which includes a fork assembly, a first wheel assembly, and a second wheel assembly, includes: acquiring first point cloud data corresponding to the fork assembly, second point cloud data corresponding to the first wheel assembly, and third point cloud data corresponding to the second wheel assembly; determining, based on the first point cloud data, a first point cloud plane corresponding to the fork assembly; determining, based on the second point cloud data, a second point cloud plane corresponding to the first wheel assembly; determining, based on the third point cloud data, a third point cloud plane corresponding to the second wheel assembly; and determining, based on the first point cloud plane, the second point cloud plane and the third point cloud plane, the center of the material handling equipment.

20 Claims, 21 Drawing Sheets

(56) References Cited

U.S. PATENT DOCUMENTS

| | | | | |
|---|---|---|---|---|
| 2012/0303176 A1* | 11/2012 | Wong | G01S 17/89 | 701/1 |
| 2012/0303255 A1* | 11/2012 | Wong | G05D 1/0274 | 701/300 |
| 2012/0310468 A1* | 12/2012 | Wong | G01C 25/00 | 701/29.9 |
| 2012/0323431 A1* | 12/2012 | Wong | G05D 1/0274 | 701/25 |
| 2012/0323432 A1* | 12/2012 | Wong | G01C 21/3841 | 701/25 |
| 2013/0054129 A1* | 2/2013 | Wong | B66F 9/063 | 702/150 |
| 2013/0060461 A1* | 3/2013 | Wong | G01C 21/20 | 701/300 |
| 2014/0058634 A1* | 2/2014 | Wong | G01S 17/08 | 701/50 |
| 2014/0063510 A1* | 3/2014 | Seifert | G01B 21/20 | 356/635 |
| 2014/0074342 A1* | 3/2014 | Wong | G05D 1/0274 | 701/26 |
| 2017/0227629 A1* | 8/2017 | Sorensen | B66F 9/0755 | |
| 2018/0089616 A1* | 3/2018 | Jacobus | G05D 1/0274 | |
| 2018/0134531 A1* | 5/2018 | Tanaka | B66F 9/063 | |
| 2021/0284198 A1* | 9/2021 | Schmidt | B60W 30/0956 | |
| 2021/0316975 A1* | 10/2021 | Yeo | G01S 17/42 | |
| 2022/0044430 A1* | 2/2022 | Eckman | G01S 7/4817 | |
| 2022/0089419 A1* | 3/2022 | Kim | B66F 9/0755 | |
| 2022/0396459 A1* | 12/2022 | Kim | B66F 9/0755 | |
| 2023/0068916 A1* | 3/2023 | Mita | G05D 1/0248 | |
| 2025/0066172 A1* | 2/2025 | Kato | B66F 9/24 | |
| 2025/0109002 A1* | 4/2025 | Anderson-Sprecher | G05D 1/0246 | |
| 2025/0172386 A1* | 5/2025 | Zhan | G01B 11/2755 | |
| 2025/0187885 A1* | 6/2025 | Fang | B66F 9/24 | |
| 2025/0223144 A1* | 7/2025 | Kakita | B66F 9/0755 | |
| 2025/0232569 A1* | 7/2025 | Anderson-Sprecher | G06V 10/764 | |
| 2025/0250151 A1* | 8/2025 | Zheng | B66F 9/0755 | |
| 2025/0307761 A1* | 10/2025 | Danescu | G06T 7/62 | |
| 2026/0016832 A1* | 1/2026 | Anderson-Sprecher | G05D 1/639 | |

FOREIGN PATENT DOCUMENTS

| | | | | |
|---|---|---|---|---|
| CN | 114047487 A | 2/2022 | | |
| CN | 112462350 B | 4/2023 | | |
| CN | 117889785 A | 4/2024 | | |
| CN | 119338920 A | 1/2025 | | |
| EP | 2468678 B1 * | 3/2015 | | B66F 9/0755 |

* cited by examiner

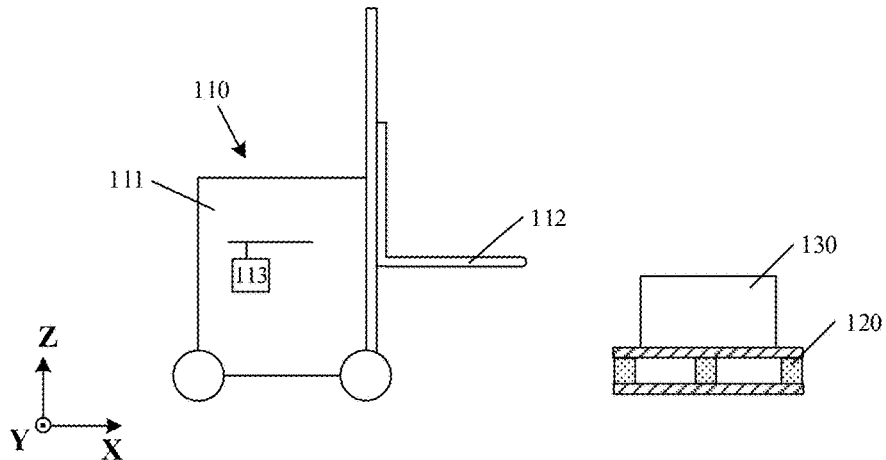

Acquiring first point cloud data corresponding to the fork assembly, second point cloud data corresponding to the first wheel assembly, and third point cloud data corresponding to the second wheel assembly

S220

Determining, based on the first point cloud data, a first point cloud plane corresponding to the fork assembly

S230

Determining, based on the second point cloud data, a second point cloud plane corresponding to the first wheel assembl

S240

Determining, based on the third point cloud data, a third point cloud plane corresponding to the second wheel assembly

S250

Determining, based on the first point cloud plane, the second point cloud plane and the third point cloud plan, the center of the material handling equipment

FIG. 2

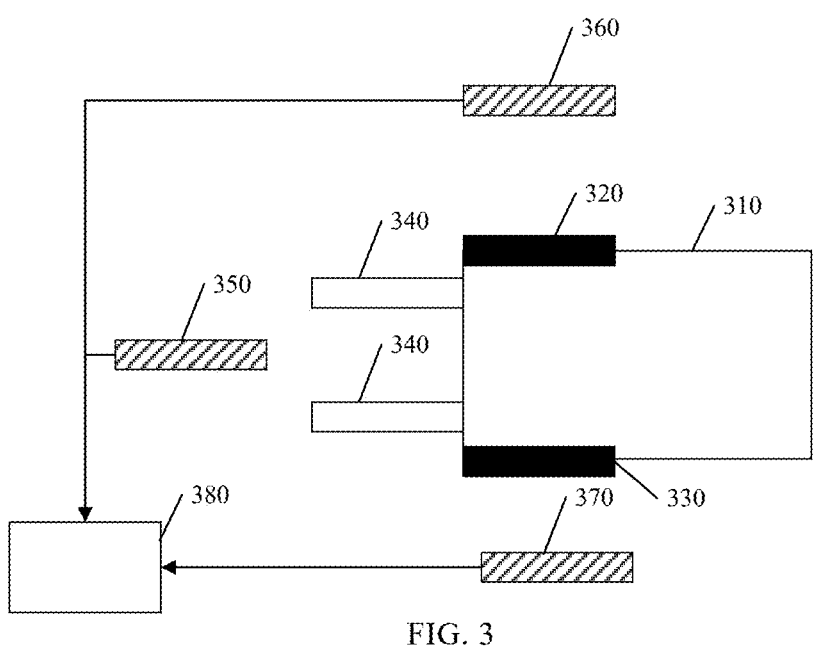
FIG. 3
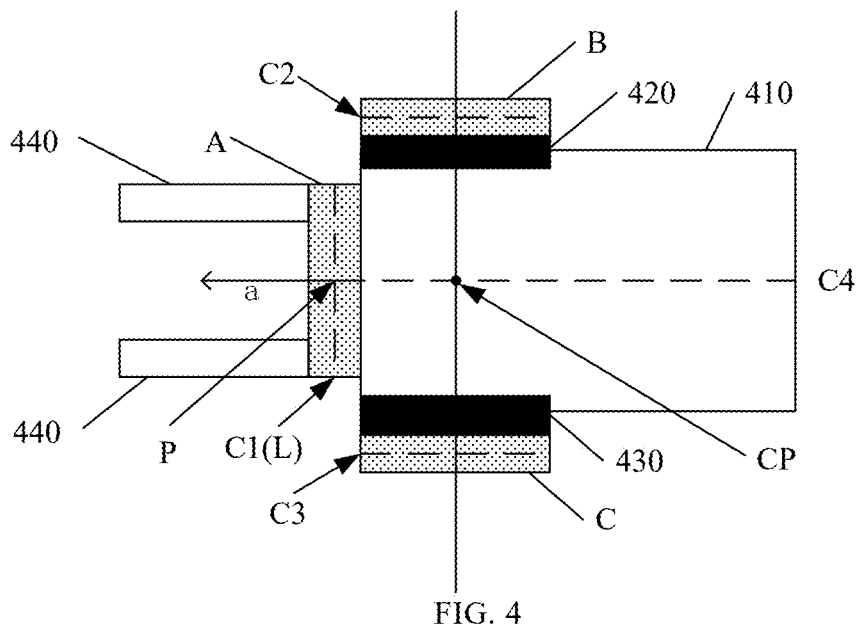
FIG. 4
| S510 |
| --- |
| Determining point cloud of the first reflective layer in the first point cloud data |
| S520 |
| --- |
| Performing plane fitting based on the point cloud of the first reflective layer to obtain the first point cloud plane |
FIG. 5

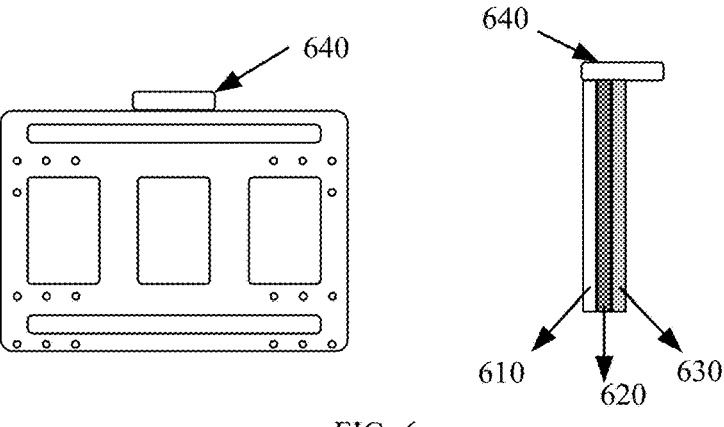

Extracting a point cloud of the second reflective layer from the first point cloud data

S720

Determining a centroid of the point cloud of the second reflective layer, and determining, based on the centroid, the point cloud of the first reflective layer

Clustering the point cloud of the second reflective layer to obtain a plurality of first clusters

S820

Generating a plurality of target planes corresponding to the plurality of first clusters based on the plurality of first clusters and removing, based on a normal vector of each target planes, a first cluster without meeting a condition from the plurality of first clusters to obtain a second clusters

S830

Calculating, based on the second clusters, the centroid of the point cloud of the second reflective layer

Determining, based on the centroid, a target region corresponding to the first reflective layer

S920

Extracting, based on the target region, the point cloud of the first reflective layer

| Determining point cloud of the first reflective layer from the second point cloud data |
| --- |

S1020

| Performing plane fitting based on the point cloud of the first reflective layer to obtain the second point cloud plane |
| --- |

FIG. 10

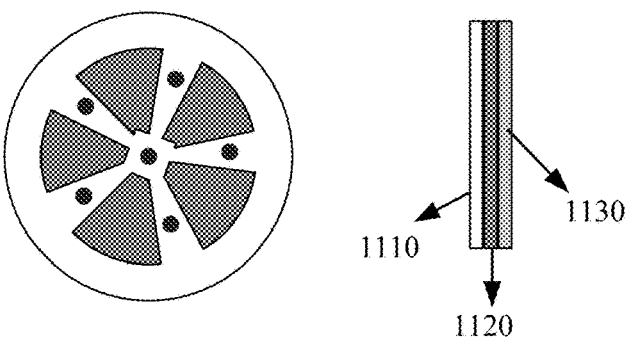

FIG. 11

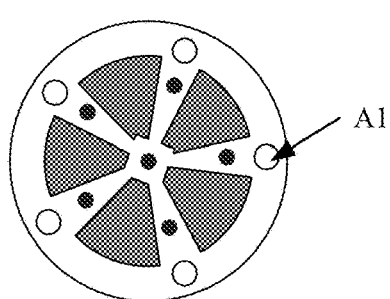

FIG. 12

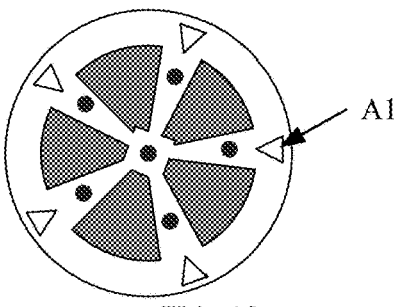

| Extracting a point cloud of the second reflective layer from the second point cloud data |
| --- |

S1420

| Determining a centroid of the point cloud of the second reflective layer, and determining, based on the centroid, the point cloud of the first reflective layer |
| --- |

FIG. 14

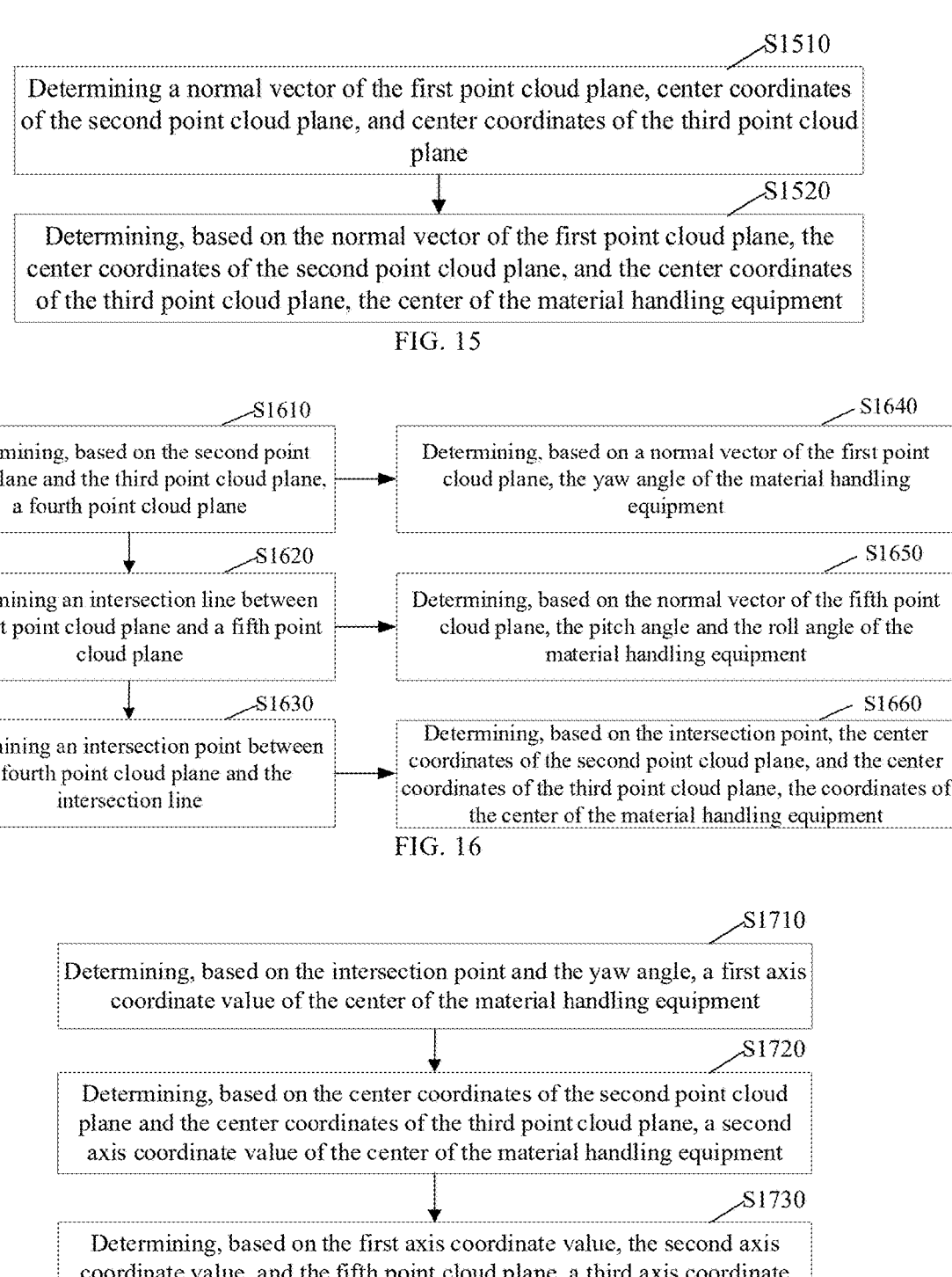

S1510

Determining a normal vector of the first point cloud plane, center coordinates of the second point cloud plane, and center coordinates of the third point cloud plane

S1520

Determining, based on the normal vector of the first point cloud plane, the center coordinates of the second point cloud plane, and the center coordinates of the third point cloud plane, the center of the material handling equipment

Determining, based on the second point cloud plane and the third point cloud plane, a fourth point cloud plane

S1620

Determining an intersection line between the first point cloud plane and a fifth point cloud plane

S1630

Determining an intersection point between the fourth point cloud plane and the intersection line

S1640

Determining, based on a normal vector of the first point cloud plane, the yaw angle of the material handling equipment

S1650

Determining, based on the normal vector of the fifth point cloud plane, the pitch angle and the roll angle of the material handling equipment

S1660

Determining, based on the intersection point, the center coordinates of the second point cloud plane, and the center coordinates of the third point cloud plane, the coordinates of the center of the material handling equipment

Determining, based on the intersection point and the yaw angle, a first axis coordinate value of the center of the material handling equipment

S1720

Determining, based on the center coordinates of the second point cloud plane and the center coordinates of the third point cloud plane, a second axis coordinate value of the center of the material handling equipment

S1730

Determining, based on the first axis coordinate value, the second axis coordinate value, and the fifth point cloud plane, a third axis coordinate value of the center of the material handling equipment

FIG. 17

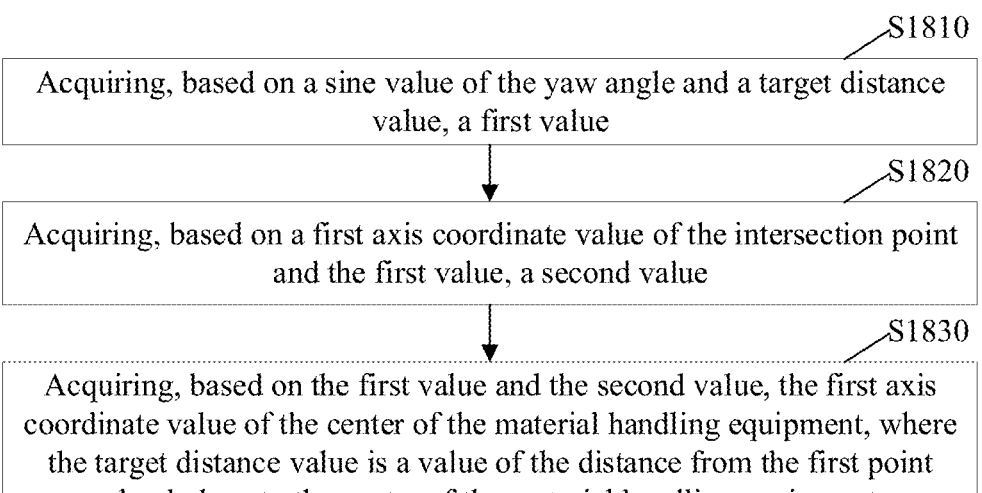

S1810

Acquiring, based on a sine value of the yaw angle and a target distance value, a first value

S1820

Acquiring, based on a first axis coordinate value of the intersection point and the first value, a second value

S1830

Acquiring, based on the first value and the second value, the first axis coordinate value of the center of the material handling equipment, where the target distance value is a value of the distance from the first point cloud plane to the center of the material handling equipment

FIG. 18

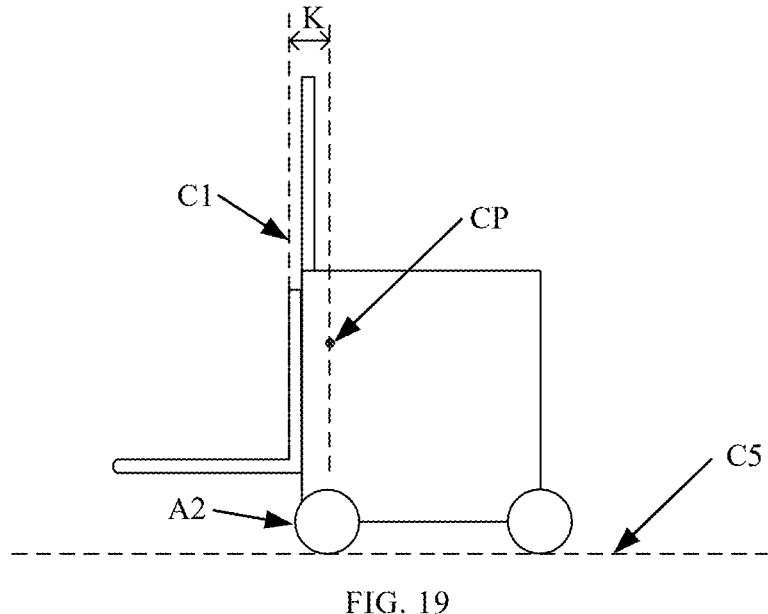

FIG. 19

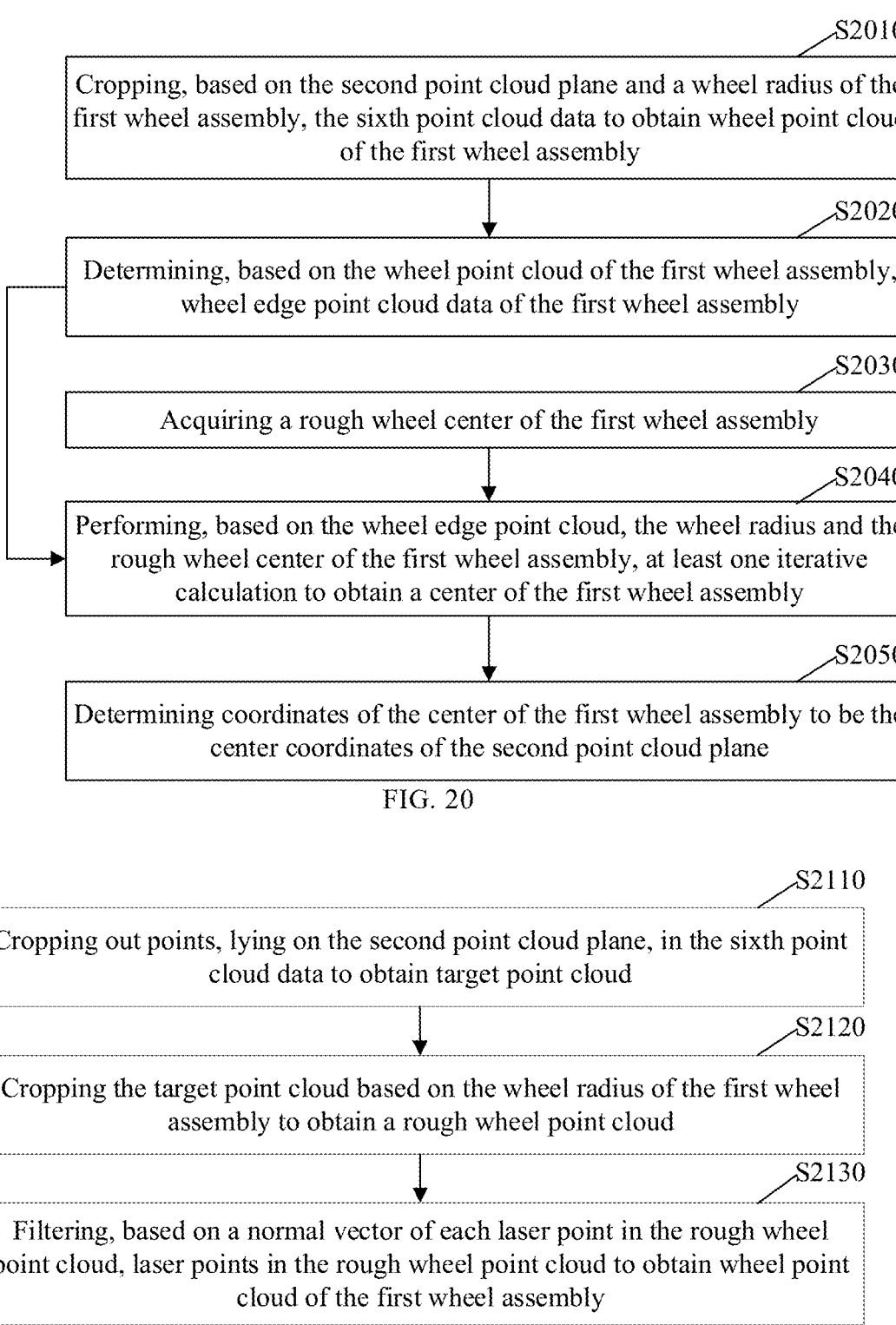

S2010

Cropping, based on the second point cloud plane and a wheel radius of the first wheel assembly, the sixth point cloud data to obtain wheel point cloud of the first wheel assembly

S2020

Determining, based on the wheel point cloud of the first wheel assembly, wheel edge point cloud data of the first wheel assembly

S2030

Acquiring a rough wheel center of the first wheel assembly

S2040

Performing, based on the wheel edge point cloud, the wheel radius and the rough wheel center of the first wheel assembly, at least one iterative calculation to obtain a center of the first wheel assembly

S2050

Determining coordinates of the center of the first wheel assembly to be the center coordinates of the second point cloud plane

Cropping out points, lying on the second point cloud plane, in the sixth point cloud data to obtain target point cloud

S2120

Cropping the target point cloud based on the wheel radius of the first wheel assembly to obtain a rough wheel point cloud

S2130

Filtering, based on a normal vector of each laser point in the rough wheel point cloud, laser points in the rough wheel point cloud to obtain wheel point cloud of the first wheel assembly

FIG. 21

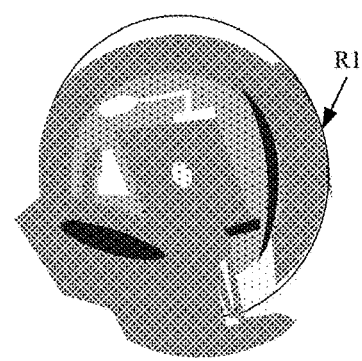
FIG. 22
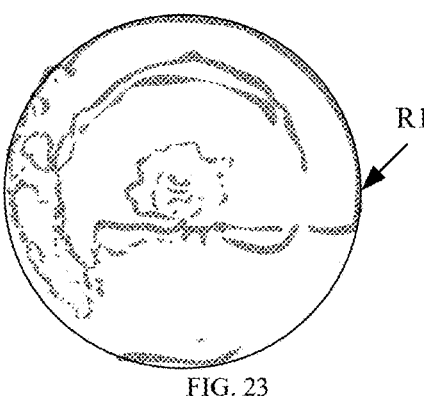
FIG. 23
S2410
Acquiring rough wheel edge point cloud based on the wheel point cloud of the first wheel assembly and the wheel radius of the first wheel assembly
S2420
Performing circle fitting based on the rough wheel edge point cloud to obtain the wheel edge point cloud
FIG. 24
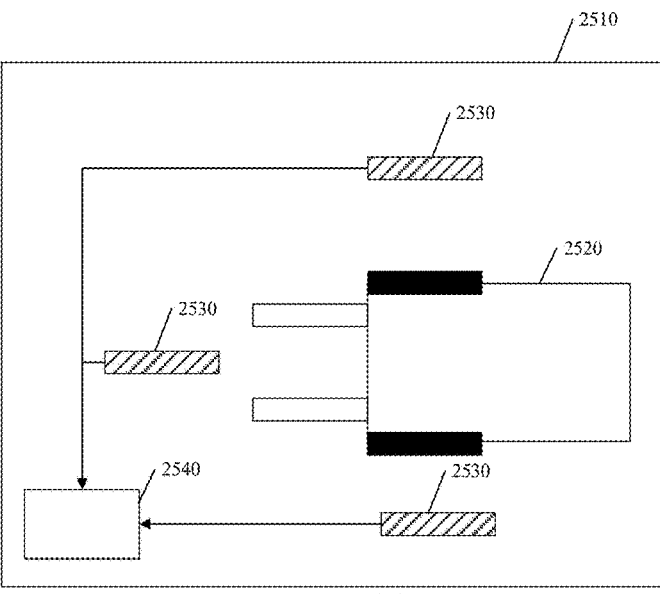
FIG. 25

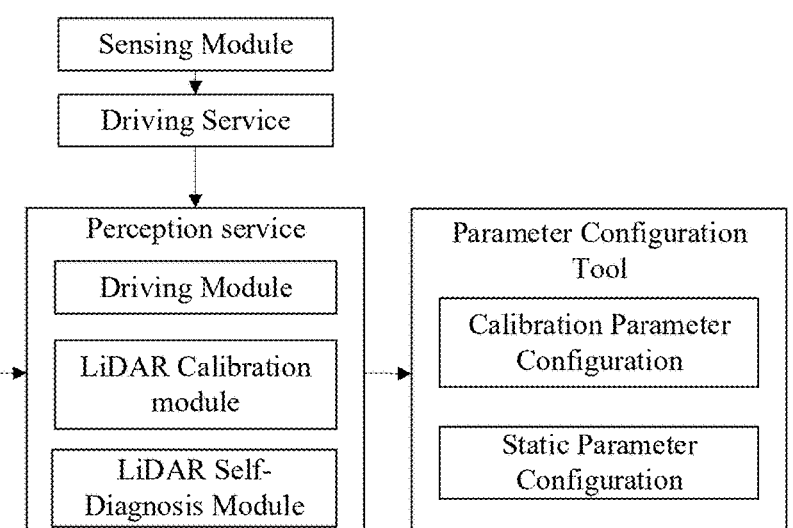
FIG. 28
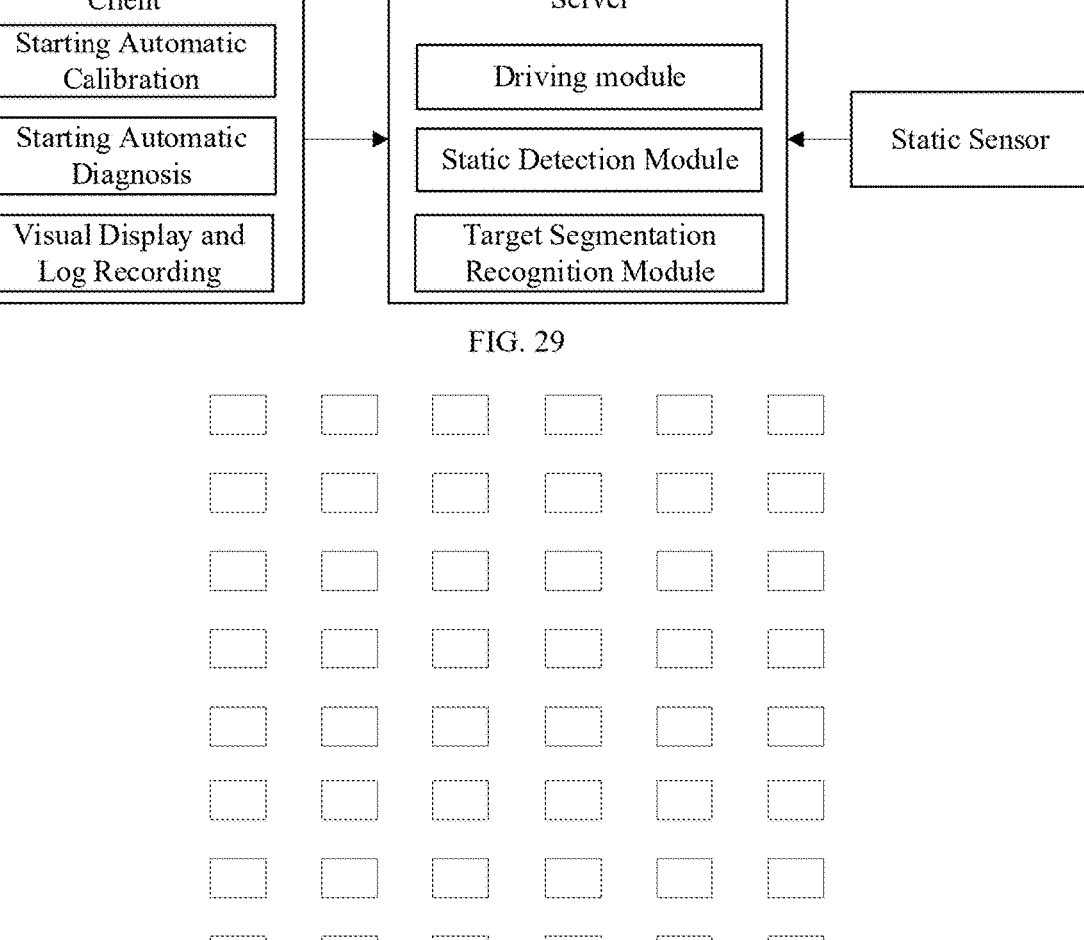
FIG. 29
FIG. 30

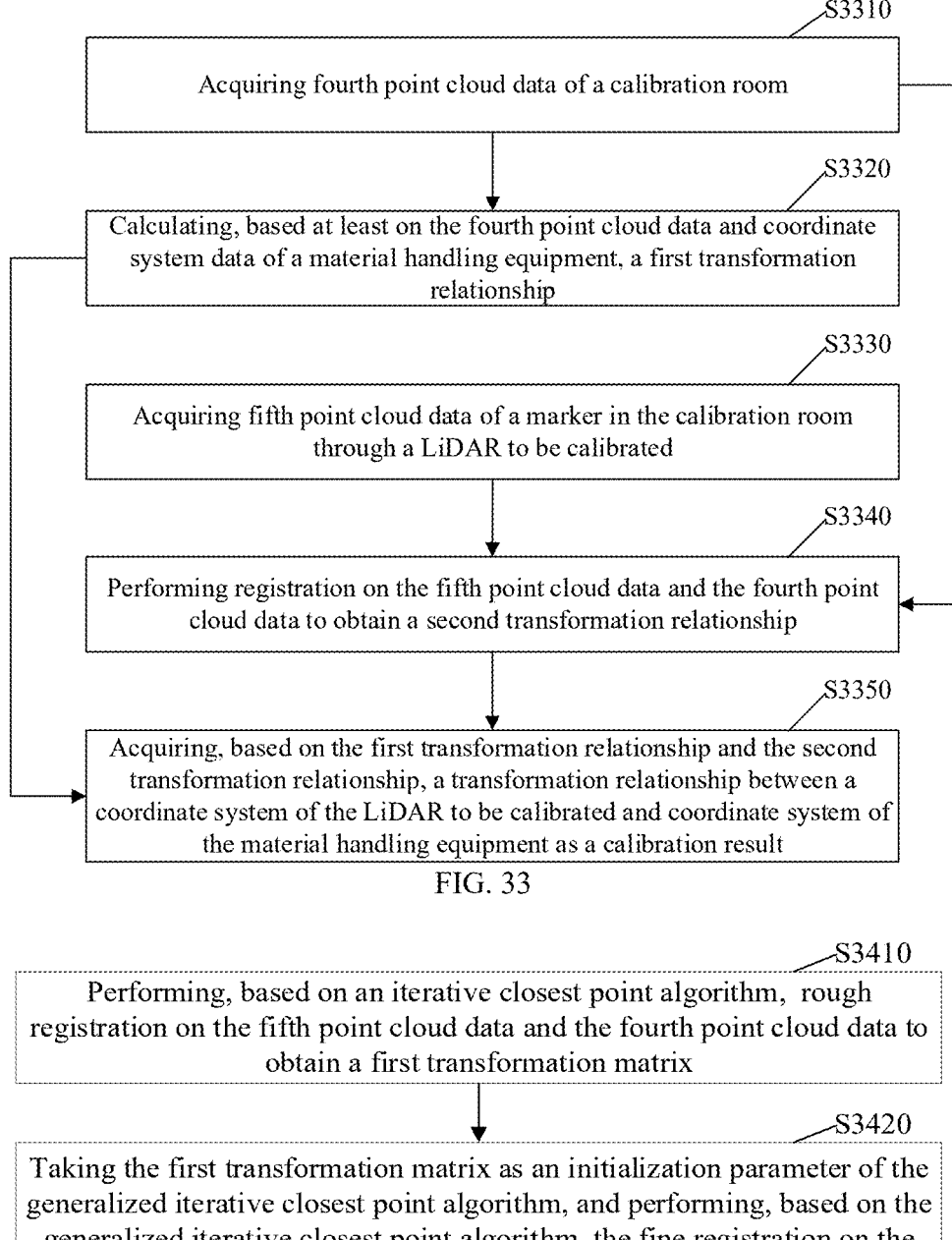

S3310

Acquiring fourth point cloud data of a calibration room

S3320

Calculating, based at least on the fourth point cloud data and coordinate system data of a material handling equipment, a first transformation relationship

S3330

Acquiring fifth point cloud data of a marker in the calibration room through a LiDAR to be calibrated

S3340

Performing registration on the fifth point cloud data and the fourth point cloud data to obtain a second transformation relationship

S3350

Acquiring, based on the first transformation relationship and the second transformation relationship, a transformation relationship between a coordinate system of the LiDAR to be calibrated and coordinate system of the material handling equipment as a calibration result

Performing, based on an iterative closest point algorithm, rough registration on the fifth point cloud data and the fourth point cloud data to obtain a first transformation matrix

S3420

Taking the first transformation matrix as an initialization parameter of the generalized iterative closest point algorithm, and performing, based on the generalized iterative closest point algorithm, the fine registration on the fifth point cloud data and the fourth point cloud data to obtain the second transformation relationship

FIG. 34

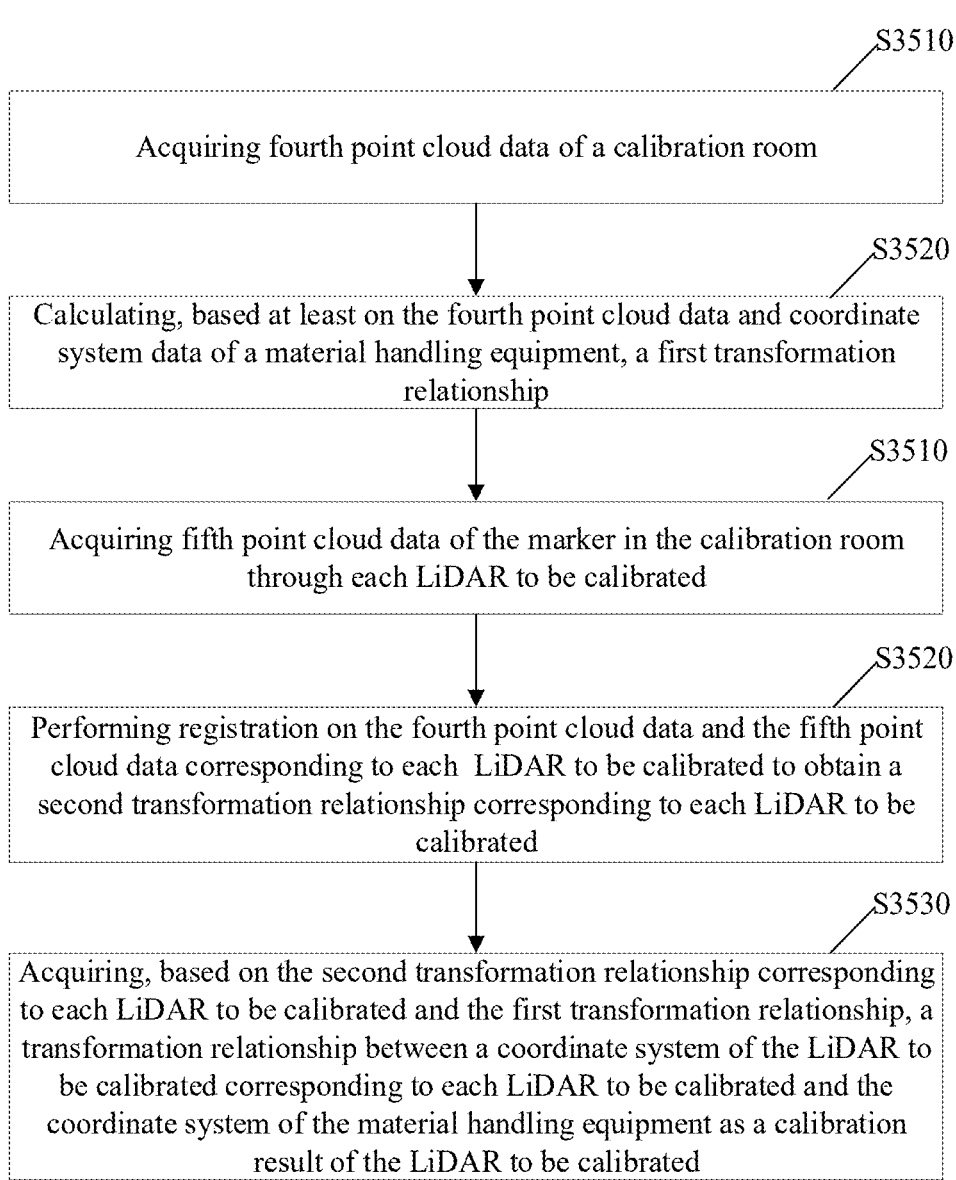

S3510

Acquiring fourth point cloud data of a calibration room

S3520

Calculating, based at least on the fourth point cloud data and coordinate system data of a material handling equipment, a first transformation relationship

S3510

Acquiring fifth point cloud data of the marker in the calibration room through each LiDAR to be calibrated

S3520

Performing registration on the fourth point cloud data and the fifth point cloud data corresponding to each LiDAR to be calibrated to obtain a second transformation relationship corresponding to each LiDAR to be calibrated

S3530

Acquiring, based on the second transformation relationship corresponding to each LiDAR to be calibrated and the first transformation relationship, a transformation relationship between a coordinate system of the LiDAR to be calibrated corresponding to each LiDAR to be calibrated and the coordinate system of the material handling equipment as a calibration result of the LiDAR to be calibrated

FIG. 35

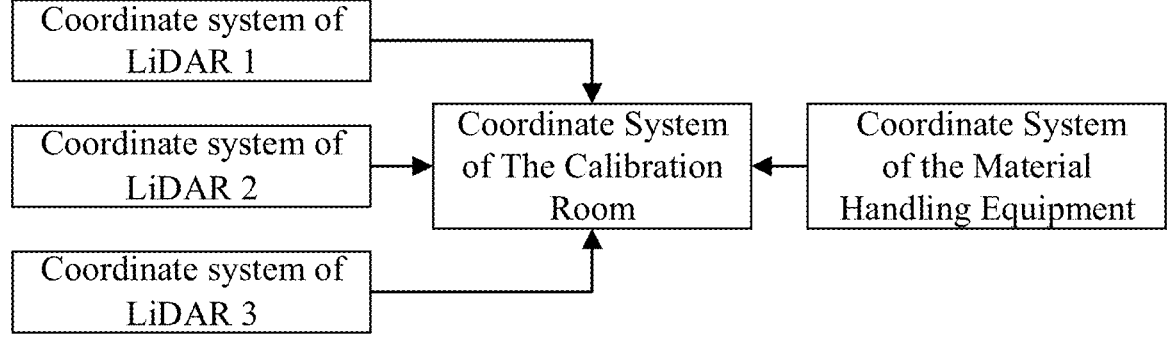

FIG. 36

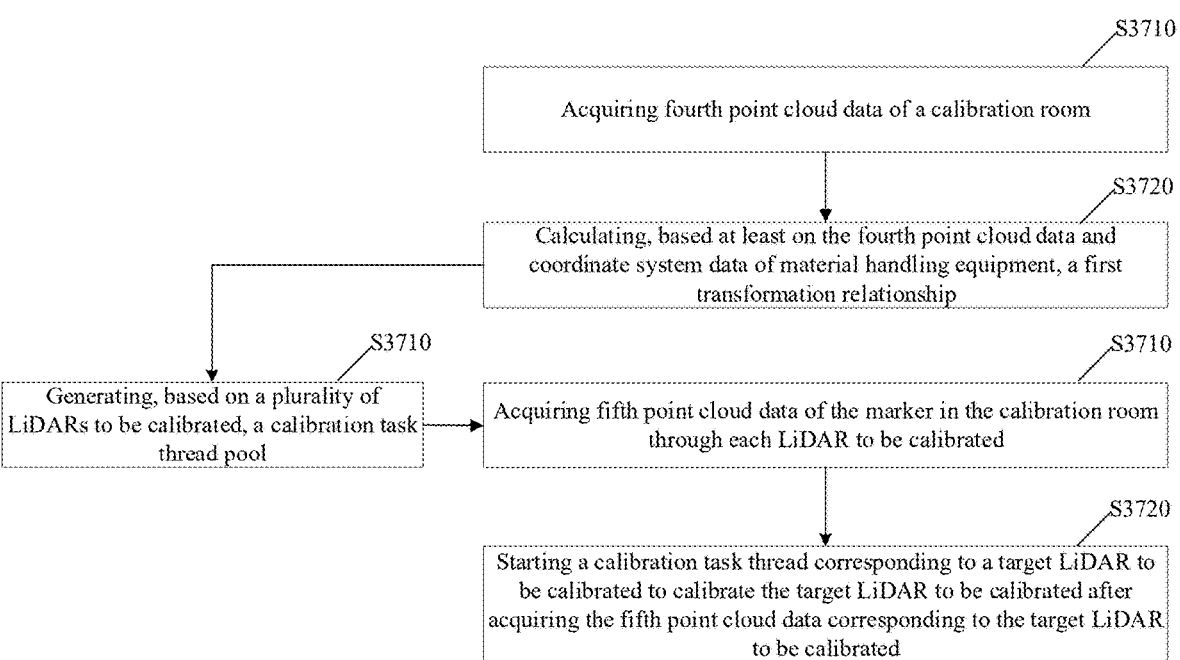

Acquiring sixth point cloud data of the marker in the calibration room through the data acquisition module

S3820

Performing registration on the sixth point cloud data and the fourth point cloud data to obtain a third transformation relationship

S3830

Acquiring seventh point cloud data of the material handling equipment collected by the data acquisition module, and determining, based on the seventh point cloud data, a fourth transformation relationship

S3840

Acquiring, based on the third transformation relationship and the fourth transformation relationship, the first transformation relationship

FIG. 38

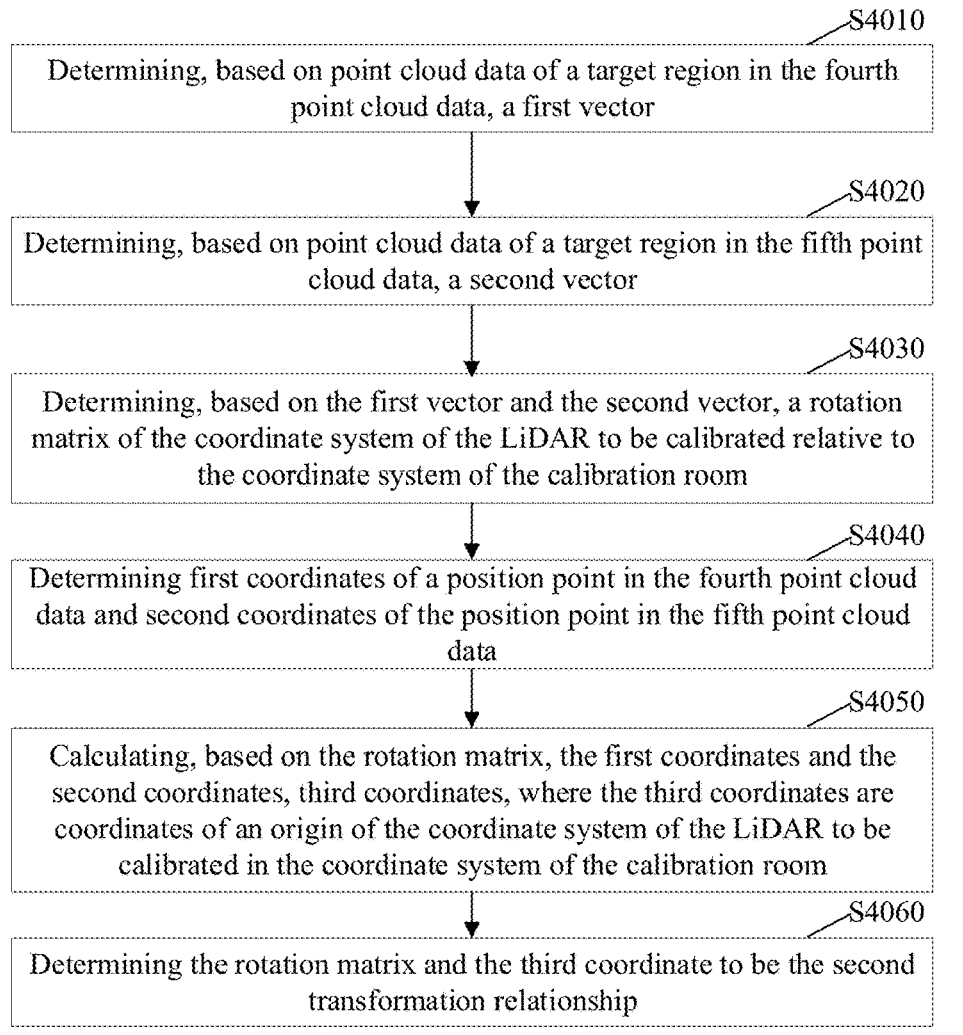

S3910

Acquiring coordinates of a center of the material handling equipment in the coordinate system of the material handling equipment

S3920

Calculating, based on the seventh point cloud data of the material handling equipment collected by the data acquisition module, coordinates of the center of the material handling equipment in the coordinate system of the data acquisition module

S3930

Determining, based on the coordinates of the center of the material handling equipment in the coordinate system of the data acquisition module and the coordinates of the center of the material handling equipment in the coordinate system of the material handling equipment, the fourth transformation relationship

Determining, based on point cloud data of a target region in the fourth point cloud data, a first vector

S4020

Determining, based on point cloud data of a target region in the fifth point cloud data, a second vector

S4030

Determining, based on the first vector and the second vector, a rotation matrix of the coordinate system of the LiDAR to be calibrated relative to the coordinate system of the calibration room

S4040

Determining first coordinates of a position point in the fourth point cloud data and second coordinates of the position point in the fifth point cloud data

S4050

Calculating, based on the rotation matrix, the first coordinates and the second coordinates, third coordinates, where the third coordinates are coordinates of an origin of the coordinate system of the LiDAR to be calibrated in the coordinate system of the calibration room

S4060

Determining the rotation matrix and the third coordinate to be the second transformation relationship

FIG. 40

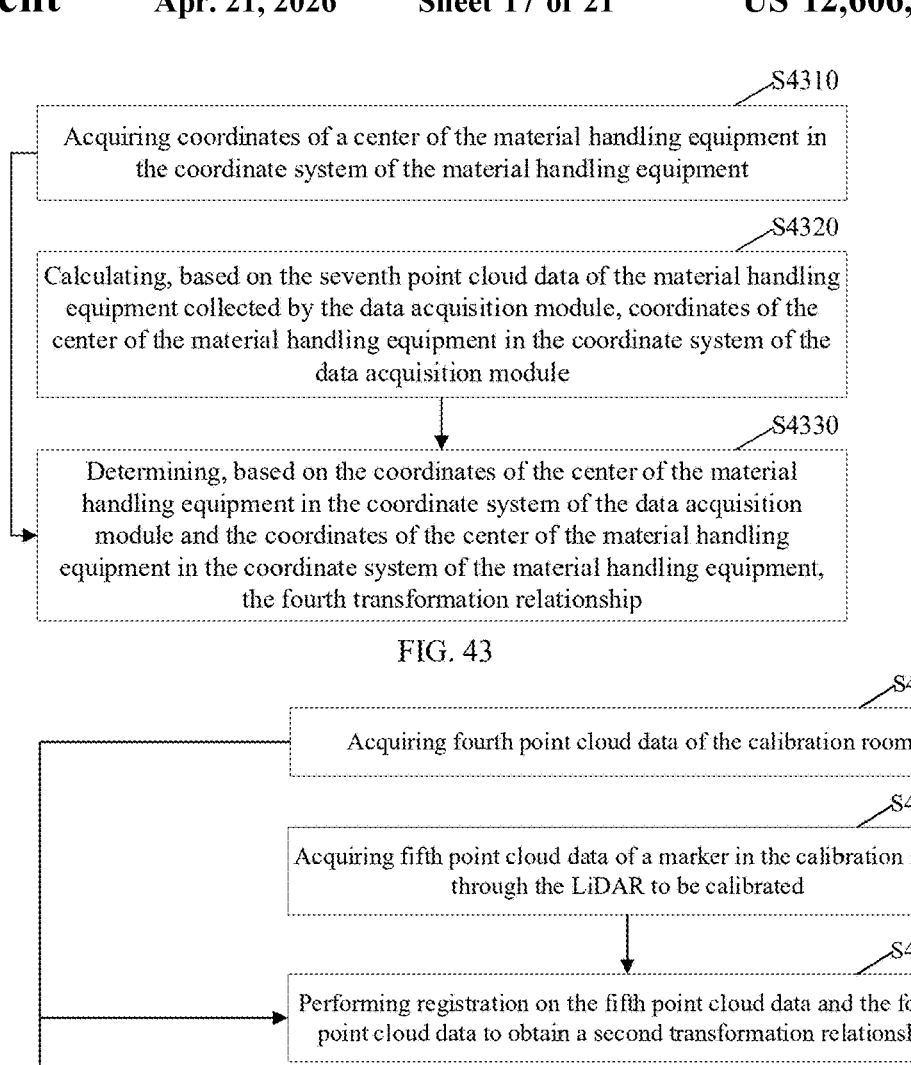

S4310

Acquiring coordinates of a center of the material handling equipment in the coordinate system of the material handling equipment

S4320

Calculating, based on the seventh point cloud data of the material handling equipment collected by the data acquisition module, coordinates of the center of the material handling equipment in the coordinate system of the data acquisition module

S4330

Determining, based on the coordinates of the center of the material handling equipment in the coordinate system of the data acquisition module and the coordinates of the center of the material handling equipment in the coordinate system of the material handling equipment, the fourth transformation relationship

Acquiring fourth point cloud data of the calibration room

S4420

Acquiring fifth point cloud data of a marker in the calibration room through the LiDAR to be calibrated

S4430

Performing registration on the fifth point cloud data and the fourth point cloud data to obtain a second transformation relationship

S4440

Acquiring a first image of the marker in the calibration room through the camera to be calibrated

S4450

Acquiring coordinates of a corner point of the marker in the first image

S4470

Determining, based on the coordinates of the corner point of the marker in the first image and the coordinates of the corner point of the marker in the fourth point cloud data, a fifth transformation relationship

S4460

Acquiring coordinates of the corner point of the marker in the fourth point cloud data

S4480

Acquiring, based on the second transformation relationship and the fifth transformation relationship, a transformation relationship between the coordinate system of the camera to be calibrated and the coordinate system of the LiDAR to be calibrated as a calibration result

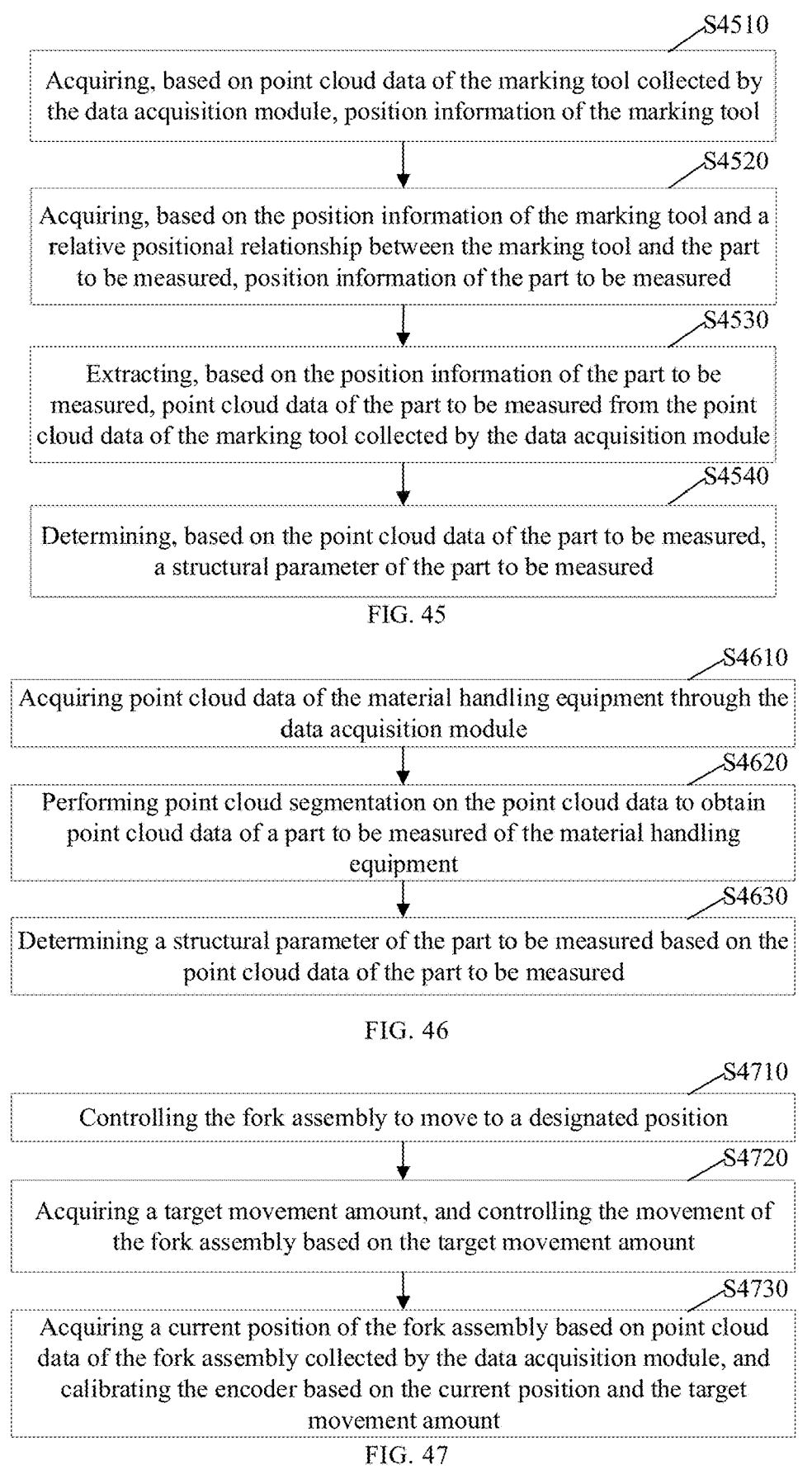

Acquiring, based on point cloud data of the marking tool collected by the data acquisition module, position information of the marking tool

↓ S4520

Acquiring, based on the position information of the marking tool and a relative positional relationship between the marking tool and the part to be measured, position information of the part to be measured

↓ S4530

Extracting, based on the position information of the part to be measured, point cloud data of the part to be measured from the point cloud data of the marking tool collected by the data acquisition module

↓ S4540

Determining, based on the point cloud data of the part to be measured, a structural parameter of the part to be measured

Acquiring point cloud data of the material handling equipment through the data acquisition module

↓ S4620

Performing point cloud segmentation on the point cloud data to obtain point cloud data of a part to be measured of the material handling equipment

↓ S4630

Determining a structural parameter of the part to be measured based on the point cloud data of the part to be measured

Controlling the fork assembly to move to a designated position

↓ S4720

Acquiring a target movement amount, and controlling the movement of the fork assembly based on the target movement amount

↓ S4730

Acquiring a current position of the fork assembly based on point cloud data of the fork assembly collected by the data acquisition module, and calibrating the encoder based on the current position and the target movement amount

FIG. 47

METHOD FOR DETERMINING CENTER OF MATERIAL HANDLING EQUIPMENT, MATERIAL HANDLING EQUIPMENT AND CONTROLLER

TECHNICAL FIELD

The present disclosure relates to the field of material handling equipment technologies, and in particular, to a method for determining a center of material handling equipment, material handling equipment and a controller.

BACKGROUND

In recent years, with the rapid development of intelligent technology, material handling equipment with automatic or semi-automatic handling functions has attracted growing widespread attention due to its advantages in improving handling efficiency and ensuring safety. To realize the automatic or semi-automatic handling functions, it is necessary to deploy sensors on the material handling equipment, such as LiDARs and cameras.

In general, sensor calibration is usually implemented by means of the center of the material handling equipment. Therefore, the accuracy of the center of the material handling equipment is closely related to the calibration accuracy of the sensors. At present, methods for determining the center of the material handling equipment exhibit low accuracy.

SUMMARY

The present disclosure provides a method for determining a center of material handling equipment, material handling equipment and a controller.

In a first aspect, there is provided a method for determining a center of material handling equipment, where the material handling equipment includes a fork assembly, a first wheel assembly, and a second wheel assembly, and the method includes: acquiring first point cloud data corresponding to the fork assembly, second point cloud data corresponding to the first wheel assembly, and third point cloud data corresponding to the second wheel assembly; determining, based on the first point cloud data, a first point cloud plane corresponding to the fork assembly; determining, based on the second point cloud data, a second point cloud plane corresponding to the first wheel assembly; determining, based on the third point cloud data, a third point cloud plane corresponding to the second wheel assembly; and determining, based on the first point cloud plane, the second point cloud plane and the third point cloud plane, the center of the material handling equipment.

In a second aspect, material handling equipment is provided. The material handling equipment includes a fork assembly, a first wheel assembly, and a second wheel assembly, where a center of the material handling equipment is determined by the method mentioned in the first aspect.

In a third aspect, a controller is provided. The controller includes: a processor and a non-volatile memory, where the non-volatile memory is configured to store a program instruction; and the processor is configured to execute the program instruction to implement the following steps: acquiring first point cloud data corresponding to the fork assembly, second point cloud data corresponding to the first wheel assembly, and third point cloud data corresponding to the second wheel assembly; determining, based on the first point cloud data, a first point cloud plane corresponding to the fork assembly; determining, based on the second point cloud data, a second point cloud plane corresponding to the first wheel assembly; determining, based on the third point cloud data, a third point cloud plane corresponding to the second wheel assembly; and determining, based on the first point cloud plane, the second point cloud plane and the third point cloud plane, the center of the material handling equipment.

BRIEF DESCRIPTION OF THE DRAWINGS

To more clearly illustrate the technical solutions in embodiments of the present disclosure or the prior art, drawings required for the embodiments will be briefly described below. Obviously, the drawings in the following description are merely some embodiments of the present disclosure, and for those skilled in the art, other drawings can also be obtained based on these drawings without exerting creative efforts.

FIG. 1 is a schematic diagram of an application scenario applicable to some embodiments of the present disclosure.

FIG. 2 is a schematic flowchart of a method for determining a center of material handling equipment according to some embodiments of the present disclosure.

FIG. 3 is a schematic layout diagram of a data acquisition module according to another embodiment of the present disclosure.

FIG. 4 is a schematic arrangement diagram of a marking tool according to some embodiments of the present disclosure.

FIG. 5 is a schematic flowchart of a method for determining a first point cloud plane according to some embodiments of the present disclosure.

FIG. 6 is a schematic installation diagram of a marking tool according to some embodiments of the present disclosure.

FIG. 7 is a schematic flowchart of a method for determining point cloud of a first reflective layer according to some embodiments of the present disclosure.

FIG. 8 is a schematic flowchart of a method for determining a centroid according to some embodiments of the present disclosure.

FIG. 9 is a schematic flowchart of a method for determining point cloud according to some embodiments of the present disclosure.

FIG. 10 is a schematic flowchart of a method for determining a second point cloud plane according to some embodiments of the present disclosure.

FIG. 11 is a schematic installation diagram of a marking tool according to another embodiment of the present disclosure.

FIG. 12 is a schematic diagram of a first reflective layer according to some embodiments of the present disclosure.

FIG. 13 is a schematic diagram of a first reflective layer according to another embodiment of the present disclosure.

FIG. 14 is a schematic flowchart of a method for determining point cloud of a first reflective layer according to some embodiments of the present disclosure.

FIG. 15 is a schematic flowchart of a method for determining a center of material handling equipment according to another embodiment of the present disclosure.

FIG. 16 is a schematic flowchart of a method for determining a center of material handling equipment according to still another embodiment of the present disclosure.

FIG. 17 is a schematic flowchart of a method for determining a center of material handling equipment according to yet another embodiment of the present disclosure.

FIG. 18 is a schematic flowchart of a method for determining a first axis coordinate value according to some embodiments of the present disclosure.

FIG. 19 is a schematic structural diagram of material handling equipment according to some embodiments of the present disclosure.

FIG. 20 is a schematic flowchart of a method for determining center coordinates of a second point cloud plane according to some embodiments of the present disclosure.

FIG. 21 is a schematic flowchart of a method for determining wheel point cloud according to some embodiments of the present disclosure.

FIG. 22 is a schematic diagram of rough wheel point cloud according to some embodiments of the present disclosure.

FIG. 23 is a schematic diagram of wheel point cloud according to some embodiments of the present disclosure.

FIG. 24 is a schematic flowchart of a method for determining wheel edge point cloud according to some embodiments of the present disclosure.

FIG. 25 is a schematic structural diagram of a calibration room according to some embodiments of the present disclosure.

FIG. 28 is a schematic structural diagram of a controller according to some embodiments of the present disclosure.

FIG. 29 is a schematic structural diagram of a server according to some embodiments of the present disclosure.

FIG. 30 is a schematic diagram of an arrangement of first markers according to some embodiments of the present disclosure.

FIG. 33 is a schematic flowchart of a calibration method according to some embodiments of the present disclosure.

FIG. 34 is a schematic flowchart of determining a calibration result according to another embodiment of the present disclosure.

FIG. 35 is a schematic diagram of a transformation relationship between coordinate systems according to some embodiments of the present disclosure.

FIG. 36 is a schematic flowchart of a calibration method according to another embodiment of the present disclosure.

FIG. 37 is a schematic flowchart of point cloud registration according to some embodiments of the present disclosure.

FIG. 38 is a schematic flowchart of determining a first transformation relationship according to some embodiments of the present disclosure.

FIG. 39 is a schematic flowchart of determining a fourth transformation relationship according to some embodiments of the present disclosure.

FIG. 40 is a schematic flowchart of determining a calibration result according to another embodiment of the present disclosure.

FIG. 43 is a schematic flowchart of determining a fourth transformation relationship according to another embodiment of the present disclosure.

FIG. 44 is a schematic flowchart of a calibration method according to still another embodiment of the present disclosure.

FIG. 45 is a schematic flowchart of a method for determining a structural parameter according to some embodiments of the present disclosure.

FIG. 46 is a schematic flowchart of a method for determining a structural parameter according to another embodiment of the present disclosure.

FIG. 47 is a schematic flowchart of a method for calibrating an encoder according to some embodiments of the present disclosure.

DETAILED DESCRIPTIONS OF THE EMBODIMENTS

Figure 26:
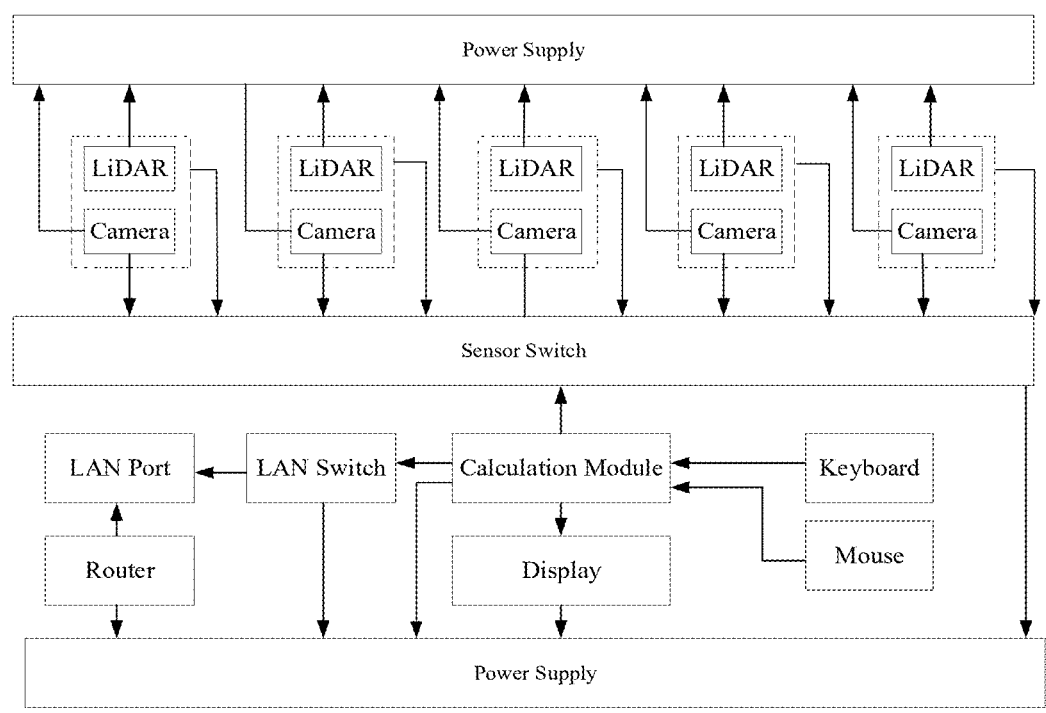
FIG. 26 is a schematic diagram of a connection between a data acquisition module and a calculation module according to some embodiments of the present disclosure.

The following clearly and completely describes the technical solutions in embodiments of the present application with reference to the accompanying drawings in embodiments of the present application. Apparently, the described embodiments are merely some but not all of embodiments of the present application. All other embodiments obtained by persons of ordinary skill in the art based on the embodiments of the present application shall fall within the protection scope of the present application.

Terms used in the embodiments of the present invention are merely intended to describe specific embodiments, but are not intended to limit the present invention. The singular forms of "a/an", "said", and "the" used in embodiments of the present invention and the appended claims are also intended to include plural forms, unless the context clearly implies otherwise.

The term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects. In addition, the term "based on" used in this specification is not limited to being based on an object only. For example, determining B based on A may indicate: determining B directly based on A only, or determining B partially based on A.

Before introducing the embodiments of the present disclosure, professional terms that may be involved in the embodiments of the present disclosure will be illustrated below.

Material handling equipment refers to equipment that is capable of automatically or semi automatically performing handling tasks. Common forms of the material handling equipment include forklifts, Automated Guided Vehicles (AGVs), Autonomous Mobile Robots (AMRs), humanoid robots, Robotic Arms (RA), and the like.

Automated Guided Forklift (AGF) refers to an intelligent industrial vehicle that integrates forklift technology and Automated Guided Vehicle (AGV) technology. It can automatically complete tasks such as material handling and stacking.

A controller refers to a system usually including a processor and a memory at a hardware level. Optionally, the controller may further include an input/output interface, a main board, peripheral circuits and other components. At a software level, the controller usually includes control algorithms, operating systems, communication protocols, and other parts. As used herein, the controller may refer to a set of controllers for performing the same or different tasks.

A pallet refers to a logistics carrier used for bearing goods. A bottom of the pallet is usually provided with an opening for a fork of the material handling equipment to insert, generally called a fork pocket. In addition, the pallet also has a deck board, which may include an upper deck board and a lower deck board. The upper deck board is in contact with the goods, and the lower deck board is in contact with the ground.

A processor is configured to perform core functions such as computation, control and decision-making. It receives data from sensors, executes control algorithms and commands actuators to complete tasks. Common types of the processor include a Central Processing Unit (CPU), a Digital Signal Processor (DSP), a Microcontroller Unit (MCU), and the like. As used herein, the "processor" may refer to a set of processors performing the same or different tasks.

A memory is configured to store data, programs, and the like. As used herein, the "memory" may refer to a set of memories performing the same or different tasks.

In relevant technologies, it is necessary to continuously control the material handling equipment to move and create a map to determine the center of the material handling equipment. Continuous movement of the material handling equipment requires a large space and manual intervention. Additionally, movement of the material handling equipment may introduce errors into the controller and result in poor stability of the surrounding environment, thereby reducing the accuracy of the center determined.

In view to the technical problems aforementioned, embodiments of the present disclosure provide a method for determining a center of material handling equipment, where the material handling equipment includes a fork assembly, a first wheel assembly, and a second wheel assembly, and the method includes: acquiring first point cloud data corresponding to the fork assembly, second point cloud data corresponding to the first wheel assembly, and third point cloud data corresponding to the second wheel assembly; determining, based on the first point cloud data, a first point cloud plane corresponding to the fork assembly; determining, based on the second point cloud data, a second point cloud plane corresponding to the first wheel assembly; determining, based on the third point cloud data, a third point cloud plane corresponding to the second wheel assembly; and determining, based on the first point cloud plane, the second point cloud plane and the third point cloud plane, the center of the material handling equipment.

In the embodiment of the present disclosure, the first point cloud plane, the second point cloud plane, and the third point cloud plane is determined based on the first point cloud data corresponding to the fork assembly, the second point cloud data corresponding to the first wheel assembly, and the fourth point cloud data corresponding to the second wheel assembly. Furthermore, the center of the material handling equipment is determined based on the first point cloud plane, the second point cloud plane and the third point cloud plane. That is to say, by using point cloud data of inherent components on the material handling equipment, the center of the material handling equipment is determined without moving the material handling equipment, so that the material handling equipment remains in a stationary state, and the controller of the material handling equipment and its surrounding environment may keep stable, which reduces the introduction of errors and improves the accuracy of the center determined. In addition, the method do not rely on manual operations, reducing human intervention, thus improving overall operational efficiency, significantly lowering costs, enhancing usability and portability, and being applicable to a wider range of scenarios.

An example is provided to illustrate material handling equipment provided by embodiments of the present disclosure with reference to FIG. 1 in the following.

FIG. 1 is a schematic diagram of a system applicable to material handling equipment according to some embodiments of the present disclosure. As shown in FIG. 1, the application scenario includes material handling equipment 110, a pallet 120, and a cargo 130 placed on the pallet 120.

The material handling equipment includes a main body of the material handling equipment main body 111, a stacking execution component 112, and a controller 113. In the embodiment of the present disclosure, the material handling equipment may include an automated guided forklift, a pallet truck, a hoisting truck, an automated guided vehicle (AGV), an autonomous mobile robot (AMR), a humanoid robot, and the like.

The main body of the material handling equipment main body 111 is provided with a plurality of wheel assemblies. The stacking execution component 112 may be a fork, a robotic arm, or the like. The controller 113 may be a system or device used for computing or controlling on the main body of the material handling equipment 111, such as a control mainboard, a control box, a control unit, an on-board computer, a computing platform, a tablet computer, or a computer; it may also be a system or device for used for computing or controlling in a local server or a cloud server, or other forms such as a handheld controller or a remote controller, which will not be limited in the present disclosure.

In practical applications, the controller 113 is used for controlling the stacking execution component 112 of the material handling equipment 110 to perform operations such as picking and/or stacking of the pallet 120.

In some embodiments, the material handling equipment 110 further includes a sensor module (not shown in the figure). The sensor module may include one or more LiDARs and cameras, which is not limited in the present disclosure.

In other embodiments, the material handling equipment 110 may further include a memory (not shown in the figures), which is mainly configured to store data collected by the lidar, such as point cloud data.

An example will be provided to illustrate multiple implementation of the method for determining a center of the material handling equipment with reference to accompanying drawings.

In the embodiment of the present disclosure, the material handling equipment includes a fork assembly, a first wheel assembly, and a second wheel assembly. The center of the material handling equipment refers to a midpoint between axes of the first wheel assembly and the second wheel assembly.

FIG. 2 is a schematic flowchart of a method for determining a center of the material handling equipment according to some embodiments of the present disclosure. The material handling equipment includes a fork assembly, a first wheel assembly, and a second wheel assembly. As shown in FIG. 2, the method for determining the center of the material handling equipment includes the following steps.

Step S210: acquiring first point cloud data corresponding to the fork assembly, second point cloud data corresponding to the first wheel assembly, and third point cloud data corresponding to the second wheel assembly.

The material handling equipment may be moved to a fixed position in a target environment. The center of the material handling equipment may be used for calibrating a LiDAR to be calibrated on the material handling equipment. Therefore, the target environment may be set as the calibration room for performing calibration operations, so as to further perform the calibration operation on the LiDAR to be calibrated after determining the center of the material handling equipment.

To effectively collect point cloud data of different components on the material handling equipment, a data acquisition module may be disposed on the fork assembly in advance, and the data acquisition module includes at least one LiDAR. FIG. 3 is a schematic layout diagram of a data acquisition module according to another embodiment of the present disclosure. As shown in FIG. 3, the material handling equipment is a forklift, and components to be measured are installed on the forklift body 310. The components to be measured include a first wheel assembly 320, a second wheel assembly 330, and a fork assembly 340. LiDARs are disposed around the forklift body 310 to collect point cloud data of the components to be measured. The installation position of the LiDARs are associated with a detection range of the LiDAR and the positions of the components to be measured, so that the detection range of the LiDAR is capable of cover all the components to be measured, thereby ensuring that the LiDARs can effectively collect the point cloud data of the components to be measured. The LiDAR may be fixed by a bracket.

Exemplarily, there are three brackets fixed on the ground, and a LiDAR is installed on each bracket. For example, a LiDAR 350 is installed facing the fork assembly 340 to collect first point cloud data corresponding to the fork assembly 340; a LiDAR 360 is installed facing the first wheel assembly 320 to collect second point cloud data corresponding to the first wheel assembly 320; a LiDAR 370 is installed facing the second wheel assembly 330 to collect third point cloud data corresponding to the second wheel assembly 330. Furthermore, the first point cloud data, the second point cloud data, and the third point cloud data are all transmitted to the calculation module 380 for calculation.

To facilitate subsequent processing of the point cloud data, calibration of external parameter between the three LiDARs is performed in advance. The first point cloud data, the second point cloud data, and the third point cloud data may be updated based on the calibration result, so that the first point cloud data, the second point cloud data, and the third point cloud data adopt a same coordinate system, thereby ensuring the accuracy and consistency of subsequent processing.

In some embodiments, the first point cloud data, the second point cloud data, and the third point cloud data are original point cloud data collected by a LiDAR of the data acquisition module, or point cloud data obtained after data processing (such as point cloud filtering operations) on the original point cloud data.

Optionally, the first point cloud data may be point cloud data corresponding to a root region of the fork assembly. In practice, the fork assembly is L-shaped and can be divided into a horizontal section and a vertical section. The horizontal section is used for placing goods; and the vertical section, which may also be referred to as the root region, is used for providing supporting force.

Step S220: determining, based on the first point cloud data, a first point cloud plane corresponding to the fork assembly.

The first point cloud data is three-dimensional data of the entire fork assembly in a three-dimensional space. The first point cloud plane corresponding to the fork assembly may be a plane corresponding to an outer surface of the fork assembly.

In some embodiments, point cloud data corresponding to the outer surface of the fork assembly will be extracted from the first point cloud data. Then, the point cloud data corresponding to the outer surface of the fork assembly will be processed using a plane fitting algorithm to obtain the first point cloud plane. For example, the plane fitting algorithm includes methods such as the least squares method and Random Sample Consensus (RANSAC).

Step S230: determining, based on the second point cloud data, a second point cloud plane corresponding to the first wheel assembly.

To determine the second point cloud plane corresponding to the first wheel assembly, point cloud data corresponding to an outer surface of the first wheel assembly is extracted from the second point cloud data. The point cloud data is capable of reflecting a shape of the first wheel assembly. Then, the extracted point cloud data is processed through the plane fitting algorithm to obtain the second point cloud plane. Through this process, the position information of the first wheel assembly in the three-dimensional space may be determined accurately.

Step S240: determining, based on the third point cloud data, a third point cloud plane corresponding to the second wheel assembly.

In some embodiments, point cloud data corresponding to an outer surface of the second wheel assembly may be extracted from the third point cloud data. The point cloud data is capable of reflecting a shape of the second wheel assembly. Then, the extracted point cloud data is processed through the plane fitting algorithm to obtain the third point cloud plane. Through this process, the position information of the second wheel assembly in the three-dimensional space may be determined accurately.

Step S250: determining, based on the first point cloud plane, the second point cloud plane and the third point cloud plane, the center of the material handling equipment.

The first point cloud plane is a plane where the outer surface of the fork assembly is located. The second point cloud plane is a plane where the outer surface of the first wheel assembly is located, and the third point cloud plane is a plane where the outer surface of the second wheel assembly is located.

Since the second point cloud plane and the third point cloud plane are planes corresponding to the outer surfaces of the two wheel assemblies, and the planes corresponding to the outer surfaces of the two wheel assemblies are parallel to each other. The second point cloud plane is parallel to the third point cloud plane. The center of the material handling equipment can be determined by extracting geometric features (such as normal vectors, intersection lines, centers, and plane distances, etc.) of the first point cloud plane, the second point cloud plane, and the third point cloud plane.

In the embodiment of the present disclosure, the first point cloud plane, the second point cloud plane, and the third point cloud plane are determined based on the first point cloud data corresponding to the fork assembly, the second point cloud data corresponding to the first wheel assembly, and the third point cloud data corresponding to the second wheel assembly. Furthermore, the center of the material handling equipment is determined based on the first point cloud plane, the second point cloud plane and the third point cloud plane. That is to say, by using point cloud data of inherent components on the material handling equipment, the center of the material handling equipment is determined without moving the material handling equipment, so that the material handling equipment remains in a stationary state, and the controller of the material handling equipment and its surrounding environment may keep stable, which reduces introduction of errors and improves the accuracy of the center determined. In addition, the method does not rely on manual operations, which reduces human intervention, thus improving overall operational efficiency, significantly lowering costs, enhancing usability and portability, and being applicable to a wider range of scenarios.

To determine each point cloud plane more accurately, a marking tool may be additionally provided on the fork assembly, the first wheel assembly, and the second wheel assembly respectively. The marking tool may be made of a material with high reflectivity, so as to effectively identify the fork assembly, the first wheel assembly, and the second wheel assembly.

An example will be provided to illustrate a specific implementation of an arrangement of a marking tool with reference to FIG. 4 in the following.

FIG. 4 is a schematic arrangement diagram of a marking tool according to some embodiments of the present disclosure. As shown in FIG. 4, the material handling equipment includes a forklift. A marking tool A, a marking tool B, and a marking tool C are disposed on the forklift body 410, the marking tool A is disposed on a mast of the fork assembly 440, where the mast is perpendicular to the ground. The marking tool B and the marking tool C are identical external tools, which are clamped on the first wheel assembly 420 and the second wheel assembly 430 respectively. A first point cloud plane C1 is a plane where the marking tool A is located, and a normal vector of the first point cloud plane C1 is shown as direction a in FIG. 4. The second point cloud plane C2 is a plane where the marking tool B is located, and the third point cloud plane C3 is a plane where the marking tool C is located. The first point cloud plane C1, the second point cloud plane C2, and the third point cloud plane C3 are indicated by dashed lines in FIG. 4, and all of them are perpendicular to the ground.

An example will be provided to illustrate a specific implementation of determining a first point cloud plane with reference to FIG. 5 in the following.

FIG. 5 is a schematic flowchart of a method for determining a first point cloud plane according to some embodiments of the present disclosure. As shown in FIG. 5, in the embodiment of the present disclosure, a marking tool is provided on the fork assembly, and the marking tool includes a first reflective layer. The step of determining the first point cloud plane corresponding to the fork assembly based on the first point cloud data includes the following steps.

Step S510: determining point cloud of the first reflective layer in the first point cloud data.

Step S520: performing plane fitting based on the point cloud of the first reflective layer to obtain the first point cloud plane.

A size, a shape, and an attachment form of the first reflective layer may be set based on characteristics of the fork assembly. Exemplarily, the shape of the first reflective layer may be rectangular or circular. The first reflective layer is made of white foam, which has a characteristic of high reflectivity and can ensure that no laser measurement error is caused by high-reflection distortion. At least one first reflective layer is attached to the fork assembly in advance. During the collection process of the point cloud data, an intensity of laser points of the white foam is higher than an intensity of laser points of other objects such as walls and metal components, facilitating better identification of the fork assembly. The fork assembly includes two forks, and a piece of white foam may be attached to each of the two forks, where the two pieces of white foam are located on a same plane.

Furthermore, the marking tool further includes a magnetic component, a metal bracket, and a level. FIG. 6 is a schematic installation diagram of a marking tool according to some embodiments of the present disclosure. The marking tool may be mounted on the mast of the fork assembly. As shown in FIG. 6, a piece of white foam 610, the metal bracket 620, and the magnetic component 630 are stacked in sequence. The piece of white foam 610 is disposed on an outer layer, the metal bracket 620 is disposed in the middle layer, and the magnetic component 630 is located on an inner layer. The marking tool is magnetically fixed on the mast through the magnetic component 630. The level 640 is located on an upper side of the marking tool, and the attitude of the mast is adjusted according to a detection result of the level 640 to ensure that the mast is in a state perpendicular to the ground.

In some embodiments, the point cloud may be filtered based on an intensity of each laser point in the first point cloud data to obtain the point cloud corresponding to the first reflective layer. For example, each laser point in the first point cloud data is traversed to determine whether an intensity value of the laser point falls within an intensity range. If it does, the laser point is taken as the laser point corresponding to the first reflective layer. The point cloud of the first reflective layer is composed of laser points corresponding to the first reflective layer.

Furthermore, plane fitting is performed on the point cloud of the first reflective layer using a plane fitting algorithm to obtain the first point cloud plane.

In the embodiment of the present disclosure, the first point cloud plane is obtained by plane fitting based on the point cloud of the first reflective layer, which effectively removes the influence of noise and reduces the amount of fitting data. In addition, due to a high intensity of laser point cloud corresponding to the first reflective layer, the fitting accuracy and stability may be improved.

An example will be provided to illustrate a specific implementation of determining the point cloud of the first reflective layer with reference to FIG. 7 in the following.

FIG. 7 is a schematic flowchart of a method for determining a point cloud of a first reflective layer according to some embodiments of the present disclosure.

In the embodiment of the present disclosure, the marking tool further includes a second reflective layer. Reflectivity of the first reflective layer is less than reflectivity of the second reflective layer, and an orthographic projection of the second reflective layer onto a plane where the first reflective layer is located partially covers the first reflective layer, or does not overlap with the first reflective layer. As shown in FIG. 7, the step of determining the point cloud of the first reflective layer in the first point cloud data (step S510) includes the following steps.

Step S710: extracting a point cloud of the second reflective layer from the first point cloud data.

Step S720: determining a centroid of the point cloud of the second reflective layer and determining, based on the centroid, the point cloud of the first reflective layer.

Exemplarily, the second reflective layer includes a reflective film. The second reflective layer may cover the first reflective layer.

In some embodiments, an intensity of laser points of the second reflective layer may be determined based on a reflection characteristic of the material of the second reflective layer. Based on the intensity, the laser points of the second reflective layer are extracted from the first point cloud data.

Furthermore, an average value of coordinates of all laser points in the point cloud of the second reflective layer is determined, and the centroid of the point cloud of the second reflective layer is determined based on the average value. Alternatively, the centroid may be determined based on a clustering result of the point cloud of the second reflective layer.

An example will be provided to illustrate a specific implementation of determining the centroid with reference to FIG. 8 in the following.

FIG. 8 is a schematic flowchart of a method for determining a centroid according to some embodiments of the present disclosure. As shown in FIG. 8, the step of determining a centroid of the point cloud of the second reflective layer (Step S720) includes the following steps.

Step S810: clustering the point cloud of the second reflective layer to obtain a plurality of first clusters.

Exemplarily, a clustering algorithm may be used for clustering the point cloud of the second reflective layer to obtain the plurality of first clusters. For example, the clustering algorithm includes a Density-Based Spatial Clustering of Applications with Noise (DBSCAN) algorithm. The DBSCAN algorithm is a density-based clustering algorithm that can divide regions with a high density into clusters and discover clusters of arbitrary shapes against a background of noise. Through the DBSCAN algorithm, the plurality of first clusters can be obtained, and each first cluster includes a plurality of points.

Step S820: generating a plurality of target planes corresponding to the plurality of first clusters based on the plurality of first clusters and removing, based on a normal vector of each target planes, a first cluster without meeting a condition from the plurality of first clusters to obtain a second clusters.

In some embodiments, for each first cluster, a plane fitting algorithm is used for fitting a target plane corresponding to the first cluster based on laser points in the first cluster, and a normal vector corresponding to each target plane is determined. The normal vector reflects an orientation of the target plane. Since the orientation of the fork assembly is fixed, normal vector of a plane to which the fork assembly belongs satisfies an angle condition. For example, an included angle between the normal vector of the plane of the fork assembly and a reference plane is greater than included angle threshold. Based on this, a condition that the included angle between the normal vector of the target plane and the reference plane is greater than the included angle threshold may be used as a filtering condition to obtain a first cluster that meet this condition as a second cluster, thereby eliminating clusters corresponding to noise. Exemplarily, the reference plane may be a plane located by a Z-axis and a Y-axis.

Step S830: calculating, based on the second clusters, the centroid of the point cloud of the second reflective layer.

In some embodiments, the centroid of the point cloud corresponding to the second cluster may be determined, and this centroid is taken as the centroid of the point cloud of the second reflective layer.

In the embodiment of the present disclosure, point cloud clustering is performed and clusters are removed based on normal vectors to filter out noise points that do not meet the condition. In addition, the centroid is determined based on the clusters after removing the noise points, which avoids an impact of noise on the calculation result and improves the accuracy of the calculation result.

An example will be provided to illustrate a specific implementation of determining a point cloud of the first reflective layer based on the centroid with reference to FIG. 9 in the following.

FIG. 9 is a schematic flowchart of a method for determining a point cloud of a first reflective layer according to some embodiments of the present disclosure. As shown in FIG. 9, the determining the point cloud of the first reflective layer based on the centroid includes the following steps.

Step S910: determining, based on the centroid, a target region corresponding to the first reflective layer.

Exemplarily, the target region corresponding to the first reflective layer may be determined based on the centroid and a size of the first reflective layer. For example, if the first reflective layer is rectangular, the target region is a rectangular region centered at the centroid, with a length and a width being equal to those of the first reflective layer respectively.

Step S920: extracting, based on the target region, the point cloud of the first reflective layer.

Optionally, laser points located within the target region are filtered from the first point cloud data, and these laser points are taken as the point cloud of the first reflective layer. In this way, the point cloud of the first reflective layer can be accurately obtained, providing accurate data for subsequent plane fitting.

In the embodiment of the present disclosure, the second reflective layer further improves filtering accuracy of point cloud data. Since the reflectivity of the second reflective layer is higher than the reflectivity of the first reflective layer, the points of the second reflective layer is more prominent in intensity, facilitating quick identification and extraction. Therefore, interference from noise points may be effectively avoided, thereby improving accuracy and stability of plane fitting.

An example will be provided to illustrate a specific implementation of determining a second point cloud plane with reference to FIG. 10 in the following.

FIG. 10 is a schematic flowchart of a method for determining a second point cloud plane according to some embodiments of the present disclosure. As shown in FIG. 10, in the embodiment of the present disclosure, a marking tool is provided on the first wheel assembly, and the marking tool includes a first reflective layer. The step of determining, based on the second point cloud data, a second point cloud plane corresponding to the first wheel assembly includes the following steps.

Step S1010: determining point cloud of the first reflective layer in the second point cloud data.

Step S1020: performing plane fitting based on the point cloud of the first reflective layer to obtain the second point cloud plane.

A size, a shape, and an attachment form of the first reflective layer may be set based on characteristics of the first wheel assembly. Exemplarily, the first reflective layer is made of white foam. The shape of the first reflective layer may be a circular ring, which fits closely with the wheel of the first wheel assembly. Alternatively, a plurality of first reflective layers of a same shape may be attached to the wheel of the first wheel assembly, with the plurality of first reflective layers distributed at equal distances. For example, the first reflective layer is circular or triangular. The marking tool provided on the first wheel may further include a magnetic component and a metal bracket.

FIG. 11 is a schematic installation diagram of a marking tool according to another embodiment of the present disclosure. As shown in FIG. 11, the marking tool includes a piece of white foam 1110, a metal bracket 1120, and a magnetic component 1130 stacked in sequence. The white foam 1110 is disposed on an outer layer, the metal bracket 1120 is disposed in the middle layer, and the magnetic component 1130 is located on an inner layer. The marking tool is magnetically fixed on the first wheel assembly through the magnetic component 1130.

FIG. 12 is a schematic diagram of a first reflective layer according to some embodiments of the present disclosure. As shown in FIG. 12, the first reflective layer A1 is circular, and five first reflective layers A1 are distributed at equal intervals on the wheel of the first wheel assembly.

FIG. 13 is a schematic diagram of a first reflective layer according to another embodiment of the present disclosure. As shown in FIG. 13, the first reflective layer A1 is triangular, and five first reflective layers A1 are distributed at equal intervals on the wheel of the first wheel assembly.

In some embodiments, each laser point in the second point cloud data is traversed to determine whether an intensity value of the laser point falls within an intensity range. If it does, the laser point is taken as a laser corresponding to the first reflective layer. The point cloud of the first reflective layer is composed of laser points corresponding to the first reflective layer.

Furthermore, plane fitting is performed on the point cloud of the first reflective layer using a plane fitting algorithm to obtain the second point cloud plane.

In the embodiment of the present disclosure, the second point cloud plane is obtained by plane fitting based on the point cloud of the first reflective layer, effectively removing the influence of noise and reducing an amount of fitting data. In addition, due to a high intensity of the laser points of the first reflective layer, fitting accuracy and stability may be improved.

An example will be provided to illustrate a specific implementation of determining the point cloud of the first reflective layer with reference to FIG. 14 in the following.

FIG. 14 is a schematic flowchart of a method for determining a point cloud of a first reflective layer according to some embodiments of the present disclosure. As shown in FIG. 14, the marking tool further includes a second reflective layer. Reflectivity of the first reflective layer is less than reflectivity of the second reflective layer, and an ortho-graphic projection of the second reflective layer onto a plane where the first reflective layer is located partially covers the first reflective layer, or does not overlap with the first reflective layer. The step of determining the point cloud of the first reflective layer in the second point cloud data includes the following steps.

Step S1410: extracting a point cloud of the second reflective layer from the second point cloud data.

Step S1420: determining a centroid of the point cloud of the second reflective layer and determining, based on the centroid, the point cloud of the first reflective layer.

Exemplarily, the second reflective layer includes a reflective film, and the second reflective layer may be attached to a wheel center of the first wheel assembly to distinguish the wheel from the wheel center and quickly determine the wheel center.

In some embodiments, an intensity of laser points of the second reflective layer may be determined based on a reflection characteristic of the material of the second reflective layer. Based on the intensity, the laser points of the second reflective layer are extracted from the second point cloud data.

Optionally, the step of determining the centroid of the point cloud of the second reflective layer includes: clustering the point cloud of the second reflective layer extracted from the second point cloud data to obtain third clusters; generating a plurality of target planes corresponding to the plurality of third clusters based on the plurality of third clusters, and removing, based on a normal vector of each target plane, a third cluster without meeting a condition from the plurality of third clusters to obtain a fourth cluster; and calculating, based on the fourth cluster, the centroid of the point cloud of the second reflective layer.

Further, the step of determining, based on the centroid, the point cloud of the first reflective layer includes: determining, based on the centroid, a target region corresponding to the first reflective layer; and extracting, based on the target region, the point cloud of the first reflective layer.

Thus, the point cloud of the first reflective layer may be accurately obtained, providing accurate data for subsequent plane fitting.

An example will be provided to illustrate a specific implementation of the center of the material handling equipment with reference to FIGS. 15 and 16 in the following.

FIG. 15 is a schematic flowchart of a method for determining a center of material handling equipment according to another embodiment of the present disclosure. The embodiment shown in FIG. 15 is extended from the embodiment shown in FIG. 2. The following focuses on describing a difference between the embodiments shown in FIG. 15 and FIG. 2, and the similarities will not be described.

As shown in FIG. 15, in the embodiment of the present disclosure, the step of determining, based on the first point cloud plane, the second point cloud plane and the third point cloud plane, the center of the material handling equipment includes the following steps.

Step S1510: determining a normal vector of the first point cloud plane, center coordinates of the second point cloud plane and center coordinates of the third point cloud plane.

In some embodiments, the normal vector of the first point cloud plane is determined based on coefficients of a plane equation of the first point cloud plane. The normal vector of the first point cloud plane is perpendicular to the first point cloud plane and indicates an orientation of the first point cloud plane. The center coordinates of the second point cloud plane are obtained by calculating arithmetic mean values of coordinates of all points in the second point cloud plane. The center coordinates of the third point cloud plane are obtained by calculating arithmetic mean values of coordinates of all points in the third point cloud plane.

Step S1520: determining, based on the normal vector of the first point cloud plane, the center coordinates of the second point cloud plane and the center coordinates of the third point cloud plane, the center of the material handling equipment.

In some embodiments, a midpoint of a line connecting the center coordinates of the second point cloud plane and the center coordinates of the third point cloud plane is firstly calculated, and then the midpoint is taken as the center of the material handling equipment. Furthermore, to more accurately determine the center of the material handling equipment, the midpoint of the line may be adjusted in combination with the first point cloud plane, and the adjusted midpoint is determined as the coordinates of the center of the material handling equipment.

Furthermore, pose information of the material handling equipment in a three-dimensional space is determined based on the normal vector of the first point cloud plane.

In the embodiment of the present disclosure, the center of the material handling equipment is determined based on the normal vector of the first point cloud plane, the center coordinates of the second point cloud plane and the center coordinates of the third point cloud plane. Accuracy and robustness of center determination are improved based on the structural correlation between the fork assembly and the wheel assembly.

FIG. 16 is a schematic flowchart of a method for determining a center of material handling equipment according to yet still another embodiment of the present disclosure. The embodiment shown in FIG. 16 is extended from the embodiment shown in FIG. 15. The following focuses on describing a difference between the embodiments shown in FIG. 16 and FIG. 15, and the similarities will not be described.

In the embodiment of the present disclosure, the center of the material handling equipment includes coordinates of the center of the material handling equipment, a yaw angle, a pitch angle and a roll angle of the material handling equipment. As shown in FIG. 16, the step of determining, based on the normal vector of the first point cloud plane, the center coordinates of the second point cloud plane and the center coordinates of the third point cloud plane, the center of the material handling equipment (Step S1520) includes the following steps.

Step S1610: determining, based on the second point cloud plane and the third point cloud plane, a fourth point cloud plane.

Referring to FIG. 4 again, the fourth point cloud plane C4 is parallel to the second point cloud plane C2 and the third point cloud plane C3, and perpendicular to the ground. A distance from the fourth point cloud plane C4 to the second point cloud plane C2 is equal to a distance from the fourth point cloud plane C4 to the third point cloud plane C3. The fourth point cloud plane C4 can be regarded as a midplane between the second point cloud plane C2 and the third point cloud plane C3.

In some embodiments, since the second point cloud plane C2 is parallel to the third point cloud plane C3, the distance between the second point cloud plane C2 and the third point cloud plane C3 may be calculated, and the midpoint position of the distance is determined. Then the fourth point cloud plane C4 parallel to both the second point cloud plane C2 and the third point cloud plane C3 is constructed based on this midpoint position.

Step S1620: determining an intersection line between the first point cloud plane and a fifth point cloud plane.

The fifth point cloud plane is determined based on point cloud data of a plane carrying the material handling equipment, that is, the fifth point cloud plane represents the plane carrying the material handling equipment.

Exemplarily, the plane carrying the material handling equipment may be the ground, a warehouse floor, or the like. When the material handling equipment is stationary, point cloud data of the plane carrying the material handling equipment may be collected by a data acquisition device such as a LiDAR, to obtain the fifth point cloud plane.

The first point cloud plane C1 is perpendicular to the fifth point cloud plane, and the two intersect at an intersection line L. With reference to FIG. 4, the intersection line L coincides with a dashed line representing the first point cloud plane C1.

Step S1630: determining an intersection point between the fourth point cloud plane and the intersection line.

The fourth point cloud plane C4 intersects with the intersection line L at point P.

Step S1640: determining, based on a normal vector of the first point cloud plane, the yaw angle of the material handling equipment.

In some embodiments, a projection direction of the normal vector of the first point cloud plane on the horizontal plane is taken as the orientation of the material handling equipment, and then the yaw angle of the material handling equipment may be determined. The yaw angle represents a rotation angle of the material handling equipment around a vertical axis (Z-axis) and reflects the orientation information of the material handling equipment on the horizontal plane.

Step S1650: determining, based on a normal vector of the fifth point cloud plane, the pitch angle and the roll angle of the material handling equipment.

In some embodiments, a rotation angle of the normal vector of the fifth point cloud plane around the Y-axis is taken as the pitch angle of the material handling equipment. A rotation angle of the normal vector of the fifth point cloud plane around the X-axis is taken as the roll angle of the material handling equipment. The pitch angle reflects tilt of the material handling equipment in the X-Z plane; and the roll angle reflects tilt of the material handling equipment in the Y-Z plane. The yaw angle, the pitch angle and the roll angle of the material handling equipment are determined with reference to a world coordinate system.

Step S1660: determining, based on the intersection point, the center coordinates of the second point cloud plane and the center coordinates of the third point cloud plane, the coordinates of the center of the material handling equipment.

In some embodiments, the midpoint of the line connecting the center coordinates of the second point cloud plane and the center coordinates of the third point cloud plane is firstly calculated, and then this midpoint is taken as the center of the material handling equipment. With reference to FIG. 4, the center of the material handling equipment is denoted as CP. Furthermore, to more accurately determine the center of the material handling equipment, the midpoint of the line may be adjusted in combination with the intersection point between the fourth point cloud plane and the intersection line, and the adjusted midpoint is determined as the coordinates of the center of the material handling equipment.

Furthermore, the center of the material handling equipment may be combined with the direction a in FIG. 4 to establish a self-coordinate system with the center of the material handling equipment as the origin.

In the embodiment of the present disclosure, a more stable reference plane for determining the center of the material handling equipment is determined based on the fourth point cloud plane, so that the coordinates of the center of the material handling equipment may be accurately determined. In addition, by determining the yaw angle, the pitch angle and the roll angle of the material handling equipment, an accurate description of a pose of the material handling equipment in three-dimensional space is achieved.

FIG. 17 is a schematic flowchart of a method for determining a center of material handling equipment according to yet another embodiment of the present disclosure. The embodiment shown in FIG. 17 is extended from the embodiment shown in FIG. 16. The following focuses on describing a difference between the embodiments shown in FIG. 17 and FIG. 36, and the similarities will not be described.

As shown in FIG. 17, in the embodiment of the present disclosure, the step of determining, based on the intersection point, the center coordinates of the second point cloud plane and the center coordinates of the third point cloud plane, the coordinates of the center of the material handling equipment (Step S1660) includes the following steps.

Step S1710: determining, based on the intersection point and the yaw angle, a first axis coordinate value of the center of the material handling equipment.

The first axis coordinate value represents a coordinate value corresponding to the center of the material handling equipment on the Y-axis.

An example will be provided to illustrate a specific implementation of determining the first axis coordinate value of the center of the material handling equipment with reference to FIG. 18 in the following.

FIG. 18 is a schematic flowchart of a method for determining a first axis coordinate value according to some embodiments of the present disclosure. The embodiment shown in FIG. 18 is extended from the embodiment shown in FIG. 17. The following focuses on describing a difference between the embodiments shown in FIG. 18 and FIG. 17, and the similarities will not be described.

As shown in FIG. 18, in the embodiment of the present disclosure, the step of determining, based on the intersection point and the yaw angle, the first axis coordinate value of the center of the material handling equipment (Step S1710) includes the following steps.

Step S1810: acquiring, based on a sine value of the yaw angle and a target distance value, a first value.

As shown in FIG. 19, based on a size and structure of the material handling equipment, a distance from an outer surface of the fork assembly to the center CP of the material handling equipment may be determined, and this distance is taken as a distance from the first point cloud plane C1 to the center CP of the material handling equipment, i.e., the target distance value K.

Exemplarily, a product of the target distance value K and the sine value of the yaw angle yaw_c is calculated to obtain the first value, denoted as K*sin (yaw_c).

Step S1820: acquiring, based on a first axis coordinate value of the intersection point and the first value, a second value.

With reference to FIG. 4, specifically, the coordinates of the intersection point P are denoted as (px, py, pz), and the first axis coordinate value of the intersection point P is py.

Step S1830: acquiring, based on the first value and the second value, the first axis coordinate value of the center of the material handling equipment.

The target distance value is a value of the distance from the first point cloud plane to the center of the material handling equipment.

Exemplarily, a difference obtained by subtracting the first value from the first axis coordinate value of the intersection point P is taken as the second value. The second value is used as the first axis coordinate value of the center of the material handling equipment, denoted as y_c, i.e., y_c=py-K*sin (yaw_c).

In the embodiment of the present disclosure, a method for determining the first axis coordinate value of the center of the material handling equipment is provided. By introducing the target distance value and combining it with the sine value of the yaw angle for calculation, an adjustment amount can be obtained. Based on this adjustment amount, the first axis coordinate value of the center of the material handling equipment is accurately obtained. The actual structural characteristics of the material handling equipment are fully considered, ensuring the accuracy and reliability of the coordinate value of the center of the material handling equipment.

Step S1720: determining, based on the center coordinates of the second point cloud plane and the center coordinates of the third point cloud plane, a second axis coordinate value of the center of the material handling equipment.

The second axis coordinate value represents a coordinate value corresponding to the center of the material handling equipment on the X-axis. The second point cloud plane and the third point cloud plane correspond to the two wheel assemblies of the material handling equipment respectively, and the corresponding coordinate values of the two wheel assemblies on the X-axis are basically equal. Therefore, in some embodiments, values of coordinates of the center coordinates of the second point cloud plane or the third point cloud plane on the X-axis may be taken as the second axis coordinate value of the center of the material handling equipment.

Specifically, the step of determining, based on the center coordinates of the second point cloud plane and the center coordinates of the third point cloud plane, the second axis coordinate value of the center of the material handling equipment includes: determining an average value of a second axis coordinate value of the center coordinates of the second point cloud plane and a second axis coordinate value of the center coordinates of the third point cloud plane as the second axis coordinate value of the center of the material handling equipment.

With reference to FIG. 4, the center coordinates of the second point cloud plane C2 are denoted as (Rx, Ry), and the center coordinates of the third point cloud plane C3 are denoted as (Lx, Ly).

To minimize errors, the average value of the second axis coordinate value of the center coordinates of the second point cloud plane C2 and the second axis coordinate value of the center coordinates of the third point cloud plane C3 may be taken as the second axis coordinate value, denoted as x_c, of the center of the material handling equipment, where x_c=(Lx+Rx)/2. Thus, the center position of the material handling equipment in the X-axis direction can be determined more accurately, improving the accuracy of the coordinate value of the center of the material handling equipment.

Step S1730: determining, based on the first axis coordinate value, the second axis coordinate value and the fifth point cloud plane, a third axis coordinate value of the center of the material handling equipment.

The third axis coordinate value represents a value of coordinate on the Z-axis corresponding to the center of the material handling equipment. Referring to FIG. 39 again, the fifth point cloud plane C5 is determined based on the point cloud of the plane carrying the material handling equipment, and the material handling equipment is in contact with this plane. Therefore, the third axis coordinate value, denoted as z_c, of the center of the material handling equipment can be determined based on the coordinate value of the fifth point cloud plane C5 on the Z-axis.

The embodiment of the present disclosure provides a method of determining the coordinates of the center of the material handling equipment, which can effectively and accurately determine the coordinate values of the center of the material handling equipment corresponding to three different axial directions.

In some embodiments, the step of determining, based on the first axis coordinate value, the second axis coordinate value and the fifth point cloud plane, the third axis coordinate value of the center of the material handling equipment includes: substituting the first axis coordinate value and the second axis coordinate value into a plane equation of the fifth point cloud plane to obtain the third axis coordinate value of the center of the material handling equipment.

Exemplarily, the plane equation of the fifth point cloud plane C5 is Ax+By+Cz+D=0, where A, B, C, and D are all parameters determined based on the point cloud of the plane carrying the material handling equipment. Substitute the aforementioned first axis coordinate value y_c and second axis coordinate value x_c into the plane equation to obtain Ax_c+By_c+Cz+D=0, and take the solved z value as the third axis coordinate value z_c.

After determining the first axis coordinate value y_c, the second axis coordinate value x_c and the third axis coordinate value z_c of the center of the material handling equipment, the coordinates of the center CP of the material handling equipment, denoted as (x_c, y_c, z_c), can be determined.

Furthermore, the coordinates of the center CP of the material handling equipment may also include the yaw angle yaw_c, the pitch angle pitch_c and the roll angle roll_c determined in the above steps, i.e., the coordinates of the center CP of the material handling equipment is (x_c, y_c, z_c, roll_c, pitch_c, yaw_c), so as to improve the accuracy of the subsequent calibration process.

Optionally, after substituting the first-axis coordinate value y_c and the second-axis coordinate value x_c into the plane equation of the fifth point cloud plane C5, the coordinate value on the Z-axis of a mapping point corresponding to the center of the material handling equipment on the plane carrying the material handling equipment is obtained. The third axis coordinate value z_c of the center of the material handling equipment is determined based on the radius of the wheel assembly of the material handling equipment and the coordinate value of this mapping point on the Z-axis. Exemplarily, a value obtained by adding the radius to the coordinate value of the mapping point on the Z-axis is taken as the third axis coordinate value of the center of the material handling equipment.

In the embodiment of the present disclosure, the third-axis coordinate value of the center of the material handling equipment may be determined based on the fifth point cloud plane and the radius of the wheel assembly of the material handling equipment, further improving accuracy of determination of the coordinate value of the center of the material handling equipment.

In the process of determining the center of the material handling equipment, the center coordinates of the second point cloud plane are used. An example will be provided to illustrate a specific implementation of determining the center coordinates of the second point cloud plane with reference to FIG. 20 in the following.

FIG. 20 is a schematic flowchart of a method for determining center coordinates of a second point cloud plane according to some embodiments of the present disclosure. As shown in FIG. 20, in the embodiment of the present disclosure, the step of determining the center coordinates of the second point cloud plane includes the following steps.

Step S2010: cropping, based on the second point cloud plane and a wheel radius of the first wheel assembly, the second point cloud data to obtain wheel point cloud of the first wheel assembly.

Referring to FIG. 19 again, the wheel point cloud of the first wheel assembly is the point cloud data in the second point cloud data corresponding to the outer surface of the first wheel assembly A2.

The second point cloud data is the point cloud data obtained by collecting the entire first wheel assembly, including, for example, point cloud data of parts such as an outer surface, an inner surface, and a wheel rim of the first wheel assembly. It can be seen that there is point cloud data, that is irrelevant to the second point cloud plane, in the second point cloud data. To reduce the amount of calculation and improve the accuracy of the center coordinates, it is necessary to crop the second point cloud data.

An example will be provided to illustrate a specific implementation of determining the wheel point cloud of the first wheel assembly with reference to FIG. 21 in the following.

FIG. 21 is a schematic flowchart of a method for determining point cloud of a wheel according to some embodiments of the present disclosure. As shown in FIG. 21, in the embodiment of the present disclosure, the step of cropping, based on the second point cloud plane and the wheel radius of the first wheel assembly, the second point cloud data to obtain wheel point cloud of the first wheel assembly include the following steps.

Step S2110: cropping the second point cloud data to obtain laser points, lying on the second point cloud plane, of the second point cloud data as target point cloud.

With reference to FIGS. 4 and 19, each laser point in the second point cloud data is traversed to determine whether the laser point is located on the second point cloud plane C2. If yes, the laser point may be reserved and taken as a point in the target point cloud. Exemplarily, a first reflective layer is attached to the wheel of the first wheel assembly, and the determination of whether a laser point is located on the second point cloud plane C2 may be performed based on an intensity of the laser point. For example, if an intensity of a laser point falls within an intensity range corresponding to the first reflective layer, the laser point may be determined to be located on the second point cloud plane C2; otherwise, it means that the point does not belong to the second point cloud plane C2.

Step S2120: cropping the target point cloud based on the wheel radius of the first wheel assembly to obtain a rough wheel point cloud.

The target point cloud includes points corresponding to the outer surface of the first wheel assembly, as well as noise points outside the outer surface. To remove the noise points, it is necessary to further crop the target point cloud based on the wheel radius. Exemplarily, a second reflective layer is attached to the wheel center of the first wheel assembly; then, based on high reflection of the second reflective layer, a point cloud of high reflection is extracted from the target point cloud. Moreover, points in the target point cloud that are at a distance greater than the wheel radius from the center point of the high reflection points cloud are removed, and the rough wheel point cloud is obtained.

Furthermore, to minimize errors, the target point cloud can be cropped based on a cropping radius larger than the wheel radius to obtain point cloud corresponding to the complete wheel surface. In some embodiments, the step of cropping the target point cloud based on the wheel radius of the first wheel assembly to obtain the rough wheel point cloud includes: adding the wheel radius of the first wheel assembly to a target value to obtain a new wheel radius, and cropping the target point cloud based on the new wheel radius to obtain the rough wheel point cloud.

Specifically, if the wheel radius is r and the target value is m, the new wheel radius is r+m. Exemplarily, the target value may range from 2 cm to 5 cm.

FIG. 22 is a schematic diagram of rough point cloud of a wheel according to some embodiments of the present disclosure. As shown in FIG. 22, taking the new wheel radius as the cropping radius, a point cloud which are at a distance less than or equal to the cropping radius from the wheel axis of the first wheel assembly in the target point cloud are taken as the rough wheel point cloud.

In the embodiment of the present disclosure, cropping errors are taken into account, and the target point cloud is cropped based on a cropping radius larger than the wheel radius, ensuring that the obtained rough wheel point cloud contains the complete wheel surface and avoiding the loss of valid data.

Step S2130: filtering, based on a normal vector of each laser point in the rough wheel point cloud, laser points in the rough wheel point cloud to obtain wheel point cloud of the first wheel assembly.

Since all laser points corresponding to the wheel surface are located on the second point cloud plane, the directions of normal vectors of the laser points on the wheel surface are consistent. Thus, based on the normal vector of each point in the rough wheel point cloud, the noise point in the rough wheel point cloud can be filtered out to obtain an accurate wheel point cloud.

In some embodiments, the step of filtering, based on the normal vector of each laser point in the rough wheel point cloud, the laser points in the rough wheel point cloud to obtain the wheel point cloud of the first wheel assembly includes: acquiring laser points with a normal vector angle greater than a target angle in the rough wheel point cloud by filtering to obtain the wheel point cloud of the first wheel assembly.

The normal vector angle refers to an included angle between the normal vector of the point and the second point cloud plane. The normal vector of a laser point on the wheel surface is perpendicular to the wheel surface. Based on this, the points that belong to the wheel surface in the rough wheel point cloud may be obtained by filtering.

In the embodiment of the present disclosure, since the normal vector angle is less than or equal to 90 degrees, the target angle is set to be less than 90 degrees. Exemplarily, the target angle is 75 degrees. The points whose normal vector angle is greater than 75 degrees are taken as points in the wheel point cloud of the first wheel assembly, while the points whose normal vector angle is less than or equal to 75 degrees are excluded to eliminate the noise.

FIG. 23 is a schematic diagram of a point cloud of a wheel according to some embodiments of the present disclosure. As shown in FIG. 23, through the above steps, the laser points, whose normal vector angle is greater than the target angle, in the rough wheel point cloud are obtained by filtering, and the wheel point cloud of the first wheel assembly is obtained. The shape of this wheel point cloud is more consistent with an actual shape of the wheel.

In the embodiment of the present disclosure, by cropping the point cloud data in the second point cloud plane and retaining only the wheel point cloud of the first wheel assembly, the noise irrelevant to the wheel is eliminated, and the complexity and computational load of subsequent processing are reduced. Furthermore, based on the characteristic that the normal vector of the point on the wheel surface is perpendicular to the wheel surface, the wheel point cloud is filtered out, ensuring the accuracy of the point cloud.

Step S2020: determining, based on the wheel point cloud of the first wheel assembly, wheel edge point cloud data of the first wheel assembly.

In some embodiments, the points in the outermost circle of the wheel point cloud are taken as the wheel edge point cloud. Exemplarily, plane fitting is performed on the wheel point cloud to obtain a fitted surface of the wheel. Then, the outer edge of the wheel is determined based on the fitted surface, and the laser points on the outer edge are taken as the wheel edge point cloud. Referring to FIGS. 22 and 23 again, the outer edge of the wheel determined based on the fitted surface is R1.

An example will be provided to illustrate another method for determining the wheel edge point cloud with reference to FIG. 24 in the following.

FIG. 24 is a schematic flowchart of a method for determining a point cloud of a wheel edge according to some embodiments of the present disclosure. As shown in FIG. 24, in the embodiment of the present disclosure, the step of determining, based on the wheel point cloud of the first wheel assembly, the wheel edge point cloud of the first wheel assembly includes the following steps.

Step S2410: acquiring rough wheel edge point cloud based on the wheel point cloud of the first wheel assembly and the wheel radius of the first wheel assembly.

In the embodiment of the present disclosure, points with distances less than the wheel radius from the wheel axis of the first wheel assembly are removed from the wheel point cloud, and the remaining laser points are used as the rough wheel edge point cloud.

Step S2420: performing circle fitting based on the rough wheel edge point cloud to obtain the wheel edge point cloud.

Since the outer edge of the wheel is approximately circular, circle fitting can be performed on the rough wheel edge point cloud to obtain a more accurate wheel edge point cloud. During the circle fitting process, fitting algorithms such as the least squares method and RANSAC can be used to make the fitted circle closely match the actual wheel edge as much as possible, thereby improving the accuracy of the wheel edge point cloud.

The least squares circle fitting is a method used for fitting a given set of points to a circle. Its goal is to find parameters (such as center coordinates and radius) of a circle corresponding to which the sum of the squares of the distances from these points to the circle is minimized.

A core idea of RANSAC circle fitting is to select a small subset of points from a given point set as samples through random sampling, assuming these sample points are inliers that conform to the model, and then estimate the model parameters based on these inliers. Next, the estimated model is used to test the remaining points, and the number of points whose errors fall within a certain threshold range is calculated—these points are regarded as inliers. By repeating this process several times, the model estimation with the largest number of inliers is selected as the final result, thereby eliminating the interference of outliers and achieving more accurate circle fitting.

In the embodiment of the present disclosure, the wheel edge point cloud obtained through circle fitting can more accurately reflect a shape and a position of the wheel, providing a more reliable data basis for the subsequent determination of the center of the material handling equipment.

Step S2030: acquiring a rough wheel center of the first wheel assembly.

In some embodiments, a second reflective layer is attached to the wheel center of the first wheel assembly; then, based on high reflection of the second reflective layer, a point cloud of high reflection are extracted from the target point cloud. The center of the point cloud of high reflection is determined to be the rough wheel center.

Step S2040: performing, based on the wheel edge point cloud, the wheel radius and the rough wheel center of the first wheel assembly, at least one iterative calculation to obtain a center of the first wheel assembly.

Step S2050: determining coordinates of the center of the first wheel assembly to be the center coordinates of the second point cloud plane.

The embodiment of the present disclosure provides an implementation method for determining the center coordinates of the second point cloud plane, which can effectively and accurately determine the center coordinates of the second point cloud plane; when determining the wheel center, multiple iterations are used for improving the accuracy and reliability of the calculation results. In addition, in the process of determining the center of the material handling equipment, the noise points are effectively removed and the valid points are retained through reasonable cropping, filtering, and fitting processes, further improving the accuracy and efficiency of center coordinate determination.

The method for determining a center of material handling equipment provided in the present disclosure can be implemented in a calibration room provided in the following embodiments. Of course, the method can also be implemented in other scenarios besides the calibration room, which is not specifically limited in the present disclosure.

An example of a structure of the calibration room will be illustrated with reference to the accompanying drawings in the following.

FIG. 25 is a schematic structural diagram of a calibration room according to some embodiments of the present disclosure. As shown in FIG. 25, the calibration room includes: a main body of the calibration room 2510, configured to accommodate an material handling equipment 2520; a data acquisition module 2530, disposed in the main body of the calibration room 2510, where the data acquisition module 2530 includes a LiDAR and a detection range of the data acquisition module 2530 covers the material handling equipment 2520; and a calculation module 2540, connected to the data acquisition module 2530, where the calculation module 2540 is configured to calibrate the material handling equipment 2520 based on detection data of the data acquisition module 2530.

The main body of the calibration room 2510 is an enclosed space configured to accommodate the material handling equipment 2520, and may be of various shapes. Exemplarily, the main body of the calibration room 2510 may be constructed as a rectangular enclosed structure, with minimum dimensions of 4.5 meters in width, 7 meters in length, and 2.5 meters in height.

The data acquisition module 2530 includes at least one LiDAR, and a quantity of the LiDAR may be determined based on a field of view of the LiDAR. Exemplarily, a measuring distance of the LiDAR ranges from 1.2 meters to 1.5 meters, and a detection range of the data acquisition module 2530 composed of the LiDAR needs to cover the material handling equipment 2520, so as to ensure that complete information of the material handling equipment 2520 may be collected.

The dimensions of the main body of the calibration room 2510 are determined based on a type of the material handling equipment 2520 and a measurement distance of the data acquisition module 2530. Specifically, the material handling equipment 2520 may include various types, such as a high-mast forklift, a long-fork forklift, and so on. Different types of the material handling equipment 2520 have different dimensions. To be adapted to different types of the material handling equipment 2520, the dimensions of the main body of the calibration room 2510 may be set corresponding to the dimensions of the material handling equipment 2520. In addition to reserving sufficient space for the material handling equipment 2520, it is also necessary to consider the field of view and the measurement distance of the data acquisition module 2530 to ensure that the detection range of the data acquisition module 2530 can fully cover the material handling equipment 2520. For example, the main body of the calibration room 210 may be set to 5.5 meters in width, 8 meters in length, and 4 meters in height.

Furthermore, the data acquisition module 2530 may further include a camera, which works in conjunction with the LiDAR to detect the main body of the calibration room 2510 and the material handling equipment 2520.

Figure 31:
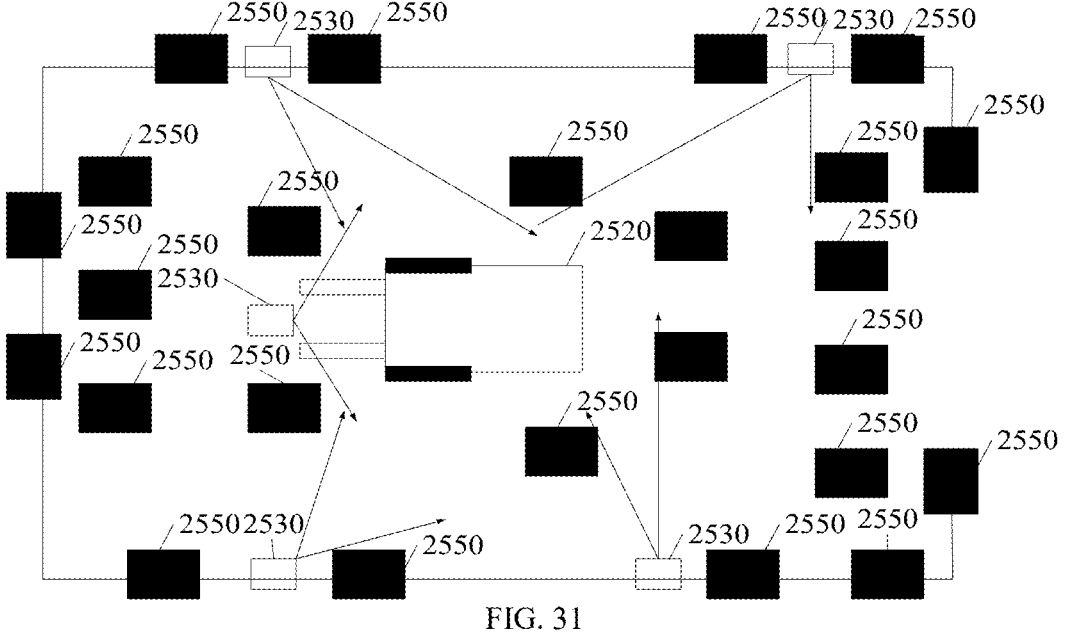
FIG. 31 is a schematic layout diagram of a calibration room according to some embodiments of the present disclosure.

With reference to FIG. 31, in some embodiments, a quantity of the data acquisition modules 2530 may be greater than one, and a plurality of data acquisition modules 2530 are disposed around the material handling equipment 2520, so that the detection range formed by the plurality of data acquisition modules 2530 covers the material handling equipment 2520. For example, when the material handling equipment 2520 is a forklift, five LiDARs (i.e., five data acquisition modules 2530) are provided in the main body, disposed respectively in an area in front of forks of the forklift, areas opposite wheel assemblies of the forklift on both sides, and areas on both sides of a head of the vehicle, for implementing functions such as pose detection of the fork, wheel positioning, and dimensional measurement of a vehicle body. By providing the plurality of data acquisition modules 2530, automatic registration and external parameter calculation between main and auxiliary navigation LiDARs, and main and auxiliary handling LiDARs may be achieved.

The LiDAR arranged in front of the fork needs to be installed at a position outside a length range of an extended fork, so as to avoid collision with the LiDAR during lifting and lowering of the fork. Meanwhile, the field of view of the LiDAR must cover an entire area including a fork structure and a forklift mast to ensure integrity of features extraction. Exemplarily, an installation height of the LiDAR is 1.5 meters to balance spatial arrangement and sensing performance. The LiDAR corresponding to each wheel assembly is mainly used to measure a position of the wheel assembly and an installation position of the LiDAR maintains a horizontal distance of approximately 1.5 meters from the wheel assembly. Meanwhile, a distance between the installation position and a bearing surface is within a height threshold, so as to reduce smearing effect caused by an observation angle of the LiDAR and ensure accuracy of wheel position extraction. For example, the height threshold may be 1 meter, so that the field of view of the LiDAR may cover an entire working area of the wheel assembly to avoid blind spots. The LiDARs on both sides of the head of the vehicle are configured to measure dimensions, such as a length, a width, and a height, of the entire vehicle. A total detection range of two LiDARs on both sides of the head of the vehicle needs to cover an entire outer contour of the vehicle body, so as to ensure that all required dimensions of the vehicle body may be extracted in a single scan, thereby improving measurement efficiency and consistency.

In some embodiments, the calculation module 2540 is disposed in the main body of the calibration room 2510 or on a remote server. The detection data collected by the data acquisition module 2530 may be transmitted to the calculation module 2540 via a switch. The calculation module 2540 may receive the detection data collected by the data acquisition module 2530 and execute a calibration method to complete the calibration of the material handling equipment 2520. Exemplarily, the calculation module 2540 may perform operations such as feature extraction, data fusion, and pose calculation on the detection data, to register a coordinate system of the data acquisition module 2530 with a coordinate system of the main body of the calibration room 2510 and further to identify a three-dimensional pose of the material handling equipment 2520 in the calibration room. Combined with a structural recognition result of the material handling equipment 2520 by the data acquisition module 2530, an origin position of the coordinate system corresponding to the material handling equipment 2520 may be determined. Then, the origin position will be transmitted to the material handling equipment 2520 via internal Local Area Network (LAN), so that the material handling equipment 2520 may be calibrated based on the origin position by the controller of the material handling equipment 2520.

An example of an interaction process between the calculation module and the data acquisition module will be illustrated with reference to FIGS. 26 and 27 in the following.

FIG. 26 is a schematic diagram of connection between a data acquisition module and a calculation module according to some embodiments of the present disclosure. As shown in FIG. 26, there are five data acquisition modules, each including a LiDAR and a camera and connected to a power supply. The LiDAR and the camera are respectively connected to a sensor switch via network cables, and the sensor switch is further connected to the calculation module via a network cable, thereby establishing a data transmission channel between the data acquisition modules and the calculation module. In an actual operation process, the data acquisition modules continuously collect data of the material handling equipment in the calibration room, and the data is transmitted to the sensor switch via network cables in form of electrical signals. The sensor switch is configured to sort and classify the data from different data acquisition modules and transmit the data to the calculation module, serving to aggregate and forward data. The calculation module is configured to calibrate the material handling equipment based on the received data.

The embodiment of the present disclosure further provides an interaction component, which includes a display, a keyboard, and a mouse, to assist user in controlling during the calibration process of the material handling equipment. The calculation module is connected to the keyboard and the mouse via a USB (Universal Serial Bus) interface, and the display is connected to the calculation module via an HDMI (High-Definition Multimedia Interface) interface. Further, an LAN (Local Area Network) port is connected to a LAN switch via a network cable to implement data forwarding between different devices. The LAN port is connected to a router via a network cable to enable connection to an external network via the router. The router, the LAN switch, the display, and the sensor switch are all connected to a power supply.

Figure 27:
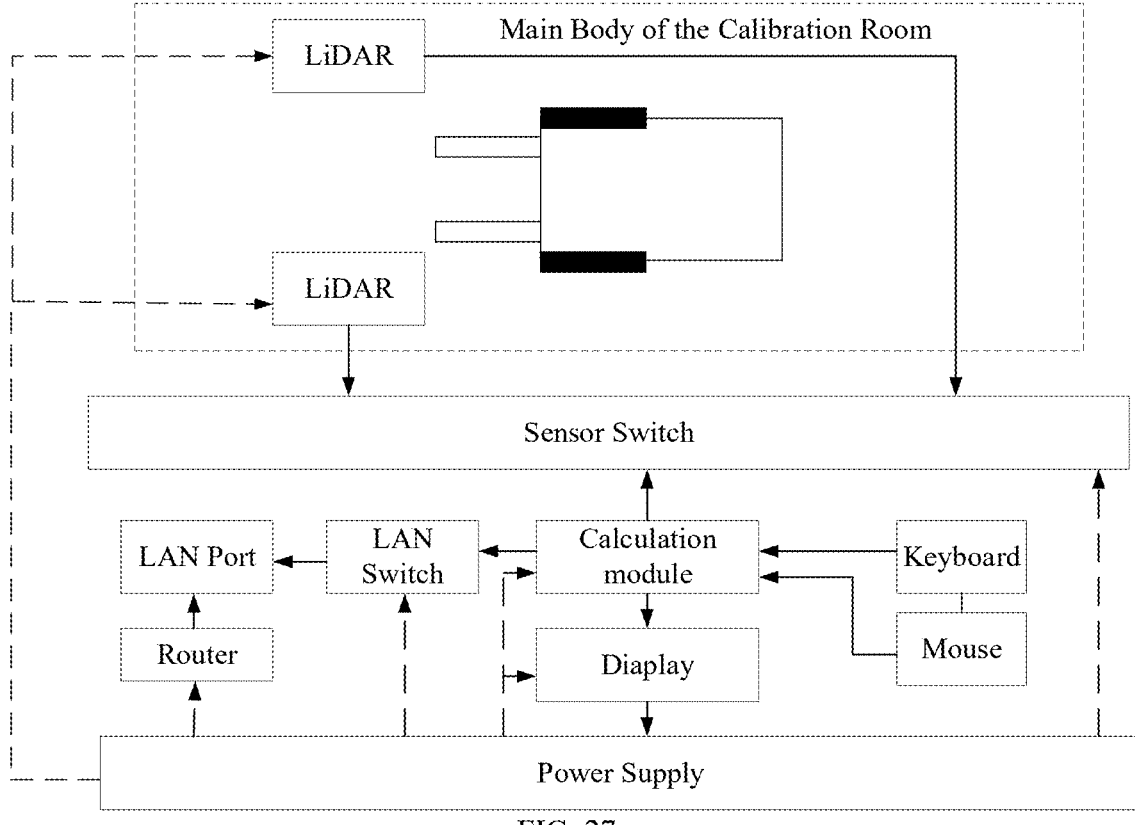
FIG. 27 is a schematic layout diagram of a data acquisition module according to some embodiments of the present disclosure.

FIG. 27 is a schematic layout diagram of a data acquisition module according to some embodiments of the present disclosure. As shown in FIG. 27, the LiDAR (i.e., the data acquisition module) is configured to collect point cloud data of the main body of the calibration room and the material handling equipment, and the point cloud data is transmitted to the calculation module via the sensor switch. Users may interact with the calculation module through the interaction component such as a display, a keyboard, and a mouse to control the calibration process. A LAN port, a LAN switch, and a router are provided to enable data sharing between different devices. As indicated by dashed lines in FIG. 27, the LiDAR, the sensor switch, the LAN switch, the calculation module, the display, the router, and other components are all provided with a power supply for electrical support. With the layout mentioned above, the calibration room achieves a standardized environment, automated measurement, and networked data transmission, significantly improving efficiency, accuracy, and consistency of calibration for the material handling equipment.

In some embodiments, the data acquisition module and other modules together form a server, which provides accurate detection data to the calculation module. The calculation module is disposed on the controller of the material handling equipment. The server and the controller communicate and collaborate via an internal network to accomplish tasks such as data acquisition, feature extraction, pose calculation, external parameter calibration, and parameter writing. Accordingly, the calibration room adopts a software-hardware collaborative architecture and constructs a dual-end collaborative calibration software framework with "the controller and the server" as the core, supporting a streamlined workflow that orchestrates multi-sensor data processing, task scheduling, calibration task management, and automated deployment. This enables fully automated, high-precision calibration of the material handling equipment during a manufacturing stage.

Exemplarily, the material handling equipment may include an automated guided forklift, and the controller is deployed on an industrial computer of the automated guided forklift. The controller encompasses the following functionalities: acquisition of on-board multi-sensor data; support for communication architecture; automatic calibration and diagnosis capabilities; write-back of calibration results, and parameter application.

Structures of the controller and the server will be illustrated with reference to FIGS. 28 and 29 in the following.

FIG. 28 is a schematic structural diagram of a controller according to some embodiments of the present disclosure. As shown in FIG. 28, a software module of the controller includes: a sensing module, a driving service, a perception service, and a software in an application layer. The sensing module is configured to drive static sensors, such as on-vehicle LiDARs and cameras, and acquire data. The perception service includes a driving module, a radar calibration module, and a radar self-diagnosis module. The software in the application layer includes interfaces provided by a client and a parameter configuration tool. The client may include functions such as starting automatic calibration, enabling automatic diagnosis, visual display and log recording. The parameter configuration tool includes options such as calibration parameter configuration and static parameter configuration. The driving service is configured to drive the aforementioned modules to work. Further, the software module of the controller may further include a communication component, which uses eCAL (enhanced Communication Abstraction Layer) for interaction of large amounts of data such as point cloud data and images, and uses MQTT (Message Queuing Telemetry Transport) and JSON-RPC (JavaScript Object Notation Remote Procedure Call) to implement parameter control and result communication.

FIG. 29 is a schematic structural diagram of a server according to some embodiments of the present disclosure. As shown in FIG. 29, the server is responsible for data acquisition of a static sensor, data fusion, and target pose calculation. The server includes a driving module, a static detection module, and a target segmentation recognition module. The server is connected to the static sensor and the client respectively. The client is used for manual control of the detection process and viewing diagnostic information, such as starting automatic calibration, enabling detection functions, visual display and log recording. A communication component performs data interaction with the controller. High-volume communication is implemented via eCAL, while low-frequency command and result transmission are performed via JSON-RPC and MQTT. The server enables functions such as synchronized acquisition of sensors, data fusion, feature recognition, feature extraction, pose estimation of static targets, generation of calibration results, and transmission of calibration results to the controller.

In the embodiment of the present disclosure, based on the data acquisition module disposed in the calibration room, the detection data reflecting features of the material handling equipment and the main body of the calibration room is acquired through data collection performed on the main body of the calibration room and the material handling equipment. The feature of the material handling equipment and the main body of the calibration room is obtained without manual intervention. Furthermore, as the material handling equipment is calibrated based on the detection data through the calculation module, the calibration of the material handling equipment may be completed rapidly, realizing a high degree of automation, convenient operation and high efficiency. Calibration based on the data acquired by the data acquisition module ensures data consistency and improves accuracy of calibration results. Additionally, the main body of the calibration room is configured to accommodate the material handling equipment, that is, the main body of the calibration room occupies little space, which enhances usability.

In some embodiments, the main body of the calibration room includes a first marking component. The first marking component is disposed on an inner wall of the main body, and the first marking component includes a plurality of first markers arranged in an array.

Specifically, the first markers may be made of a material which may be recognized by the LiDAR easily, such as metal, glass, and reflective stickers. To reduce noise in the data, a material of the first marker may include white foam. The white foam has advantages such as high reflectivity, low noise, and clear features under multi-angle laser scanning. Exemplarily, the first marker may be a piece of white foam of a 30 cm×30 cm square.

By arranging the first markers in an array, the LiDAR is capable of clearly identifying positions of the first markers during scanning, thereby ensuring accuracy of data acquisition. The first markers arranged in the array may also provide abundant spatial feature information, which helps improve accuracy and stability of calibration results.

FIG. 30 is a schematic diagram of an arrangement of first markers according to some embodiments of the present disclosure. As shown in FIG. 30, the first markers are square and arranged at equal intervals with a certain spacing, thereby forming a regular grid-like structure. This arrangement not only facilitates scanning and recognition by the LiDAR but also ensures an accurate relative positional relationship between the first markers, providing convenience for subsequent data processing and calibration work. In addition, a size and a shape of the first marker may be modified according to actual requirements to meet calibration requirements of different accuracy. Exemplarily, the interval between adjacent first markers may be equal to a side length of the first marker. For example, the first marker may be a square of 30 cm×30 cm and the interval between adjacent first markers is 30 cm.

In some embodiments, the main body of the calibration room may further include a second marking component. The second marking component is disposed on the inner wall of the main body and includes a plurality of second markers arranged in an array. The plurality of first markers and the plurality of second markers are arranged alternately in sequence. The second markers may adopt a same size as the first markers.

A material of the second marker is the same as that of the first marker, and a color of the second marker is different from that of the first marker. For example, if the color of the first marker is black, the color of the second marker may be white; If the color of the first marker is white, then the color of the second marker can be black.

Exemplarily, a material of the second marker may include black foam. The black foam has low reflectivity, forming a distinct contrast with white foam. Under LiDAR scanning, the black foam may present low-reflection areas, thereby creating a strong contrast with white foam, enabling the LiDAR to more accurately identify positions of the first markers and the second markers.

In the embodiments of the present disclosure, the plurality of first markers and the plurality of second markers are arranged alternately in sequence. The alternating arrangement not only increases richness of data acquisition but also improves accuracy and efficiency of data processing. By combining the position information of the first markers and the second markers, it is convenient to accurately understand the features of the main body of the calibration room, thereby improving accuracy of calibration results.

In some embodiments, the first markers and the second markers may be alternately arranged in a staggered layout, that is, the first markers and the second markers are staggered in a horizontal or vertical direction, forming a staggered distribution visual effect. This arrangement can increase the richness of data acquisition and improve the accuracy of calibration.

In other embodiments, the plurality of first markers and the plurality of second markers are arranged in a checkerboard pattern. By arranging the first markers and the second markers alternately in a checkerboard pattern, a chessboard-like visual effect is formed. This arrangement may provide uniformly distributed spatial feature points and abundant spatial feature information, improving the accuracy and stability of calibration.

A layout diagram of the calibration room will be illustrated below with reference to FIG. 31. FIG. 31 is a schematic layout diagram of a calibration room according to some embodiments of the present disclosure. As shown in FIG. 31, the calibration room includes a plurality of data acquisition modules 2530, and each data acquisition module 2530 includes a camera and a LiDAR. An angle between two line segments with arrows in FIG. 8 indicates an acquisition angle of view of the data acquisition module. A plurality of markers 2550 are also disposed in the calibration room, and each marker 2550 is located on an inner wall or the ground of the main body to facilitate feature extraction. The larger the size of the main body of the calibration room is, the higher the measurement accuracy during calibration will be. Exemplarily, dimensions of the main body may be 4.7 meters in width, 7.2 meters in length. A width of a door may be 2.44 meters. The material handling equipment 220 is parked in the center of the main body of the calibration room to allow the data acquisition modules 230 to collect information of the material handling equipment 2520 in all directions.

In some embodiments, the calibration room may further include a positioning device. The positioning device is configured to assist in positioning the material handling equipment in the main body of the calibration room.

Exemplarily, the positioning device may include a rectangular parking box, enclosing an area larger than dimensions of the material handling equipment. For example, a width of a rectangular parking space enclosed by the rectangular parking box is larger than a width of the head of the material handling equipment; a length of the rectangular parking space is larger than a length of the material handling equipment. A position of the rectangular parking box in the calibration room may be used as a designated position of the material handling equipment, thereby guiding the material handling equipment to park at the position corresponding to the rectangular parking box in the calibration room.

Different positioning devices may be provided for different types of material handling equipment. For example, for material handling equipment of different sizes, rectangular parking boxes of different sizes may be set to facilitate the calibration of the material handling equipment of different sizes, making the positioning adjustable and flexible.

In other embodiments, the positioning device may include: a guiding component, configured to guide the material handling equipment to a designated position; and/or a parking position measurement component, configured to assist the data acquisition module in detecting the material handling equipment.

Figure 32:
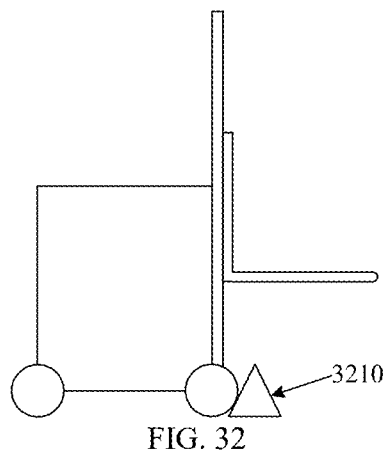
FIG. 32 is a schematic diagram of a guiding component according to some embodiments of the present disclosure.

The guiding component is technological equipment that controls the material handling equipment to the designated position, so that the LiDARs, the cameras, and other sensors of the data acquisition module are all within an optimal working distance from the material handling equipment and have an optimal acquisition field of view. FIG. 32 is a schematic diagram of a guiding component according to some embodiments of the present disclosure. The guiding component may be configured as a marker of a specific shape to instruct the material handling equipment to move to the designated position indicated by the guiding component. As shown in FIG. 32, the guiding component 3210 may adopt a triangular auxiliary structure. When the wheels of the material handling equipment abut against a side surface of the guiding component 3210, it indicates that the material handling equipment has moved to the designated position. The designated position may be determined based on the acquisition fields of view of the data acquisition module and the static sensors disposed on the material handling equipment, so that when the material handling equipment moves to the designated position, both the data acquisition module and the static sensors on the material handling equipment can effectively and comprehensively collect the detection data in the current scene.

Optionally, the parking position measurement component may be installed on the material handling equipment. For example, when the material handling equipment is an automated guided forklift, the parking position measurement component may be installed at a coaxial position of the wheel assembly of the automated guided forklift. The parking position measurement component is configured to detect whether the material handling equipment has reached the designated position, and send a detection result to the data acquisition module to control the data acquisition module to collect point cloud data of the material handling equipment.

Exemplarily, the parking position measurement component may be a photoelectric sensor. The photoelectric sensor has characteristics of high measurement accuracy and fast response speed, and can perform real-time detection of the position information of the material handling equipment. When the material handling equipment moves to the designated position, the parking position measurement component will send a signal to the data acquisition module. When receiving the signal, the data acquisition module will starts collecting the point cloud data of the material handling equipment.

In the embodiment of the present disclosure, through an integrated spatial design and a multi-sensor collaboration mechanism, the calibration room realizes fully automatic and high-precision calibration of structural parameters of key sensors and components of the material handling equipment during a manufacturing stage. It significantly reduces manual operation costs, improves consistency during manufacturing, and provides core technical support for a large-scale delivery of material handling equipment with high quality.

After determining the center of the material handling equipment, further calibration operations may be performed on sensors such as LiDAR and cameras of the material handling equipment.

In some embodiments, to accurately handle cargoes, static sensors disposed on the material handling equipment usually include a navigation LiDAR and a handling LiDAR. To improve handling accuracy and safety, the navigation LiDAR includes a main navigation LiDAR and an auxiliary navigation LiDAR, and the handling LiDAR includes a main handling LiDAR and an auxiliary handling LiDAR, forming a redundant system. They are jointly responsible for detecting obstacles in front of the forks, preventing collisions during the movement of the forks, and working collaboratively to enhance operational safety and reliability. All the aforementioned main navigation LiDAR, auxiliary navigation LiDAR, main handling LiDAR, and auxiliary handling LiDAR may be LiDARs. In addition, the static sensors of the material handling equipment may further include cameras.

All of the aforementioned main navigation LiDAR, auxiliary navigation LiDAR, main handling LiDAR, auxiliary handling LiDAR, and cameras may be calibrated through the calibration room provided by the embodiments of the present disclosure. In addition, various components on the material handling equipment can also be calibrated through the calibration room provided by the embodiments of the present disclosure.

Specifically, the calibration room provided by the embodiments of the present disclosure may be used to automatically calibrate extrinsic parameters between the auxiliary navigation LiDAR and the main navigation LiDAR, as well as between the auxiliary handling LiDAR and the main handling LiDAR, to extract a center point of a vehicle body of the material handling equipment. Meanwhile, the calibration room may further be used to automatically calibrate extrinsic parameters between the main navigation LiDAR and the main handling LiDAR, and spatial extrinsic parameters between the camera and a main LiDAR, enabling multi-modal sensor fusion. Additionally, the calibration room may further be used to automatically calibrate various encoders equipped on the material handling equipment, including calibrating the encoders respectively when the fork assembly performs operations such as traversing, lifting, moving forward and backward, and tilting. In addition, the calibration room may further be used to automatically measure and verify basic structural parameters of the material handling equipment, such as a length, a width, a height of the material handling equipment, and a length and a width of a fork.

To enable a clearer and more comprehensive understanding of the calibration method implemented through the calibration room, the following separately describes the calibration method in several aspects, including LiDAR calibration, camera calibration, calibration between the LiDAR and the camera, encoder calibration, and determination of structural parameters.

Examples will be provided to illustrate multiple implementation of the calibration method of the LiDAR with reference to accompanying drawings.

FIG. 33 is a schematic flowchart of a calibration method for a LiDAR according to some embodiments of the present disclosure. As shown in FIG. 33, in the embodiment of the present disclosure, a LiDAR to be calibrated is disposed on the material handling equipment, and the LiDAR to be calibrated may include at least one of a main navigation LiDAR, an auxiliary navigation LiDAR, a main handling LiDAR, and an auxiliary handling LiDAR aforementioned.

The calibration method includes the following steps.

Step S3310: acquiring fourth point cloud data of a main body of a calibration room.

The fourth point cloud data is high-precision full-scene point cloud map data of the main body of the calibration room. The use of high-precision full-scene point cloud map data can improve calibration accuracy of the LiDAR to be calibrated.

In some embodiments, the fourth point cloud data is original point cloud data of the main body of the calibration room preliminarily collected by an acquisition device. The acquisition device may be a handheld mapping device or a sensor module disposed on the material handling equipment. The handheld mapping device includes a LiDAR, a camera, or an inertial measurement unit. Exemplarily, the acquisition device may be controlled to acquire data of the calibration room in all directions along a preset trajectory, thereby generating full-scene point cloud map data of the main body. The full-scene point cloud map data is designated as the fourth point cloud data.

In other embodiments, the fourth point cloud data is point cloud data obtained after performing data processing operations (such as point cloud filtering operations) on the original point cloud data.

Step S3320: calculating, based at least on the fourth point cloud data and coordinate system data of a material handling equipment, a first transformation relationship.

The first transformation relationship is a transformation relationship between the coordinate system of the material handling equipment and a coordinate system of the calibration room.

The coordinate system of the material handling equipment is a three-dimensional spatial coordinate system established with the material handling equipment itself as a reference origin. The coordinate system of the calibration room is a three-dimensional spatial coordinate system established with the main body of the calibration room as a reference origin.

The coordinate system data of the material handling equipment refers to coordinate data of the calibration room recorded in the three-dimensional spatial coordinate system established with the material handling equipment itself as the reference origin. In this step, the first transformation relationship can be calculated based on a correspondence relationship between the fourth point cloud data and coordinate system data of the material handling equipment.

During the calibration process, the material handling equipment may be fixed to avoid movement or rotation during calibration, which may affect the calibration result.

Step S3330: acquiring fifth point cloud data of a marker in the main body of the calibration room through a LiDAR to be calibrated.

The LiDAR to be calibrated refers to a LiDAR disposed on the material handling equipment that needs to be calibrated, and a quantity of the LiDAR to be calibrated may be one or more.

In some embodiments, the calibration room includes at least one marker. During the calibration of the material handling equipment, the marker is used as a feature point to calibrate the material handling equipment. The marker may be an object included in the calibration room or a fixed object placed in the calibration room. For example, the marker may be a door, a window, a wall corner, and the like of the calibration room, or an indicator placed in the calibration room.

To effectively and quickly complete the calibration, clear and effective fifth point cloud data may be acquired by using the aforementioned first marking component and/or the second marking component in the calibration room. The marker in the calibration room may be a first marker and/or a second marker.

Specifically, the fifth point cloud data of at least one marker in the calibration room may be collected by the LiDAR to be calibrated. The fifth point cloud data refers to coordinate data of the marker in a coordinate system of a LiDAR to be calibrated. Exemplarily, point cloud data of a plurality of first markers and point cloud data of a plurality of second markers may be collected separately by the LiDAR to be calibrated, which jointly form the fifth point cloud data.

Step S3340: performing registration on the fifth point cloud data and the fourth point cloud data to obtain a second transformation relationship.

The second transformation relationship is a transformation relationship between the coordinate system of the LiDAR to be calibrated and the coordinate system of the calibration room.

A core objective of registration is to unify several sets of point cloud data collected by different devices into a unified coordinate system, thereby eliminating discrepancies in position, orientation, and scale between the different point cloud data. Exemplarily, a point cloud registration algorithm may be adopted to register the fourth point cloud data with the fifth point cloud data. By registering the fifth point cloud data with the fourth point cloud data, a transformation matrix for transforming the coordinate system of the LiDAR to be calibrated to the coordinate system of the calibration room may be obtained. The transformation matrix includes a translation matrix and a rotation matrix, which reflect changes from the coordinate system of the LiDAR to be calibrated to the coordinate system of the calibration room through translation and rotation respectively.

Specifically, the step of performing registration on the fifth point cloud data and the fourth point cloud data to obtain the second transformation relationship includes: performing rough registration and fine registration in sequence on the fifth point cloud data and the fourth point cloud data based on a point cloud registration algorithm to obtain the second transformation relationship.

The point cloud registration algorithm includes a registration algorithm for performing fine registration on point cloud data and a registration algorithm for performing rough registration on the point cloud data.

During the rough registration, the fifth point cloud data and the fourth point cloud data may be quickly and roughly aligned to reduce a positional difference between them. An initial difference between the fifth point cloud data and the fourth point cloud data is large. When there are significant positional and angular differences between the fifth point cloud data and the fourth point cloud data, direct fine registration will lead to a sharp increase in computational load. However, through a simplified feature matching logic, rough registration enables the fifth point cloud data and the fourth point cloud data to be roughly aligned, providing a better initial position for subsequent fine registration and improving registration efficiency.

During the fine registration, based on a preliminary alignment result of the rough registration, the fifth point cloud data and the fourth point cloud data may be further precisely aligned to improve registration accuracy and ensure the accuracy of the registration result.

By combining the rough registration and the fine registration, efficiency of the rough registration and accuracy of the fine registration are both preserved. This effectively improves overall registration efficiency and accuracy, ensures the accuracy of the second transformation relationship, and consequently improves stability and reliability of an entire calibration process.

Step S3350: acquiring, based on the first transformation relationship and the second transformation relationship, a transformation relationship between a coordinate system of the LiDAR to be calibrated and a coordinate system of the material handling equipment as a first calibration result.

Since the first transformation relationship is the transformation relationship between the coordinate system of the material handling equipment and the coordinate system of the calibration room, and the second transformation relationship is the transformation relationship between the coordinate system of the LiDAR to be calibrated and the coordinate system of the calibration room, both transformation relationships are associated with the coordinate system of the calibration room. The coordinate system of the calibration room can thus be used as an intermediate coordinate system to establish an association between the coordinate system of the material handling equipment and the coordinate system of the LiDAR to be calibrated, and thus obtain the transformation relationship between the coordinate system of the LiDAR to be calibrated and the coordinate system of the material handling equipment, which is taken as the calibration result.

In the embodiment of the present disclosure, the first transformation relationship and the second transformation relationship are obtained based on the fourth point cloud data, the coordinate system data of the material handling equipment, and the fifth point cloud data. Since the first transformation relationship is the transformation relationship between the coordinate system of the material handling equipment and the coordinate system of the calibration room, and the second transformation relationship is the transformation relationship between the coordinate system of the LiDAR to be calibrated and the coordinate system of the calibration room, both transformation relationships are associated with the coordinate system of the calibration room and the transformation relationship between the coordinate system of the LiDAR to be calibrated and the coordinate system of the material handling equipment can thus be obtained based on the two transformation relationships, realizing the calibration of the LiDAR to be calibrated. As the calibration result is obtained only through point cloud registration and transformation relationship conversion, an entire process requires no manual intervention, which makes the registration process convenient and efficient to operate, thereby improving the accuracy of the calibration result.

An example will be provided to illustrated a point cloud registration method with reference to FIG. 34. FIG. 34 is a schematic flowchart of point cloud registration according to some embodiments of the present disclosure. As shown in FIG. 34, in the embodiment of the present disclosure, a point cloud registration algorithm includes an iterative closest point (ICP) algorithm and a generalized iterative closest point (GICP) algorithm. The step of performing, based on the point cloud registration algorithm, the rough registration and the fine registration in sequence on the fifth point cloud data and the fourth point cloud data to obtain the second transformation relationship includes the following steps.

Step S3410: performing, based on the iterative closest point algorithm, the rough registration on the fifth point cloud data and the fourth point cloud data to obtain a first transformation matrix.

The fourth point cloud data may be used as target point cloud data, and the fifth point cloud data may be used as source point cloud data. A factory calibration matrix of the LiDAR to be calibrated may be used as an initialization parameter of the ICP algorithm to perform rough registration on the fourth point cloud data and the fifth point cloud data. The first transformation matrix obtained from rough registration may include a rotation matrix and a translation matrix. The fifth point cloud data may be roughly transformed, based on the first transformation matrix, to a position aligned with the fourth point cloud data, that is, the rough registration is completed. Through the rough registration, positional difference between different point cloud data can be quickly reduced, providing a better initial position for subsequent fine registration, which improves the efficiency and accuracy of the fine registration.

Step S3420: taking the first transformation matrix as an initialization parameter of the generalized iterative closest point algorithm, and performing, based on the generalized iterative closest point algorithm, the fine registration on the fifth point cloud data and the fourth point cloud data to obtain the second transformation relationship.

In practice, after the fifth point cloud data is transformed by the first transformation matrix obtained from the rough registration, there is still a slight deviation from the fourth point cloud data. To further improve registration accuracy, the generalized iterative closest point (GICP) algorithm may be used for the fine registration of the fifth point cloud data and the fourth point cloud data. Compared with the ICP algorithm, the GICP algorithm has higher registration accuracy but a relatively larger computational load. Therefore, after the rough registration, registration accuracy may be effectively improved by the fine registration using the GICP algorithm. With the first transformation matrix obtained from the rough registration as the initialization parameter of the GICP algorithm, a convergence speed of the fine registration may be accelerated, thereby improving the efficiency of fine registration. Through the GICP algorithm, the fifth point cloud data and the fourth point cloud data are precisely aligned to obtain the second transformation relationship.

FIG. 35 is a schematic flowchart of a calibration method according to some embodiments of the present disclosure. The embodiment shown in FIG. 35 is extended based on the embodiment shown in FIG. 33. The following focuses on describing a difference between the embodiments shown in FIG. 35 and FIG. 33, and the similarities will not be described.

As shown in FIG. 35, in the embodiment of the present disclosure, a quantity of the LiDAR to be calibrated is greater than one, and the calibration method includes the following steps.

Step S3510: acquiring fifth point cloud data of the marker in the calibration room through each LiDAR to be calibrated.

The quantity of the LiDAR to be calibrated is less than or equal to a total quantity of LiDARs disposed on the material handling equipment. Exemplarily, during factory calibration of the material handling equipment, all LiDARs disposed on the material handling equipment may be calibrated as the LiDARs to be calibrated. Each LiDAR to be calibrated may be controlled to collect the fifth point cloud data of the marker in the calibration room.

In some embodiments, all LiDARs to be calibrated can be simultaneously controlled to collect the fifth point cloud data of the marker in the calibration room to improve calibration efficiency. Different LiDARs to be calibrated can be used to collect point cloud data of different markers as the fifth point cloud data. In practice, as different LiDARs to be calibrated are installed at different positions on the material handling equipment, collection accuracy of data acquired from different markers in the calibration room also varies due to distinct installation positions and sensing distances. The point cloud data of the markers whose collection accuracy meets an accuracy requirement may be retained and used as the fifth point cloud data.

Step S3520: performing registration on the fourth point cloud data and the fifth point cloud data corresponding to each LiDAR to be calibrated to obtain the second transformation relationship corresponding to each LiDAR to be calibrated.

In some embodiments, the fifth point cloud data collected by each LiDAR to be calibrated is registered with the fourth point cloud data, to obtain the transformation relationship between the coordinate system of each LiDAR to be calibrated and the coordinate system of the calibration room.

Step S3530: acquiring, based on the first transformation relationship and the second transformation relationship corresponding to each LiDAR to be calibrated, the transformation relationship between the coordinate system of each LiDAR to be calibrated and the coordinate system of the material handling equipment as the calibration result.

For each LiDAR to be calibrated, the transformation relationship between the coordinate system of the LiDAR to be calibrated and the coordinate system of the material handling equipment may be calculated separately, which is taken as the calibration result for each LiDAR to be calibrated. Through the calibration results, the position and pose information of each LiDAR to be calibrated on the material handling equipment can be determined, thereby achieving precise calibration of the LiDAR to be calibrated.

The calibration method for the plurality of LiDARs to be calibrated will be clearly illustrated with reference to FIG. 36.

FIG. 36 is a schematic diagram of a transformation relationship between coordinate systems according to some embodiments of the present disclosure. As shown in FIG. 36, a quantity of the LiDARs to be calibrated is three, and each LiDAR to be calibrated has a corresponding coordinate system of the LiDAR to be calibrated, such as a coordinate system of LiDAR 1, a coordinate system of LiDAR 2 and a coordinate system of LiDAR 3. There is a second transformation relationship between each coordinate system of the LiDAR to be calibrated and the coordinate system of the calibration room, that is, the coordinate system of LiDAR 1, the coordinate system of LiDAR 2 and the coordinate system of LiDAR 3 are respectively associated with the coordinate system of the calibration room. Based on the first transformation relationship, an association is established between the coordinate system of the calibration room and the coordinate system of the material handling equipment. Furthermore, by using the coordinate system of the calibration room as an intermediate coordinate system, transformation relationships between the coordinate system of LiDAR 1, the coordinate system of LiDAR 2 and the coordinate system of LiDAR 3, and the coordinate system of the material handling equipment can be obtained respectively.

In the embodiment of the present disclosure, the calibration of the plurality of LiDARs to be calibrated is realized, so that no manual intervention is required during the calibration process, thereby reducing labor costs and time costs. Moreover, the same calibration method is adopted for each LiDAR to be calibrated, which ensures consistency of the calibration processes for different LiDARs and improves the accuracy of the calibration result.

An example will be provided to illustrate the calibration method for a LiDAR in the following with reference to FIG. 37.

FIG. 37 is a schematic flowchart of a calibration method according to another embodiment of the present disclosure. The embodiment shown in FIG. 37 is extended from the embodiment shown in FIG. 35. The following focuses on describing a difference between the embodiments shown in FIG. 37 and FIG. 35, and the similarities will not be described.

As shown in FIG. 37, in the embodiment of the present disclosure, before the step of performing registration on the fourth point cloud data and the fifth point cloud data corresponding to each LiDAR to be calibrated to obtain the second transformation relationship corresponding to each LiDAR to be calibrated (Step S3520), the method further includes the following steps.

Step S3710: generating, based on a plurality of LiDARs to be calibrated, a calibration task thread pool.

The calibration task thread pool includes a plurality of calibration task threads, and the plurality of calibration task threads are in a one-to-one correspondence with the plurality of LiDARs to be calibrated.

Exemplarily, a quantity of calibration task threads included in the calibration task thread pool is consistent with a quantity of the LiDARs to be calibrated. Each calibration task thread corresponds to a LiDAR to be calibrated and is used for executing a calibration task corresponding to that LiDAR to be calibrated.

Step S3720: starting a calibration task thread corresponding to a target LiDAR to be calibrated to calibrate the target LiDAR to be calibrated after acquiring the fifth point cloud data corresponding to the target LiDAR to be calibrated.

The target LiDAR to be calibrated is one of the plurality of LiDARs to be calibrated.

In some embodiments, a data acquisition request is periodically sent to each LiDAR to be calibrated, and the fifth point cloud data sent by the LiDARs to be calibrated will be received. The LiDAR to be calibrated corresponding to the received fifth point cloud data is referred to as the target LiDAR to be calibrated. After receiving the fifth point cloud data corresponding to at least one target LiDAR to be calibrated, the calibration task thread corresponding to the target LiDAR to be calibrated is started, and the target LiDAR to be calibrated is calibrated through this calibration task thread.

In some embodiments, different calibration task threads can be executed sequentially, that is, each calibration task thread needs to wait until the previous calibration task thread is completed, thereby reducing resource occupation.

In other embodiments, the quantity of target LiDARs to be calibrated is greater than one, that is, the plurality of target LiDARs to be calibrated may collect the fifth point cloud data in parallel. To improve calibration efficiency, the step of starting the calibration task thread corresponding to a target LiDAR to be calibrated to calibrate the target LiDAR to be calibrated after acquiring the fifth point cloud data corresponding to the target LiDAR to be calibrated may include: starting the calibration task threads corresponding to the plurality of target LiDARs to be calibrated in parallel to calibrate the plurality of target LiDARs to be calibrated after acquiring the fifth point cloud data corresponding to each of the plurality of target LiDARs to be calibrated.

Exemplarily, all the calibration task threads corresponding to the plurality of target LiDAR to be calibrated can be started in parallel; alternatively, a thread quantity threshold for calibration task threads to be started in parallel can be determined based on current remaining resources. An actual quantity of calibration task threads started in parallel will not exceed the thread quantity threshold, thereby improving calibration efficiency while ensuring the stability of the calibration process.

An example is provided to illustrate a calculation method of the first transformation relationship.

In the embodiment of the present disclosure, before the acquiring the fifth point cloud data of the marker in the main body through the LiDAR to be calibrated (Step S3330), the method may further include: controlling the material handling equipment to move to a designated position in the calibration room.

Exemplarily, the step of controlling the material handling equipment to move to the designated position in the calibration room may be implemented by the following step: controlling the material handling equipment to move to the designated position in the calibration room through a preset navigation path or manual operation. After the material handling equipment stops moving, further positioning and calibration operations can be performed to ensure the stability and accuracy of the material handling equipment. For example, a parking position measurement component can be used for detecting whether the material handling equipment has reached the designated position. If the material handling equipment has reached the designated position, the parking position measurement component will send a signal to the data acquisition module and the LiDAR to be calibrated on the material handling equipment. If the material handling equipment has not reached the designated position, a distance between the material handling equipment and the designated position may be determined and sent to the controller of the material handling equipment. The controller controls the material handling equipment to move to the designated position based on this distance.

In the embodiment of the present disclosure, by controlling the material handling equipment to move to the designated position, both the data acquisition module and the LiDAR disposed on the material handling equipment can comprehensively and effectively collect data of the material handling equipment and the calibration room, improving the accuracy of the calibration result.

An example will be provided to illustrate the calculation method of the first transformation relationship in the following with reference to FIG. 38.

FIG. 38 is a schematic flowchart of determining a first transformation relationship according to some embodiments of the present disclosure. The embodiment shown in FIG. 38 is extended from the embodiment shown in FIG. 33. The following focuses on describing a difference between the embodiments shown in FIG. 38 and FIG. 33, and the similarities will not be described.

As shown in FIG. 38, in the embodiment of the present disclosure, the calculating, based at least on the fourth point cloud data and coordinate system data of the material handling equipment, the first transformation relationship (Step S3320) includes the following steps.

Step S3810: acquiring third point cloud data of the marker in the calibration room through the data acquisition module.

Exemplarily, when the data acquisition module is a LiDAR, original point cloud data of the marker collected by the LiDAR may be directly used as the third point cloud data. When the data acquisition module is a camera, the camera can collect RGB images and depth images of the marker in the calibration room, and coordinate data formed by projecting the RGB images and the depth images into three-dimensional space can be used as the third point cloud data.

Step S3820: performing registration on the third point cloud data and the fourth point cloud data to obtain a third transformation relationship.

The third transformation relationship is a transformation relationship between a coordinate system of the data acquisition module and the coordinate system of the calibration room.

Since the fourth point cloud data is the full-scene point cloud map data of the calibration room, the fourth point cloud data contains point cloud data of the marker. That is, both the fourth point cloud data and the third point cloud data include the point cloud data of the marker. Taking the marker as a feature point, the third transformation relationship can be determined by performing registration on the third point cloud data and the fourth point cloud data using a point cloud registration algorithm.

Exemplarily, to reduce a workload during the registration process, point cloud data corresponding to the marker in the fourth point cloud data may be extracted. Based on the extracted point cloud data, the fourth point cloud data may be updated, and then the updated fourth point cloud data is registered with the third point cloud data, which greatly reduces an amount of registration data and improves registration efficiency.

Step S3830: acquiring fourth point cloud data of the material handling equipment collected by the data acquisition module, and determining, based on the fourth point cloud data, a fourth transformation relationship.

The fourth transformation relationship is a transformation relationship between the coordinate system of the material handling equipment and the coordinate system of the data acquisition module.

In some embodiments, structural information of the material handling equipment may be acquired, and a first positional relationship between two positions on the material handling equipment may be determined based on the structural information. The first positional relationship is an inherent positional relationship between various structures on the material handling equipment, while the seventh point cloud data is point cloud data of each structure collected by different LiDARs of the data acquisition module. Therefore, the fourth transformation relationship can be established based on the inherent positional relationship between various structures and the point cloud data corresponding to each structure.

For example, the device positions may include a center point of a front wheel of the material handling equipment and a point on a rear-view mirror. Based on the seventh point cloud data, a second positional relationship between these two positions on the material handling equipment may also be determined.

Exemplarily, based on the structural information of the material handling equipment, the first positional relationship between a position 1 and a position 2 on the material handling equipment may be determined. Based on the seventh point cloud data, the second positional relationship between the position 1 and the position 2 can be determined. And based on the first positional relationship and the second positional relationship, the fourth transformation relationship may be determined.

Step S3840: acquiring, based on the third transformation relationship and the fourth transformation relationship, the first transformation relationship.

Since both the third transformation relationship and the fourth transformation relationship are associated with the coordinate system of the data acquisition module, the coordinate system of the data acquisition module may be used as an intermediate coordinate system to transform and obtain the transformation relationship between the coordinate system of the material handling equipment and the coordinate system of the calibration room.

In the embodiment of the present disclosure, by using the data acquisition module in the calibration room, the first transformation relationship is determined without manual intervention, realizing a high degree of automation, and further reducing labor costs and time costs.

An example will be provided to illustrate a calculation method of the fourth transformation relationship in the following with reference to FIG. 39.

FIG. 39 is a schematic flowchart of determining a fourth transformation relationship according to some embodiments of the present disclosure. The embodiment shown in FIG. 39 is extended from the embodiment shown in FIG. 38. The following focuses on describing a difference between the embodiments shown in FIG. 39 and FIG. 38, and the similarities will not be described.

As shown in FIG. 39, the step of acquiring the seventh point cloud data of the material handling equipment collected by the data acquisition module, and determining, based on the seventh point cloud data, the fourth transformation relationship (Step S3830) includes the following steps.

Step S3910: acquiring coordinates of a center of the material handling equipment in the coordinate system of the material handling equipment.

The center of the material handling equipment is a geometric center or a centroid of the material handling equipment.

Coordinates of the center of the material handling equipment in the coordinate system of the material handling equipment may be determined through a positional relationship between a feature point corresponding to an origin of the coordinate system of the material handling equipment on the material handling equipment and the center of the material handling equipment. Exemplarily, the origin of the coordinate system of the material handling equipment may correspond to a rear wheel axle center of the material handling equipment. Based on a positional relationship between the feature point and the center of the material handling equipment, as well as the coordinates of the origin of the coordinate system of the material handling equipment, the coordinates of the center of the material handling equipment in the coordinate system of the material handling equipment may be determined.

Step S3920: calculating, based on the seventh point cloud data of the material handling equipment collected by the data acquisition module, coordinates of the center of the material handling equipment in the coordinate system of the data acquisition module.

The coordinates of the center of the material handling equipment in the coordinate system of the data acquisition module are determined through a positional relationship between a feature point corresponding to an origin of the coordinate system of the data acquisition module and the center of the material handling equipment. Exemplarily, when the data acquisition module is a LiDAR, the origin of the coordinate system of the data acquisition module is an installation position of the LiDAR. Based on a positional relationship between the installation position and the center of the material handling equipment, as well as coordinates of the origin of the coordinate system of the data acquisition module, the coordinates of the center of the material handling equipment in the coordinate system of the data acquisition module may be determined.

Step S3930: determining, based on the coordinates of the center of the material handling equipment in the coordinate system of the data acquisition module and the coordinates of the center of the material handling equipment in the coordinate system of the material handling equipment, the fourth transformation relationship.

The fourth transformation relationship includes a rotation matrix and a translation matrix. Specific values of the rotation matrix and the translation matrix can be calculated based on the coordinates of the center of the material handling equipment in the coordinate system of the data acquisition module and the coordinates of the center of the material handling equipment in the coordinate system of the material handling equipment. Through the fourth transformation relationship, the point cloud data of the coordinate system of the material handling equipment may be transformed to point cloud data of the coordinate system of the data acquisition module; alternatively, the point cloud data in the coordinate system of the data acquisition module may be transformed to point cloud data of the coordinate system of the material handling equipment, thereby realizing data conversion and sharing between different coordinate systems.

An example will be provided to illustrate a determination method of the second transformation relationship.

In the embodiment of the present disclosure, the calibration room includes a target region, which is a region characterized by point features, as well as line features and/or surface features. The step of performing registration on the fifth point cloud data and the fourth point cloud data to obtain the second transformation relationship (Step S1040) includes: performing registration on point cloud data of the target region in the fourth point cloud data and point cloud data of the target region in the fifth point cloud data to obtain the second transformation relationship.

The target region is a partial region in the calibration room, for example, at least one of inner walls, a floor of the calibration room, and an equipment-occupied region in the calibration room. Since both the fourth point cloud data and the fifth point cloud data are point cloud data corresponding to the calibration room, point cloud registration performed on the fourth point cloud data and the fifth point cloud data is equivalent to registration on all features in the calibration room which need a large amount of data processing. Therefore, the point cloud data corresponding to a partial region in the calibration room may be extracted for registration, thereby reducing a computational load, ensuring the accuracy of the registration result, and improving registration efficiency.

Exemplarily, the target region includes an intersection region of inner wall planes of the calibration room, and the intersection region of the inner wall planes includes either two intersecting planes or three mutually intersecting planes. Since the intersection region of inner wall planes can provide stable feature points and feature lines, the stability and accuracy of registration may be improved by using the intersection region as the target region.

An example will be provided to illustrate a specific implementation of point cloud registration in the following with reference to FIG. 40.

FIG. 40 is a schematic flowchart of point cloud registration according to another embodiment of the present disclosure.

As shown in FIG. 40, in the embodiment of the present disclosure, the step of performing registration on the point cloud data of the target region in the fourth point cloud data and the point cloud data of the target region in the fifth point cloud data to obtain the second transformation relationship includes the following steps.

Step S4010: determining, based on point cloud data of a target region in the fourth point cloud data, a first vector.

Step S4020: determining, based on point cloud data of a target region in the fifth point cloud data, a second vector.

In some embodiments, the first vector is a direction vector of the target region determined based on the fourth point cloud data; and the second vector is a direction vector of the target region determined based on the fifth point cloud data.

Step S4030: determining, based on the first vector and the second vector, a rotation matrix of the coordinate system of the LiDAR to be calibrated relative to the coordinate system of the calibration room.

The rotation matrix is used for describing a rotation relationship between the coordinate system of the LiDAR to be calibrated and the coordinate system of the calibration room, and is one of key parameters for realizing coordinate system transformation. Exemplarily, angle between the first vector and the second vector, as well as a rotation axis corresponding to this angle, can be calculated, and the rotation matrix may be determined based on the angle and the rotation axis.

Step S4040: determining first coordinates of a position point in the fourth point cloud data and second coordinates of the position point in the fifth point cloud data.

Exemplarily, the position point may be a feature point in the target region, such as an intersection point at the intersection region of inner wall planes.

Step S4050: calculating, based on the rotation matrix, the first coordinates and the second coordinates, third coordinates, where the third coordinates are coordinates of an origin of the coordinate system of the LiDAR to be calibrated in the coordinate system of the calibration room.

Exemplarily, based on the rotation matrix, the first coordinates can be transformed from the coordinate system of the calibration room corresponding to the fourth point cloud data to the coordinate system of the LiDAR to be calibrated corresponding to the fifth point cloud data to obtain transformed coordinates. Based on the transformed coordinates and the second coordinates, a translation vector of coordinates, corresponding to the position point, in the coordinate system of the LiDAR to be calibrated relative to the coordinate system of the calibration room is determined. Based on the translation vector, coordinates of the origin of the coordinate system of the LiDAR to be calibrated in the coordinate system of the calibration room may be determined as the third coordinate.

Step S4060: determining the rotation matrix and the third coordinate to be the second transformation relationship.

The second transformation relationship between the coordinate system of the LiDAR to be calibrated and to the coordinate system of the calibration room may be determined based on the third coordinate and the rotation matrix. In the embodiment of the present disclosure, accurate transformation between the coordinate system of the LiDAR to be calibrated and the coordinate system of the calibration room may be realized, so that labor costs and time costs may be reduced through an automated manner while improving the accuracy and efficiency of calibration.

An example will be provided to illustrate a preprocessing method for the point cloud data in the following.

In the embodiment of the present disclosure, before the step of performing registration on the fifth point cloud data and the fourth point cloud data to obtain the second transformation relationship (Step S3340), the method further includes: performing preprocessing on the fifth point cloud data.

The preprocessing includes at least one of initial parameter transformation, point cloud filtering, and point cloud down sampling.

In some embodiments, the initial parameter transformation refers to initialization of a transformation relationship between the coordinate system of the LiDAR to be calibrated and the coordinate system of the calibration room. Exemplarily, an initial transformation relationship between the coordinate system of the LiDAR to be calibrated and the coordinate system of the calibration room may be set based on the position of the material handling equipment in the calibration room.

Point cloud filtering is used to remove noise points in the fifth point cloud data and improve accuracy of the point cloud data. Point cloud down sampling is used to reduce a quantity of points in the fifth point cloud data to reduce a data processing load while retaining overall features of the point cloud data. The accuracy and efficiency of the subsequent registration process may be improved by preprocessing the fifth point cloud data.

An example will be provided to illustrate a calibration method for a camera in the following.

Figure 41:
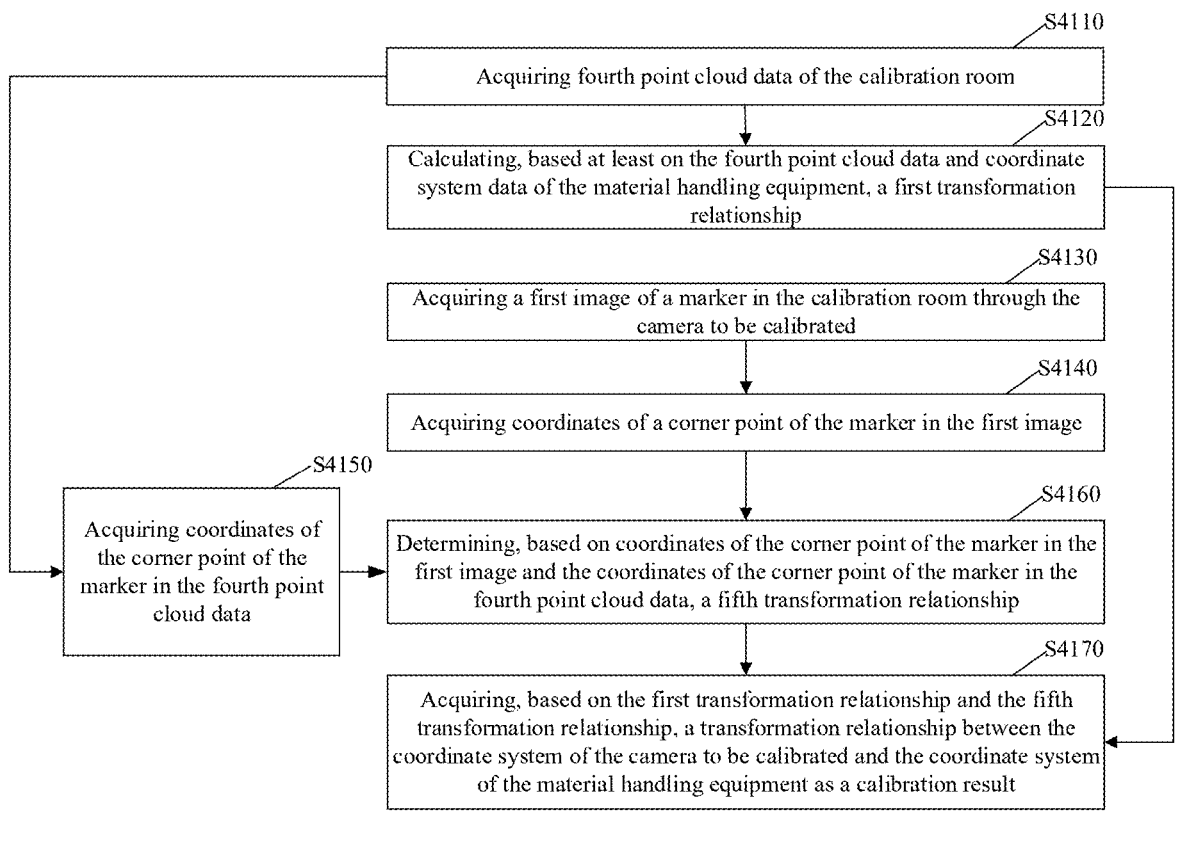
FIG. 41 is a schematic flowchart of a calibration method for a camera according to some embodiments of the present disclosure.

FIG. 41 is a schematic flowchart of a calibration method for a camera according to some embodiments of the present disclosure. As shown in FIG. 41, in the embodiment of the present disclosure, a camera to be calibrated is disposed on the material handling equipment, and the calibration method includes the following steps.

Step S4110: acquiring fourth point cloud data of a calibration room.

The fourth point cloud data is full-scene point cloud map data of the calibration room.

Step S4120: calculating, based at least on the fourth point cloud data and coordinate system data of the material handling equipment, a first transformation relationship.

The first transformation relationship is a transformation relationship between a coordinate system of the material handling equipment and a coordinate system of the calibration room.

Step S4130: acquiring a first image of a marker in the main body through the camera to be calibrated.

The camera to be calibrated refers to a camera disposed on the material handling equipment that needs to be calibrated.

A quantity of the camera to be calibrated may be greater than one. The first image of the marker in the calibration room may be acquired through each camera to be calibrated. The processes of image acquisition by different cameras to be calibrated do not affect each other. To improve calibration efficiency, cameras to be calibrated may be controlled to acquire the first images in parallel.

Step S4140: acquiring coordinates of a corner point of the marker in the first image.

Step S4150: acquiring coordinates of the corner point of the marker in the fourth point cloud data.

The corner point may be an inflection point of a contour of the marker, or an intersection point of a specific pattern on the marker. Exemplarily, if the marker is a wall corner in the calibration room, the wall corner is the corner point; if the marker is an indicator, with a cross pattern thereon, placed in the calibration room, an intersection point of the cross pattern is the corner point; and if the marker is a rectangular piece of white foam, a vertex of the white foam is the corner point.

Step S4160: determining, based on coordinates of the corner point of the marker in the first image and the coordinates of the corner point of the marker in the fourth point cloud data, a fifth transformation relationship.

The fifth transformation relationship is a transformation relationship between a coordinate system of the camera to be calibrated and the coordinate system of the calibration room.

In some embodiments, for each camera to be calibrated, the first image collected by the camera to be calibrated includes corner points of a plurality of markers, and the coordinates corresponding to each corner point may be determined respectively. Coordinate registration may be performed based on the coordinates of the corner points in the first image and the coordinates of the corner points in the fourth point cloud data to obtain the fifth transformation relationship.

Step S4170: acquiring, based on the first transformation relationship and the fifth transformation relationship, a transformation relationship between the coordinate system of the camera to be calibrated and the coordinate system of the material handling equipment as a second calibration result.

Since the first transformation relationship is the transformation relationship between the coordinate system of the material handling equipment and the coordinate system of the calibration room, and the fifth transformation relationship is the transformation relationship between the coordinate system of the camera to be calibrated and the coordinate system of the calibration room, both the first transformation relationship and the fifth transformation relationship are related to the coordinate system of the calibration room. Accordingly, the coordinate system of the calibration room may be used as an intermediate coordinate system to establish an association between the coordinate system of the material handling equipment and the coordinate system of the camera to be calibrated, thereby obtaining the transformation relationship between the coordinate system of the camera to be calibrated and the coordinate system of the material handling equipment, which is taken as the calibration result.

In the embodiment of the present disclosure, accurate calibration of the camera to be calibrated may be achieved by using the fourth point cloud data of the calibration room and the images collected by the camera to be calibrated. The calibration method requires no manual intervention, realizing a high degree of automation, which not only reduces labor costs and time costs, but also improves calibration efficiency and accuracy.

An example will be provided to illustrate a specific implementation of determining the first transformation relationship with reference to FIG. 42 in the following.

Figure 42:
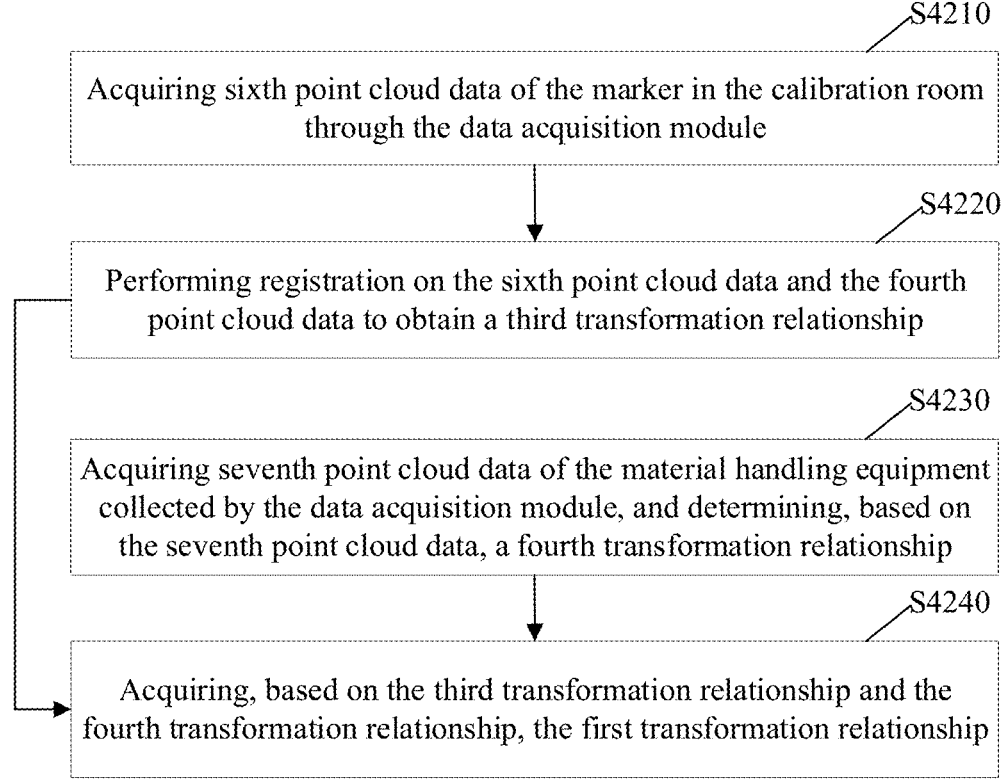
FIG. 42 is a schematic flowchart of determining a first transformation relationship according to another embodiment of the present disclosure.

FIG. 42 is a schematic flowchart of determining a first transformation relationship according to another embodiment of the present disclosure. The embodiment shown in FIG. 42 is extended from the embodiment shown in FIG. 41. The following focuses on describing a difference between the embodiments shown in FIG. 42 and FIG. 41, and the similarities will not be described.

As shown in FIG. 42, in the embodiment of the present disclosure, the step of calculating, based at least on the fourth point cloud data and the coordinate system data of the material handling equipment, the first transformation relationship (Step S4120) includes the following steps.

Step S4210: acquiring third point cloud data of the marker in the calibration room through the data acquisition module.

Step S4220: performing registration on the third point cloud data and the fourth point cloud data to obtain a third transformation relationship.

The third transformation relationship is a transformation relationship between a coordinate system of the data acquisition module and the coordinate system of the calibration room.

Step S4230: acquiring fourth point cloud data of the material handling equipment collected by the data acquisition module, and determining, based on the fourth point cloud data, a fourth transformation relationship.

The fourth transformation relationship is a transformation relationship between the coordinate system of the material handling equipment and the coordinate system of the data acquisition module.

Step S4240: acquiring, based on the third transformation relationship and the fourth transformation relationship, the first transformation relationship.

The determination method of the first transformation relationship used in the calibration of the LiDAR to be calibrated mentioned above may be adopted to determine the first transformation relationship in the embodiment of the present disclosure. By using the data acquisition module in the calibration room to determine the first transformation relationship, no manual intervention is required, realizing a high degree of automation, and further reducing labor costs and time costs.

An example will be provided to illustrate a specific implementation of determining the fourth transformation relationship with reference to FIG. 43 inn the following.

FIG. 43 is a schematic flowchart of determining a fourth transformation relationship according to another embodiment of the present disclosure. The embodiment shown in FIG. 43 is extended from the embodiment shown in FIG. 42. The following focuses on describing a difference between the embodiments shown in FIG. 43 and FIG. 42, and the similarities will not be described.

As shown in FIG. 43, in the embodiment of the present disclosure, the step of acquiring the fourth point cloud data of the material handling equipment collected by the data acquisition module, and determining, based on the fourth point cloud data, the fourth transformation relationship (Step S4230) includes the following steps.

Step S4310: acquiring coordinates of a center of the material handling equipment in the coordinate system of the material handling equipment.

Step S4320: calculating, based on the fourth point cloud data of the material handling equipment collected by the data acquisition module, coordinates of the center of the material handling equipment in the coordinate system of the data acquisition module.

Step S4330: determining, based on the coordinates of the center of the material handling equipment in the coordinate system of the data acquisition module and the coordinates of the center of the material handling equipment in the coordinate system of the material handling equipment, the fourth transformation relationship.

The determination method of the fourth transformation relationship used in the calibration of the LiDAR to be calibrated mentioned above can be adopted to determine the fourth transformation relationship in the embodiments of the present disclosure. Through the fourth transformation relationship, the point cloud data in the coordinate system of the material handling equipment may be transformed to the coordinate system of the data acquisition module, or the point cloud data in the coordinate system of the data acquisition module may be transformed to the coordinate system of the material handling equipment, thereby realizing data conversion and sharing between different coordinate systems.

In a case where both a LiDAR and a camera are disposed on the material handling equipment, the registration between the LiDAR and the camera disposed on the material handling equipment may be completed by using the fourth point cloud data. By synchronously collecting projection coordinates of a feature point in the calibration room in the image and the point cloud, a pose relationship between the camera and the LiDAR may be calculated based on a Perspective-n-Point (PnP) algorithm, so as to realize joint calibration of the camera and the LiDAR.

An example will be provided to illustrate a specific implementation of calibrating the coordinate system of the LiDAR and the coordinate system of the camera with reference to FIG. 44 in the following.

FIG. 44 is a schematic flowchart of a calibration method according to still another embodiment of the present disclosure. As shown in FIG. 44, in the embodiment of the present disclosure, a camera to be calibrated and a LiDAR to be calibrated are disposed on the material handling equipment, and the calibration method include the following steps.

Step S4410: acquiring fourth point cloud data of the calibration room.

The fourth point cloud data is full-scene point cloud map data of the calibration room.

Step S4420: acquiring fifth point cloud data of a marker in the calibration room through the LiDAR to be calibrated.

Step S4430: performing registration on the second point cloud data and the fourth point cloud data to obtain a second transformation relationship.

The second transformation relationship is a transformation relationship between a coordinate system of the LiDAR to be calibrated and a coordinate system of the calibration room.

Step S4440: acquiring a first image of the marker in the calibration room through the camera to be calibrated.

Step S4450: acquiring coordinates of a corner point of the marker in the first image.

Step S4460: acquiring coordinates of the corner point of the marker in the fourth point cloud data.

Step S4470: determining, based on the coordinates of the corner point of the marker in the first image and the coordinates of the corner point of the marker in the fourth point cloud data, a fifth transformation relationship.

The fifth transformation relationship is a transformation relationship between a coordinate system of the camera to be calibrated and the coordinate system of the calibration room.

Step S4480: acquiring, based on the second transformation relationship and the fifth transformation relationship, a transformation relationship between the coordinate system of the camera to be calibrated and the coordinate system of the LiDAR to be calibrated as a third calibration result.

Since the second transformation relationship is the transformation relationship between the coordinate system of the LiDAR to be calibrated and the coordinate system of the calibration room, and the fifth transformation relationship is the transformation relationship between the coordinate system of the camera to be calibrated and the coordinate system of the calibration room, both the second transformation relationship and the fifth transformation relationship are related to the coordinate system of the calibration room. Accordingly, the coordinate system of the calibration room may be used as an intermediate coordinate system to establish an association between the coordinate system of the LiDAR to be calibrated and the coordinate system of the camera to be calibrated, to obtain the transformation relationship between the coordinate system of the LiDAR to be calibrated and the coordinate system of the camera to be calibrated, which is taken as the third calibration result.

In the embodiment of the present disclosure, accurate calibration between the coordinate system of the LiDAR to be calibrated and the coordinate system of the camera to be calibrated may be achieved by using the fourth point cloud data of the calibration room and the images collected by the camera to be calibrated. The calibration method requires no manual intervention, realizing a high degree of automation, which not only reduces labor costs and time costs, but also improves calibration efficiency and accuracy.

An example will be provided to illustrate a specific implementation of determining a structural parameter of the material handling equipment in the following.

FIG. 45 is a schematic flowchart of a method for determining a structural parameter according to some embodiments of the present disclosure. As shown in FIG. 45, in the embodiment of the present disclosure, a marking tool is disposed on a part to be measured of the material handling equipment, and the method includes the following steps.

Step S4510: acquiring, based on point cloud data of the marking tool collected by the data acquisition module, position information of the marking tool.

The part to be measured may be any component of the material handling equipment whose structural parameter need to be measured, where the structural parameter includes parameters such as a size, a shape, or a position of the component. For example, the part to be measured may be a wheel or a fork on the material handling equipment.

The marking tool is a device disposed on the part to be measured for assisting in measurement, and it has known structural features, such as specific geometric shapes or sizes.

In some embodiments, the marking tool may be made of a material with high reflectivity to enable effective identification of the part to be measured. Exemplarily, the marking tool may include white foam and/or reflective film. The point cloud data of the marking tool may be collected by the data acquisition module. Then, the marking tool may be identified based on the point cloud data, and a position of the marking tool relative to the data acquisition module is determined to obtain the position information of the marking tool. This position information may include coordinates and a pose of the marking tool in the coordinate system of the data acquisition module.

Step S4520: acquiring, based on the position information of the marking tool and a relative positional relationship between the marking tool and the part to be measured, position information of the part to be measured.

The relative positional relationship between the marking tool and the part to be measured is predetermined when the material handling equipment is placed. For example, the relative positional relationship between the marking tool and the part to be measured can be obtained through methods such as mechanical installation or manual measurement, and this relationship may include a relative distance, an offset angle, and the like. Based on the acquired position information of the marking tool and the aforementioned relative positional relationship between the marking tool and the part to be measured, the position information of the part to be measured in the coordinate system of the data acquisition module can be calculated. This position information may also include the coordinates, attitude, and other parameters of the part to be measured in the coordinate system of the data acquisition module.

Step S4530: extracting, based on the position information of the part to be measured, point cloud data of the part to be measured from the point cloud data of the marking tool collected by the data acquisition module.

In some embodiments, based on the position information of the part to be measured in the coordinate system of the data acquisition module, point cloud data located within a spatial range of the part to be measured can be screened from the point cloud data of the marking tool acquired by the data acquisition module, and used as the point cloud data of the part to be measured. This point cloud data can reflect the structural features of the part to be measured, such as its size and shape.

Step S4540: determining, based on the point cloud data of the part to be measured, a structural parameter of the part to be measured.

In some embodiments, methods such as filtering processing can be applied to the point cloud data of the part to be measured to denoise the point cloud data. Further, feature extraction is performed on the denoised point cloud data to extract key information that reflects the structural features of the part to be measured. The key information includes normal vectors, curvature, and the like. Based on the extracted key information, methods such as geometric calculation are used to calculate the structural parameters of the part to be measured.

In the embodiment of the present disclosure, the automatic measurement of the structural parameter of the part to be measured on the material handling equipment is achieved through the marking tool. This method does not require manual participation in the measurement process, which reduces labor costs and improves the accuracy and efficiency of measurement at the same time.

FIG. 46 is a schematic flowchart of a method for determining a structural parameter according to another embodiment of the present disclosure. As shown in FIG. 46, in the embodiment of the present disclosure, the method includes the following steps.

Step S4610: acquiring point cloud data of the material handling equipment through the data acquisition module.

Step S4620: performing point cloud segmentation on the point cloud data to obtain point cloud data of a part to be measured of the material handling equipment.

Step S4630: determining a structural parameter of the part to be measured based on the point cloud data of the part to be measured.

In some embodiments, the point cloud data can be segmented based on the geometric features of the part to be measured to obtain the point cloud data of the part to be measured; alternatively, clustering processing can be performed on the point cloud data, the point cloud data can be segmented based on the clustering results, and then the point cloud data corresponding to the part to be measured can be identified from the segmented point cloud data according to the geometric features of the part to be measured.

In the embodiment of the present disclosure, the structural parameters of the part to be measured is automatically determined without requiring additional tooling for the material handling equipment. This simplifies the operation process, reduces calibration costs, offers high usability, and has a wider range of applicable scenarios.

An example will be provided to illustrate a specific implementation of calibrating an encoder with reference to FIG. 47 in the following.

FIG. 47 is a schematic flowchart of a method for calibrating an encoder according to some embodiments of the present disclosure. As shown in FIG. 47, in the embodiment of the present disclosure, the material handling equipment includes a material handling equipment, and the material handling equipment includes a fork assembly and an encoder. The method includes the following steps.

Step S4710: controlling the fork assembly to move to a designated position.

The encoder is a sensor mounted on the fork assembly, used for accurately measuring vertical displacement, horizontal displacement, and length displacement of the fork assemble. Encoder readings can be used to determine the position and angle parameters of the fork assembly.

In some embodiments, the designated position may be any one of multiple different vertical positions.

Step S4720: acquiring a target movement amount and controlling, based on the target movement amount, the fork assembly to move.

The target movement amount refers to the designated spatial displacement of the fork assembly in space, and this spatial displacement can be the displacement in a vertical direction, a horizontal direction, or a length direction.

In some embodiments, the fork assembly is controlled to move by the target movement amount based on the encoder reading. During the process of controlling the fork assembly to move by the target movement amount, the encoder records the movement amount of the fork assembly in real time. When the movement amount determined by the encoder is consistent with the target movement amount, the movement of the fork assembly is stopped. Exemplarily, a numerical reading value of the encoder before the fork assembly moves is a third value, and a numerical reading value of the encoder after the fork assembly moves is a fourth value.

Step S4730: acquiring a current position of the fork assembly based on point cloud data of the fork assembly collected by the data acquisition module, and calibrating the encoder based on the current position and the target movement amount.

In some embodiments, first the fork assembly is identified based on the point cloud data of the fork assembly obtained by the data acquisition module, and the current position of the fork assembly is determined. This current position may include coordinates, a pose, and other parameters of the fork assembly in the coordinate system of the data acquisition module. Based on the current position and the designated position, the actual displacement of the fork assembly may be calculated. Then, the encoder is calibrated using the actual displacement, the third value, and the fourth value to reduce measurement error of the encoder.

Exemplarily, a linear fitting method is adopted to calculate the zero point and scaling factor of the encoder based on the actual displacement, the third value, and the fourth value. This further establishes the correlation between the encoder readings and the displacement of the fork assembly, thereby completing the calibration of the encoder.

In the embodiment of the present disclosure, the encoder may be accurately calibrated based on the point cloud data of the fork assembly acquired by the data acquisition module. This calibration method not only improves the accuracy of calibration but also ensures the accurate operation of the encoder in the material handling equipment, thereby enhancing the overall performance and stability of the material handling equipment.

Figure 48:
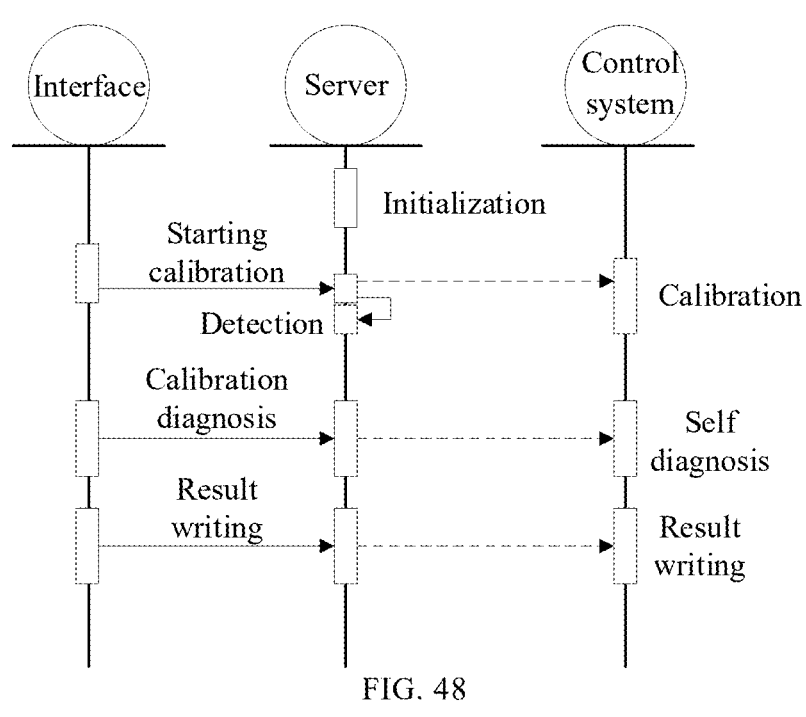
FIG. 48 is a schematic diagram of interaction according to some embodiments of the present disclosure.

The calibration of the LiDAR on the autonomous mobile device, the determination of the structural parameters and the center point of the autonomous mobile device, and the calibration of the encoder, as proposed in the above embodiments, can all be implemented through the interaction between a client interface, a server and a controller. FIG. 48 is a schematic diagram of interaction according to some embodiments of the present disclosure. As shown in FIG. 48, in the embodiment of the present disclosure, firstly, the server is initialized, and then a calibration task is started in response to a triggering operation for the calibration process on the client interface. The point cloud data collected by the data acquisition module are detected by the server continuously and transmitted to the controller for calibration of the autonomous mobile device. In response to a triggering operation of calibration diagnosis on the client interface, a diagnosis request is generated by the server and sent to the controller. The controller then performs self-diagnosis for the calibration of the autonomous mobile device, which refers to diagnosis on the calibration results to improve reliability and accuracy of the calibration results. In response to a triggering operation for writing of the calibration results on the client interface, a result writing request is sent to the controller by the server, enabling the controller to write the calibration results into a parameter configuration tool.

Figure 49:
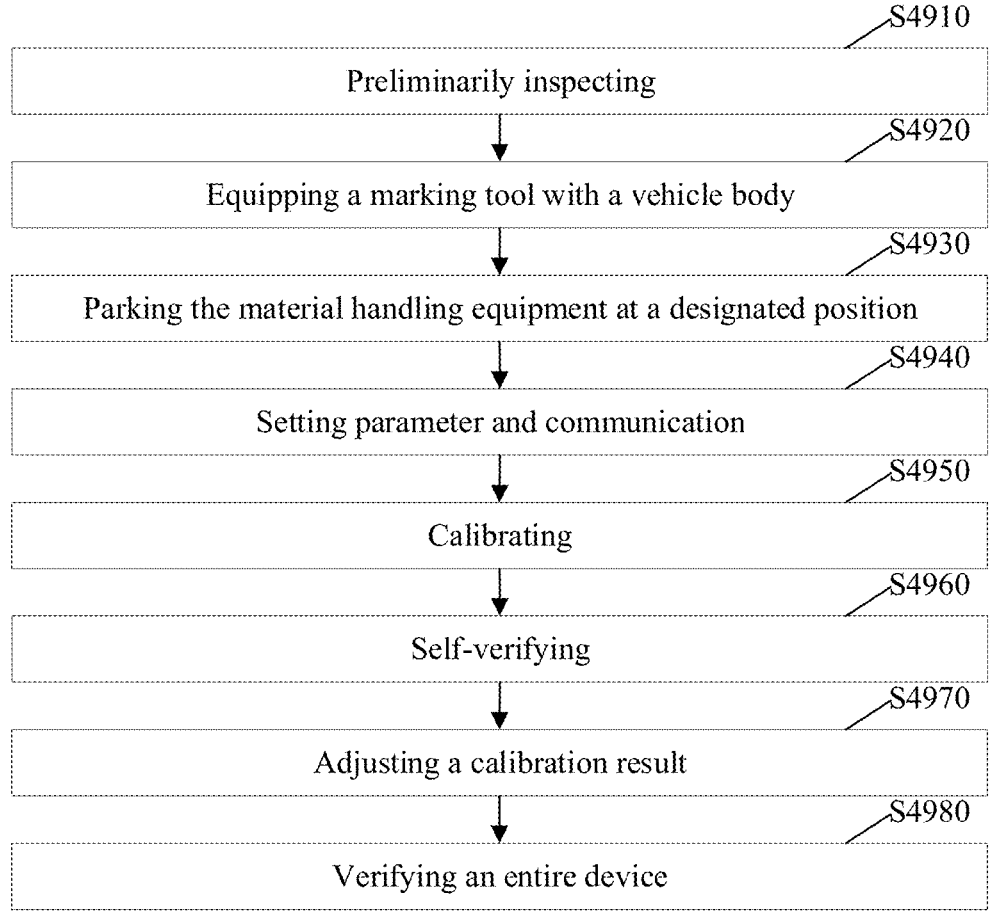
FIG. 49 is a schematic flowchart of a calibration method using a calibration room according to some embodiments of the present disclosure.

An example will be provided to illustrate a specific implementation of a calibration operation process in the following. As shown in FIG. 49, a usage process of the calibration room includes the following steps.

Step S4910: preliminarily inspecting. Before calibration, a preliminary inspection is conducted, i.e., checking whether devices required for calibration is complete. If the devices required for calibration is complete, the next step will be executed; if there is a missing of a required device, the device configuration will be executed first.

Step S4920: equipping a marking tool with a vehicle body. After passing the preliminary inspection, the marking tool is equipped on the vehicle body of the material handling equipment. The marking tool may include white foam and magnetic strips, so that the white foam may be attached to the component of the material handling equipment (e.g., the fork assembly and wheel assembly). The marking tool may help screen out the point cloud data of a component of the material handling equipment, thereby determining the center of the material handling equipment.

Step S4930: parking the material handling equipment at a designated position. The material handling equipment is parked at the designated position to improve calibration accuracy. Exemplarily, pre-marked parking lines can be used for parking the material handling equipment in the pre-set optimal calibration region.

Step S4940: setting parameter and communication. To enable interaction between the server and the controller, communication between them may be established. For example, wireless communication can be adopted between the server and the controller.

Step S4950: calibrating. The calculation module in the controller is configured to perform calibration to complete calibration and write down the calibration results. Exemplarily, a calibration command may be input through the client interface. After receiving the calibration command, the server is configured to control the controller to perform the calibration operation, that is, automatically complete data detection, parameter calculation, and multi-LiDAR registration, and finally obtain the calibration results.

Step S4960: self-verifying. Finally, self-verification is conducted to verify whether there are errors in the calibration result.

Step S4970: adjusting a calibration result. If the material handling equipment is a forklift, to further improve the accuracy of the calibration result, the calibration result may be fine-tuned based on a handling errors of the forklift in practice.

Step S4980: verifying an entire device. A stacking and picking environment may be simulated or actually set up to verify stability of the entire device in stacking and picking scenarios. Additionally, the material handling equipment may be controlled to execute a same navigation task for multiple times to ensure the consistency of the results of multiple navigation tasks. Moreover, for a plurality of pieces of material handling equipment calibrated, a same working environment may be set up, and each material handling equipment is controlled to perform the same work to evaluate the consistency among the plurality of pieces of material handling equipment.

Figure 50:
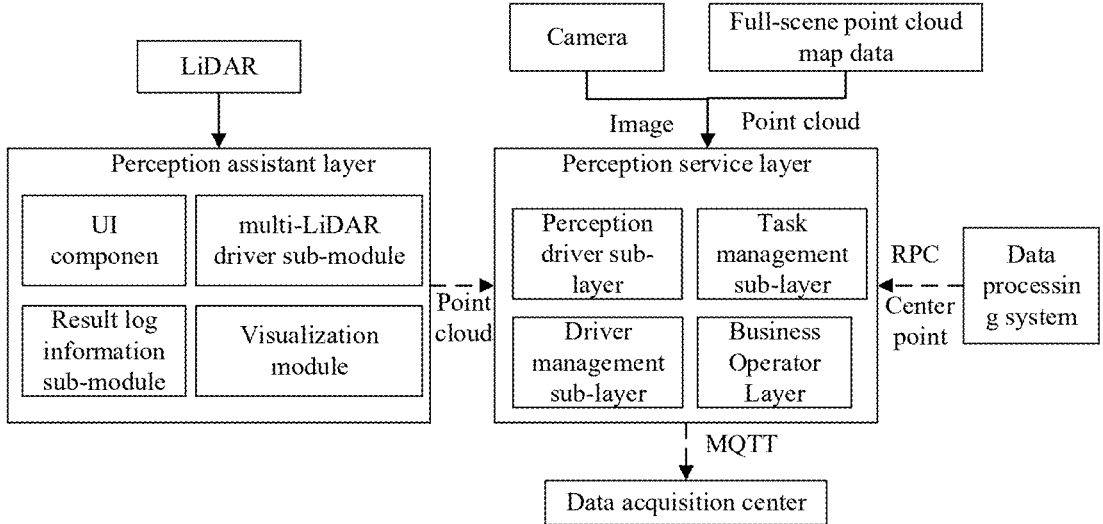
FIG. 50 is a schematic structural diagram of a calibration software system according to some embodiments of the present disclosure.

An example will be provided to illustrate the composition of a calibration software system for calibrating an automated guided forklift in an application scenario where the material handling equipment is the automated guided forklift with reference to FIG. 50 in the following. FIG. 50 is a schematic structural diagram of a calibration software system according to some embodiments of the present disclosure. As shown in FIG. 50, the calibration software system mainly includes a perception service layer, a data processing system, and a data acquisition center.

In some embodiments, the perception service layer includes a perception driving sub-layer, a task management sub-layer, a driver management sub-layer, and a business sub-layer. It is used for receiving the coordinates of the center of the automated guided forklift in the coordinate system of the calibration room input by the data processing system, and calculate the transformation relationship between the coordinate system of the LiDAR to be calibrated and the coordinate system of the automated guided forklift based on the fourth point cloud data of the calibration room. Exemplarily, a handheld mapping device can be used for collecting the full-scene point cloud map data of the main body of the calibration room, and this full-scene point cloud map data is used as the fourth point cloud data. Additionally, a camera can be used for collecting images of the automated guided forklift and the calibration room. The data processing system is used for determining the coordinates of the center of the automated guided forklift in the coordinate system of the calibration room using the data acquisition module and send them to the perception service layer. The data acquisition center is used for storing initialization parameters and calibration results. The perception service layer and the data acquisition center can transmit data through the MQTT protocol, while the perception service layer and the data processing system can transmit data through the RPC (Remote Procedure Call) protocol.

In other embodiments, the calibration software system further includes a perception assistant layer. The perception assistant layer is connected to both the LiDAR to be calibrated and the perception service layer, and is used for obtaining the point cloud data collected by the LiDAR and transmit the point cloud data to the perception service layer. The perception assistant layer contains a plurality of key sub-modules: UI component, used for providing a user interaction interface, facilitating user operations and information reading; multi-LiDAR driver sub-module, responsible for the driving and control functions of a plurality of LiDARs, enabling multi-sensor collaborative work; result log information sub-module, used for recording the calibration results generated during the system operation; visualization sub-module, used for displaying the calibration result.

Next, a specific implementation of a calibration algorithm for a material handling equipment is illustrated with reference to FIG. 51. In the embodiment of the present disclosure, the material handling equipment includes an automated guided forklift.

Figure 51:
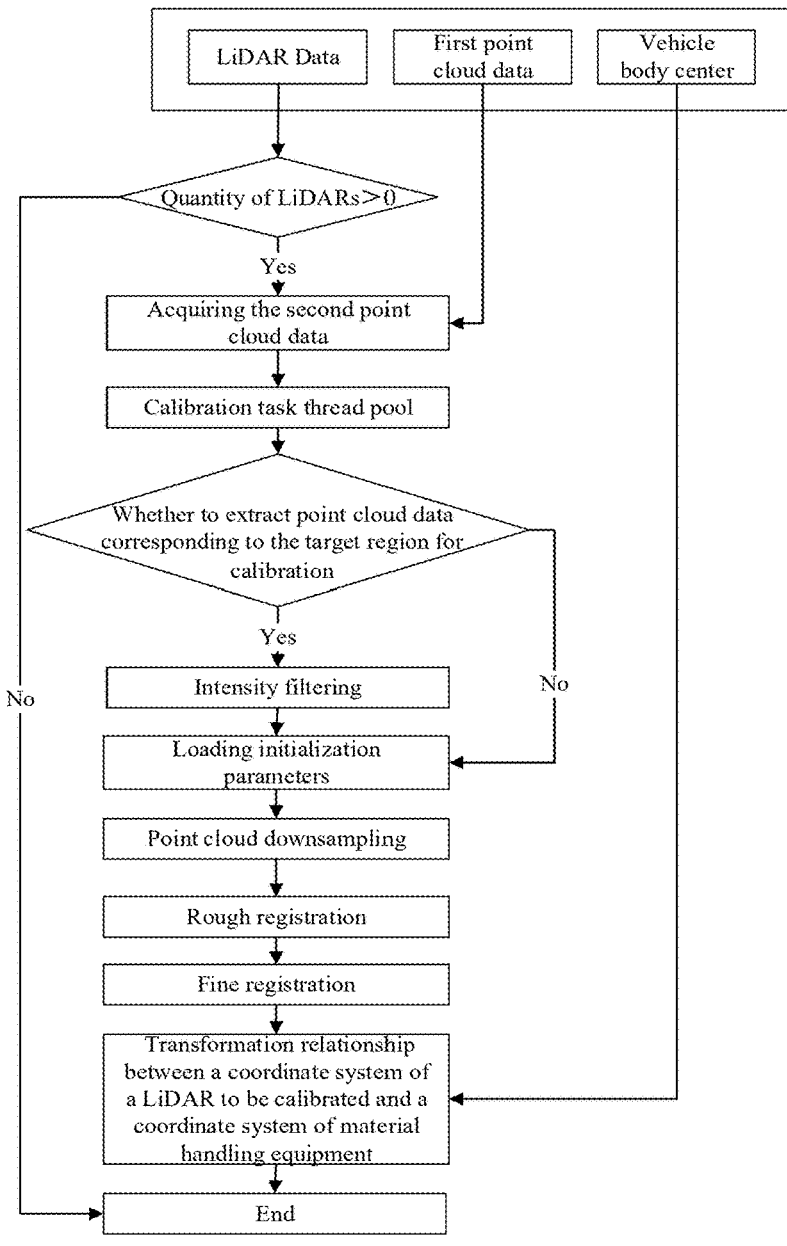
FIG. 51 is a schematic flowchart of a calibration method for an automated guided forklift according to some embodiments of the present disclosure.

FIG. 51 is a schematic flowchart of a calibration method for an automated guided forklift according to some embodiments of the present disclosure. As shown in FIG. 51, point cloud data can first be collected in a calibration room, and the fourth point cloud data can be obtained after data processing. The automated guided forklift is driven to a designated position in the calibration room, and this position is determined based on the acquisition field of view of the LiDAR to be calibrated and the data acquisition module.

Further, the coordinates of vehicle body center of the automated guided forklift in the coordinate system of the calibration room are determined through the data processing system, and the first transformation relationship is confirmed based on these coordinates. After receiving the first transformation relationship, the automated guided forklift side starts to acquire point cloud data collected by the LiDARs to be calibrated, identifies the number of such LiDARs disposed on the forklift, and automatically acquires the second point cloud data of a marker in the calibration room collected by the corresponding LiDARs to be calibrated, then initiates a task thread for independent calibration with progress tracking. If a quantity of LiDARs to be calibrated is no greater than 0, the calibration process is terminated. If the number exceeds 0, it starts loading the fourth point cloud data and activates each task thread in the calibration task thread pool. If the option to extract point cloud data corresponding to the target region for calibration is selected, point cloud data meeting the filtering condition is filtered out from both the fourth point cloud data and fifth point cloud data to eliminate noise. The filtering condition includes: belonging to the target region and with an intensity higher than an intensity threshold. Further, initialization parameters can be loaded, the initialization parameters includes the initial transformation relationship between the coordinate system of the LiDAR and the coordinate system of the calibration room. If the option to extract point cloud data corresponding to the target region for calibration is not selected, the initialization parameters can be loaded directly. After loading the initialization parameters, point cloud down sampling is performed on the fourth point cloud data and fifth point cloud data. The fourth point cloud data is updated with the down sampled result of itself, and the fifth point cloud data is updated similarly, which reduces the computational load. Additionally, rough registration is first performed on the two sets of point cloud data; based on the transformation matrix obtained from the rough registration, fine registration is then performed. Finally, the second transformation relationship (i.e., the transformation between the coordinate system of the LiDAR and the coordinate system of the calibration room) is obtained. Using the determined first transformation relationship and second transformation relationship, the transformation relationship between the coordinate system of the LiDAR and the coordinate system of the material handling equipment is acquired as the calibration result.

The calibration algorithm proposed in the embodiment significantly improves the efficiency, accuracy, and consistency of multi-LiDAR calibration for automated guided forklifts. Taking a vehicle model with five LiDARs as an example, from actual test results, the algorithm time per LiDAR has been reduced from the original 30 minutes to a maximum of 90 seconds, the total calibration time for all LiDARs has been reduced from over 2 hours to less than 10 minutes, and the calibration accuracy has been improved from the previous registration error of 2 cm to less than 5 mm.

Based on the same concept, the embodiment of the present disclosure further provides a material handling equipment, including a fork assembly, a first wheel assembly, and a second wheel assembly. The center of the material handling equipment may be determined by using the method for determining a center of the material handling equipment mentioned in the embodiments of the present disclosure above mentioned. Since the principle of solving the problem in the embodiment of material handling equipment is similar to that of the aforementioned method embodiment, the implementation of the material handling equipment embodiment may refer to the implementation of the aforementioned method embodiment, and repeated descriptions will not be repeated here.

The method for determining a center of material handling equipment mentioned in the aforementioned embodiments may be executed either by the controller of the material handling equipment or by other hardware devices, such as a server or controller deployed in the cloud, which is not limited in the embodiments of the present disclosure. An example is illustrated below with reference to FIG. 52.

Figure 52:
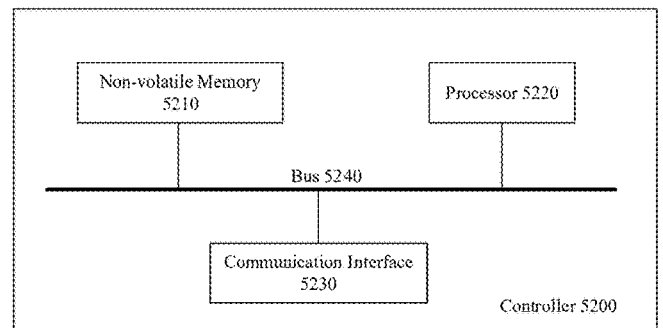
FIG. 52 is a schematic structural diagram of a controller according to another embodiment of the present disclosure.

FIG. 52 is a schematic structural diagram of a controller according to another embodiment of the present disclosure. The controller 5200 shown in FIG. 52 includes a non-volatile memory 5210, a processor 5220, a communication interface 5230, and a bus 5240. The non-volatile memory 5210, the processor 5220 and the communication interface 5230 are connected to each other through communication via the bus 5240.

The non-volatile memory 5210 is used to store program instructions and includes a Read Only Memory (ROM), a static storage device, a dynamic storage device, or a Random Access Memory (RAM), etc. The non-volatile memory 5210 is used to store computer programs. When the computer program stored in the non-volatile memory 5210 is executed by the processor 5220, the processor 5220 and the communication interface 5230 are used to execute each step of the calibration method according to the embodiments of the present disclosure.

The processor 5220 may adopt a general-purpose Central Processing Unit (CPU), microprocessor, Application Specific Integrated Circuit (ASIC), Graphics Processing Unit (GPU), or one or more integrated circuits, and is used for executing relevant programs to implement the functions that the controller needs to perform according to the embodiments of the present disclosure.

The processor 5220 may also be an integrated circuit chip with signal processing capabilities. In the implementation process, each step of the calibration method of the present disclosure may be completed through integrated logic circuits of hardware in the processor 5220 or instructions in the form of software. The aforementioned processor 5220 may also be a general-purpose processor, Digital Signal Processor (DSP), Application Specific Integrated Circuit (ASIC), Field Programmable Gate Array (FPGA), or other programmable logic devices, discrete gate or transistor logic devices, discrete hardware components, etc. It can implement or execute the methods, steps, and logical block diagrams disclosed in the embodiments of the present disclosure. A general-purpose processor may be a microprocessor, or the processor may also be any conventional processor, etc. The steps of the method disclosed in conjunction with the embodiments of the present disclosure may be directly implemented by a hardware decoding processor, or implemented by a combination of hardware and software modules in the decoding processor. The software module may be located in a mature storage medium in the art, such as random access memory, flash memory, read-only memory, programmable read-only memory, electrically erasable programmable memory, or registers. The storage medium is located in the non-volatile memory 5210, and the processor 5220 reads information in the non-volatile memory 5210 and, in combination with its hardware, completes the functions that the controller needs to perform according to the embodiments of the present disclosure, or executes the method according to the method embodiments of the present disclosure.

Specifically, the processor 5220 is used for executing program instructions to implement the following steps: acquiring first point cloud data corresponding to fork assembly, second point cloud data corresponding to first wheel assembly, and third point cloud data corresponding to second wheel assembly; determining a first point cloud plane corresponding to the fork assembly based on the first point cloud data; determining a second point cloud plane corresponding to the first wheel assembly based on the second point cloud data; determining a third point cloud plane corresponding to the second wheel assembly based on the third point cloud data; and determining a center of material handling equipment according to the first point cloud plane, the second point cloud plane, and the third point cloud plane.

The communication interface 5230 uses a transceiver device such as but not limited to a transceiver to implement communication between the controller 5200 and other devices or communication networks. For example, sensor data can be obtained through the communication interface 5230.

The bus 5240 may include paths for transmitting information between various components of the controller 5200 (e.g., the non-volatile memory 5210, the processor 5220, and the communication interface 5230).

Although the controller 5200 shown in FIG. 52 only illustrates the memory, the processor, and the communication interface, in actual implementation, those skilled in the art should understand that the controller 5200 also includes other components necessary for normal operation. Meanwhile, according to specific needs, those skilled in the art should understand that the controller 5200 may also include hardware components for additional functions. In addition, those skilled in the art should understand that the controller 5200 may only include the components necessary to implement the embodiments of the present disclosure, and need not include all the components shown in FIG. 52.

In addition to the aforementioned method, device and, and material handling equipment, the embodiments of the present disclosure may also be a computer program product, which includes computer program instructions. When executed by a processor, these computer program instructions implement each step of the method for determining a center of material handling equipment provided by the various embodiments of the present disclosure.

The computer program product may be written in any combination of one or more programming languages to execute program codes for implementing the operations of the embodiments of the present disclosure. The programming languages include object-oriented programming languages such as Java, C++, etc., and also include conventional procedural programming languages such as C, or similar programming languages. The program code may be executed entirely on the user's computing device, partially on the user's device, as an independent software package, partially on the user's computing device and partially on a remote computing device, or entirely on the remote computing device or server.

Furthermore, the embodiments of the present disclosure may also be a computer-readable storage medium, on which computer program instructions are stored. When executed by a processor, these computer program instructions implement each step of the method for determining a center of material handling equipment provided by the various embodiments of the present disclosure.

The computer-readable storage medium may adopt any combination of one or more readable media. The readable medium may be a readable signal medium or a readable storage medium. For example, the readable storage medium may include, but is not limited to, electrical, magnetic, optical, electromagnetic, infrared, or semiconductor systems, apparatuses, or devices, or any combination thereof. More specific examples (a non-exhaustive list) of the readable storage medium include: electrical connections with one or more wires, portable disks, hard disks, Random Access Memory (RAM), Read Only Memory (ROM), erasable programmable read-only memory (EPROM or flash memory), optical fibers, portable compact disc read-only memory (CD-ROM), optical storage devices, magnetic storage devices, or any suitable combination of the above.

Those skilled in the art may realize that the units and algorithm steps of the examples described in conjunction with the embodiments disclosed herein can be implemented by electronic hardware, or by a combination of computer software and electronic hardware. Whether these functions are executed by hardware or software depends on the specific application and design constraints of the technical solution. Skilled artisans can use different methods to implement the described functions for each specific application, but such implementation should not be considered to go beyond the scope of the present disclosure.

Those skilled in the art can clearly understand that, for the convenience and conciseness of description, the specific working processes of the above-described systems, apparatuses, and units can refer to the corresponding processes in the foregoing method embodiments, and will not be repeated here.

Among the several embodiments provided in the present disclosure, the disclosed systems, apparatuses, and methods can be implemented in other ways. For example, the apparatus embodiments described above are merely schematic; for instance, the division of the units is only a logical function division. In actual implementation, there may be other division methods—for example, multiple units or components may be combined or integrated into another system, or some features may be omitted or not executed. In addition, the coupling, direct coupling, or communication connection shown or discussed may be implemented through some interfaces, and the indirect coupling or communication connection between apparatuses or units may be in electrical, mechanical, or other forms.

The units described as separate components may or may not be physically separated, and the components shown as units may or may not be physical units-they may be located in one place, or may be distributed across multiple network units. Some or all of the units may be selected according to actual needs to achieve the objective of the solution in this embodiment.

In addition, each functional unit in each embodiment of this disclosure may be integrated into a single unit, or each unit may exist physically independently, or two or more units may be integrated into one unit.

If the function is implemented as a software functional unit and sold or used as an independent product, it may be stored in a computer-readable storage medium. Based on this understanding, the technical solution of this disclosure—in essence, the part that contributes to the existing technology, or a part of the technical solution—can be embodied in the form of a software product. This computer software product is stored in a storage medium and includes several instructions to enable a controller (which may be a personal computer, server, network device, etc.) to execute all or part of the steps of the method described in each embodiment of this disclosure. The aforementioned storage medium includes various media capable of storing program codes, such as USB flash drives, mobile hard disks, read-only memories, random access memories, magnetic disks, or optical discs.

The above descriptions are only specific implementations of this disclosure, but the protection scope of this disclosure is not limited thereto. Any person skilled in the art can easily think of changes or substitutions within the technical scope disclosed in this disclosure, and these shall be covered within the protection scope of this disclosure. Therefore, the protection scope of this disclosure shall be subject to the protection scope defined by the claims.

What is claimed is:

1. A method for determining a center of a material handling equipment, wherein the material handling equipment comprises a fork assembly, a first wheel assembly, and a second wheel assembly, and the method comprises:

acquiring first point cloud data corresponding to the fork assembly, second point cloud data corresponding to the first wheel assembly, and third point cloud data corresponding to the second wheel assembly;

determining, based on the first point cloud data, a first point cloud plane corresponding to the fork assembly;

determining, based on the second point cloud data, a second point cloud plane corresponding to the first wheel assembly;

determining, based on the third point cloud data, a third point cloud plane corresponding to the second wheel assembly; and determining, based on the first point cloud plane, the second point cloud plane and the third point cloud plane, the center of the material handling equipment.

2. The method according to claim 1, wherein the determining, based on the first point cloud plane, the second point cloud plane and the third point cloud plane, the center of the material handling equipment comprises:

determining a normal vector of the first point cloud plane, center coordinates of the second point cloud plane and center coordinates of the third point cloud plane; and determining, based on the normal vector of the first point cloud plane, the center coordinates of the second point cloud plane and the center coordinates of the third point cloud plane, the center of the material handling equipment.

3. The method according to claim 2, wherein the center of the material handling equipment comprises coordinates of the center of the material handling equipment, a yaw angle, a pitch angle and a roll angle of the material handling equipment; and the determining, based on the normal vector of the first point cloud plane, the center coordinates of the second point cloud plane and the center coordinates of the third point cloud plane, the center of the material handling equipment comprises:

determining, based on the second point cloud plane and the third point cloud plane, a fourth point cloud plane, wherein the fourth point cloud plane is parallel to the second point cloud plane and the third point cloud plane, and a distance from the fourth point cloud plane to the second point cloud plane is equal to a distance from the fourth point cloud plane to the third point cloud plane;

determining an intersection line between the first point cloud plane and a fifth point cloud plane, wherein the fifth point cloud plane is determined based on point cloud of a plane carrying the material handling equipment;

determining an intersection point between the fourth point cloud plane and the intersection line;

determining, based on a normal vector of the first point cloud plane, the yaw angle of the material handling equipment;

determining, based on the normal vector of the fifth point cloud plane, the pitch angle and the roll angle of the material handling equipment; and determining, based on the intersection point, the center coordinates of the second point cloud plane and the center coordinates of the third point cloud plane, the coordinates of the center of the material handling equipment.

4. The method according to claim 3, wherein the determining, based on the intersection point, the center coordinates of the second point cloud plane and the center coordinates of the second point cloud plane and the center coordinates of the third point cloud plane, the coordinates of the center of the material handling equipment comprises:

determining, based on the intersection point and the yaw angle, a first axis coordinate value of the center of the material handling equipment;

determining, based on the center coordinates of the second point cloud plane and the center coordinates of the third point cloud plane, a second axis coordinate value of the center of the material handling equipment; and determining, based on the first axis coordinate value, the second axis coordinate value, and the fifth point cloud plane, a third axis coordinate value of the center of the material handling equipment.

5. The method according to claim 4, wherein the determining, based on the first axis coordinate value, the second axis coordinate value, and the fifth point cloud plane, the third axis coordinate value of the center of the material handling equipment comprises:

substituting the first axis coordinate value and the second axis coordinate value into a plane equation of the fifth point cloud plane to obtain the third axis coordinate value of the center of the material handling equipment.

6. The method according to claim 4, wherein the determining, based on the intersection point and the yaw angle, the first axis coordinate value of the center of the material handling equipment comprises:

acquiring, based on a sine value of the yaw angle and a target distance value, a first value;

acquiring, based on a first axis coordinate value of the intersection point and the first value, a second value; and acquiring, based on the first value and the second value, the first axis coordinate value of the center of the material handling equipment, wherein the target distance value is a distance from the first point cloud plane to the center of the material handling equipment.

7. The method according to claim 4, wherein the determining, based on the center coordinates of the second point cloud plane and the center coordinates of the third point cloud plane, the second axis coordinate value of the center of the material handling equipment comprises:

determining an average value of a second axis coordinate value corresponding to the center coordinates of the second point cloud plane and a second axis coordinate value corresponding to the center coordinates of the third point cloud plane as the second axis coordinate value of the center of the material handling equipment.

8. The method according to claim 2, wherein determining the center coordinates of the second point cloud plane comprises:

cropping, based on the second point cloud plane and a wheel radius of the first wheel assembly, the second point cloud data to obtain wheel point cloud of the first wheel assembly;

determining, based on the wheel point cloud of the first wheel assembly, wheel edge point cloud of the first wheel assembly;

acquiring a rough wheel center of the first wheel assembly;

performing, based on the wheel edge point cloud, the wheel radius and the rough wheel center of the first wheel assembly, at least one iterative calculation to obtain a center of the first wheel assembly; and determining coordinates of the center of the first wheel assembly to be the center coordinates of the second point cloud plane.

9. The method according to claim 8, wherein the cropping, based on the second point cloud plane and the wheel radius of the first wheel assembly, the second point cloud data to obtain the wheel point cloud of the first wheel assembly comprises:

cropping the second point cloud data to obtain laser points, lying on the second point cloud plane, of the second point cloud data as target point cloud;

cropping the target point cloud based on the wheel radius of the first wheel assembly to obtain rough wheel point cloud; and filtering, based on a normal vector of each laser point in the rough wheel point cloud, laser points in the rough wheel point cloud to obtain the wheel point cloud of the first wheel assembly.

10. The method according to claim 9, wherein the filtering, based on the normal vector of each laser point in the rough wheel point cloud, the laser points in the rough wheel point cloud to obtain the wheel point cloud of the first wheel assembly comprises:

acquiring laser points with a normal vector angle greater than a target angle in the rough wheel point cloud by filtering to obtain the wheel point cloud of the first wheel assembly.

11. The method according to claim 9, wherein the cropping the target point cloud based on the wheel radius of the first wheel assembly to obtain the rough wheel point cloud comprises:

adding the wheel radius of the first wheel assembly to a target value to obtain a new wheel radius, and cropping the target point cloud based on the new wheel radius to obtain the rough wheel point cloud.

12. The method according to claim 8, wherein the determining, based on the wheel point cloud of the first wheel assembly, the wheel edge point cloud of the first wheel assembly comprises:

acquiring rough wheel edge point cloud based on the wheel point cloud of the first wheel assembly and the wheel radius of the first wheel assembly; and performing circle fitting based on the rough wheel edge point cloud to obtain the wheel edge point cloud.

13. The method according to claim 1, wherein the fork assembly is provided with a marking tool, and the marking tool comprises a first reflective layer; and the determining, based on the first point cloud data, the first point cloud plane corresponding to the fork assembly comprises:

determining point cloud of the first reflective layer in the first point cloud data; and performing plane fitting based on the point cloud of the first reflective layer to obtain the first point cloud plane.

14. The method according to claim 13, wherein the marking tool further comprises a second reflective layer, reflectivity of the first reflective layer is less than reflectivity of the second reflective layer, and an orthographic projection of the second reflective layer onto a plane where the first reflective layer is located partially covers the first reflective layer, or the second reflective layer does not overlap with the first reflective layer; and the determining the point cloud of the first reflective layer in the first point cloud data comprises:

extracting point cloud of the second reflective layer in the first point cloud data; and determining a centroid of the point cloud of the second reflective layer and determining, based on the centroid, the point cloud of the first reflective layer.

15. The method according to claim 14, wherein the determining the centroid of the point cloud of the second reflective layer comprises:

clustering the point cloud of the second reflective layer to obtain a plurality of first clusters;

generating target planes corresponding to the plurality of first clusters based on the plurality of first clusters, and removing, based on a normal vector of a target plane corresponding to each first cluster, a first cluster without meeting a condition from the plurality of first clusters to obtain second clusters; and calculating, based on the second clusters, the centroid of the point cloud of the second reflective layer.

16. The method according to claim 14, wherein the determining, based on the centroid, the point cloud of the first reflective layer comprises:

determining, based on the centroid, a target region corresponding to the first reflective layer; and extracting, based on the target region, the point cloud of the first reflective layer.

17. The method according to claim 1, wherein the first wheel assembly is provided with a marking tool, and the marking tool comprises a first reflective layer; and the determining, based on the second point cloud data, the second point cloud plane corresponding to the first wheel assembly comprises:

determining point cloud of the first reflective layer in the second point cloud data; and performing plane fitting based on the point cloud of the first reflective layer to obtain the second point cloud plane.

18. The method according to claim 17, wherein the marking tool further comprises a second reflective layer, reflectivity of the first reflective layer is less than reflectivity of the second reflective layer, and an orthographic projection of the second reflective layer onto a plane where the first reflective layer is located partially covers the first reflective layer, or the second reflective layer does not overlap with the first reflective layer; and the determining the point cloud of the first reflective layer in the second point cloud data comprises:

extracting point cloud of the second reflective layer in the second point cloud data; and determining a centroid of the point cloud of the second reflective layer and determining, based on the centroid, the point cloud of the first reflective layer.

19. A material handling equipment, comprising a fork assembly, a first wheel assembly, and a second wheel assembly, wherein a center of the material handling equipment is determined by the method according to claim 1.

20. A controller, comprising:

a processor and a non-transitory memory, wherein the non-transitory memory is configured to store program instructions; and the processor is configured to execute the program instructions to implement the following steps:

acquiring first point cloud data corresponding to the fork assembly, second point cloud data corresponding to the first wheel assembly, and third point cloud data corresponding to the second wheel assembly;

determining, based on the first point cloud data, a first point cloud plane corresponding to the fork assembly;

determining, based on the second point cloud data, a second point cloud plane corresponding to the first wheel assembly;

determining, based on the third point cloud data, a third point cloud plane corresponding to the second wheel assembly; and determining, based on the first point cloud plane, the second point cloud plane and the third point cloud plane, the center of the material handling equipment.

\* \* \* \* \*